US012472432B2

(12) United States Patent
Okamura

(10) Patent No.: US 12,472,432 B2
(45) Date of Patent: Nov. 18, 2025

(54) INFORMATION PROCESSING METHOD AND RECORDING MEDIUM

(71) Applicant: Konami Digital Entertainment Co., Ltd., Tokyo (JP)

(72) Inventor: Noriaki Okamura, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 268 days.

(21) Appl. No.: 18/457,506

(22) Filed: Aug. 29, 2023

(65) Prior Publication Data

US 2023/0398447 A1 Dec. 14, 2023

Related U.S. Application Data

(63) Continuation of application No. PCT/JP2022/008655, filed on Mar. 1, 2022.

(30) Foreign Application Priority Data

Mar. 15, 2021 (JP) ................................ 2021-041523
Mar. 15, 2021 (JP) ................................ 2021-041531

(51) Int. Cl.
*A63F 13/00* (2014.01)
*A63F 13/2145* (2014.01)
(Continued)

(52) U.S. Cl.
CPC ........ *A63F 13/537* (2014.09); *A63F 13/2145* (2014.09); *A63F 13/55* (2014.09)

(58) Field of Classification Search
CPC ...... A63F 13/2145; A63F 13/40; A63F 13/42; A63F 13/426; A63F 13/55; A63F 13/803; A63F 13/92; A63F 2300/1075; A63F 2300/204; A63F 2300/301; A63F 2300/6045; G06F 3/04815; G06F 3/04886
See application file for complete search history.

(56) References Cited

U.S. PATENT DOCUMENTS 6,597,345 B2 * 7/2003 Hirshberg ............... H04M 1/23 345/169
9,561,432 B2 * 2/2017 Alexeev .............. G06F 3/04815
2007/0265081 A1 * 11/2007 Shimura ............... A63F 13/426 463/37

FOREIGN PATENT DOCUMENTS

JP 2017-119043 A 7/2017

OTHER PUBLICATIONS

International Search Report dated May 17, 2022 in Application No. PCT/JP2022/008655.

(Continued)

*Primary Examiner* — Lawrence S Galka
(74) *Attorney, Agent, or Firm* — Sughrue Mion, PLLC

(57) ABSTRACT

An acquirer acquires touch location information indicating a touch location on a touch panel. A designator designates the moving direction of an object in the game space based on the touch location information. In a case in which there are multiple paths in which the object is movable in a game space, a predictor predicts, from among the multiple paths, a path in which the object will be moving, based on the moving direction designated by the designator and a shape of an environment that restricts movement of the object in the game space. The display controller displays an image indicating a prediction result by the predictor in the game space.

20 Claims, 21 Drawing Sheets

(51) Int. Cl.
*A63F 13/537* (2014.01)
*A63F 13/55* (2014.01)

(56) References Cited

OTHER PUBLICATIONS

Written Opinion of the International Searching Authority dated May 17, 2022 in Application No. PCT/JP2022/008655.

* cited by examiner

INFORMATION PROCESSING METHOD AND RECORDING MEDIUM

CROSS REFERENCE TO RELATED APPLICATIONS

This Application is a Continuation Application of PCT Application No. PCT/JP2022/008655, filed Mar. 1, 2022, which is based on and claims priority from Japanese Patent Application Nos. 2021-041531, filed Mar. 15, 2021, and 2021-041523, filed Mar. 15, 2021, the entire contents of each of which are incorporated herein by reference.

BACKGROUND OF THE INVENTION

Field of the Invention

The present invention relates to a recording medium, to an information processing apparatus, and to an information processing method.

Description of Related Art

A device is widely used that receives an input of a direction instruction from a user using a touch panel or the like (see Japanese Patent Application Laid-Open Publication No. 2017-1190443, hereinafter, JP 2017-1190443). In JP 2017-1190443, a direction instruction corresponding to a touch location on a touch panel is received from a user.

In a game using a touch panel or the like, in performing an operation for instructing a direction, a user might perform an erroneous operation of inputting an instruction of a direction that is different from a desired direction.

SUMMARY

The present invention has been made in view of the above-described circumstance, and an object of the present invention is to provide a technique that enables prevention or reduction of erroneous operations in inputting a direction instruction.

In order to solve the above problem, a recording medium according to an aspect of the present invention is a computer-readable recording medium storing a program that causes a processor to function as: an acquirer configured to acquire touch location information indicating a touch location on a touch panel; a designator configured to designate a moving direction of an object in a game space based on the touch location information; a predictor configured to, in a case in which there are multiple paths in which the object is movable in the game space, predict, from among the multiple paths, a path in which the object will be moving, based on the moving direction designated by the designator and a shape of an environment that restricts movement of the object in the game space; and a display controller configured to display in the game space an image indicating a prediction result by the predictor.

A recording medium according to another aspect of the present invention a recording medium according to an aspect of the present invention is a computer-readable recording medium storing a program that causes a processor to function as: an acquirer configured to acquire touch location information indicating a touch location on a touch panel; and a determiner configured to: in a case in which the touch location indicated by the touch location information is in a first region, determine movement of an object to a first direction, in which the object is in a first path that is in the first direction in a game space, and in a case in which the touch location indicated by the touch location information is in a second region partially overlapping the first region, determine movement of the object to a second direction, in which the object is in a second path that is in the second direction in the game space. The determiner includes, in a case in which the touch location indicated by the touch location information is in an overlapping region between the first region and the second region and in which there is a connection point of the first path and the second path in an area in the moving direction of the object in the game space, a selector configured to select, based on the touch location information, the moving direction of the object at the connection point from among the first direction and the second direction; and a display controller configured to display in the game space an image indicating a selection result by the selector before the object reaches the connection point.

An information processing apparatus according to another aspect of the present invention includes: an acquirer configured to acquire touch location information indicating a touch location on a touch panel; a designator configured to designate a moving direction of an object in a game space based on the touch location information; a predictor configured to, in a case in which there are multiple paths in which the object is movable in the game space, predict, from among the multiple paths, a path in which the object will be moving, based on the moving direction designated by the designator and a shape of an environment that restricts movement of the object in the game space; and a display controller configured to display, in the game space, an image indicating a prediction result by the predictor.

An information processing apparatus according to another aspect of the present invention includes an acquirer configured to acquire touch location information indicating a touch location on a touch panel; a determiner configured to, in a case in which the touch location indicated by the touch location information is in the first region, determine movement of an object to a first direction, in which the object is in a first path that is in the first direction in a game space, and in a case in which the touch location indicated by the touch location information is in a second region partially overlapping the first region, determine movement of the object to a second direction, in which the object is in a second path that is in the second direction in the game space. The determiner includes a selector and a display controller. In a case in which the touch location indicated by the touch location information is in an overlapping region between the first region and the second region and in which there is a connection point of the first path and the second path in an area in the moving direction of the object in the game space, the selector is configured to select, based on the touch location information, the moving direction of the object at the connection point from among the first direction and the second direction; and the display controller is configured to display in the game space an image indicating a selection result by the selector before the object reaches the connection point.

An information processing method according to another aspect of the present invention is implemented by a processor and includes: acquiring touch location information indicating a touch location on a touch panel; designating a moving direction of an object in a game space based on the touch location information; in a case in which there are multiple paths in which the object is movable, predicting, from among multiple paths, a path in which the object will be moving, based on the designated moving direction and a shape of an environment that restricts movement of the object in the game space; and displaying, in the game space, an image indicating a prediction result.

An information processing method according to another aspect of the present invention is implemented by a processor and includes: acquiring touch location information indicating a touch location on a touch panel; in a case in which the touch location indicated by the touch location information is in a first region, determining movement of an object in a first direction, in which the object is in a first path that is in the first direction in a game space; and in a case in which the touch location indicated by the touch location information is in a second region partially overlapping the first region, determining movement of the object in a second direction, in which the object is in a second path that is in the second direction in the game space. The method further includes: in a case in which the touch location indicated by the touch location information is in an overlapping region between the first region and the second region and in which there is a connection point of the first path and the second path in an area in the moving direction of the object in the game space, selecting, based on the touch location information, the moving direction of the object at the connection point from among the first direction and the second direction; and displaying in the game space an image indicating a selection result before the object reaches the connection point.

DESCRIPTION OF THE EMBODIMENTS

A: First Embodiment

Figure 1:
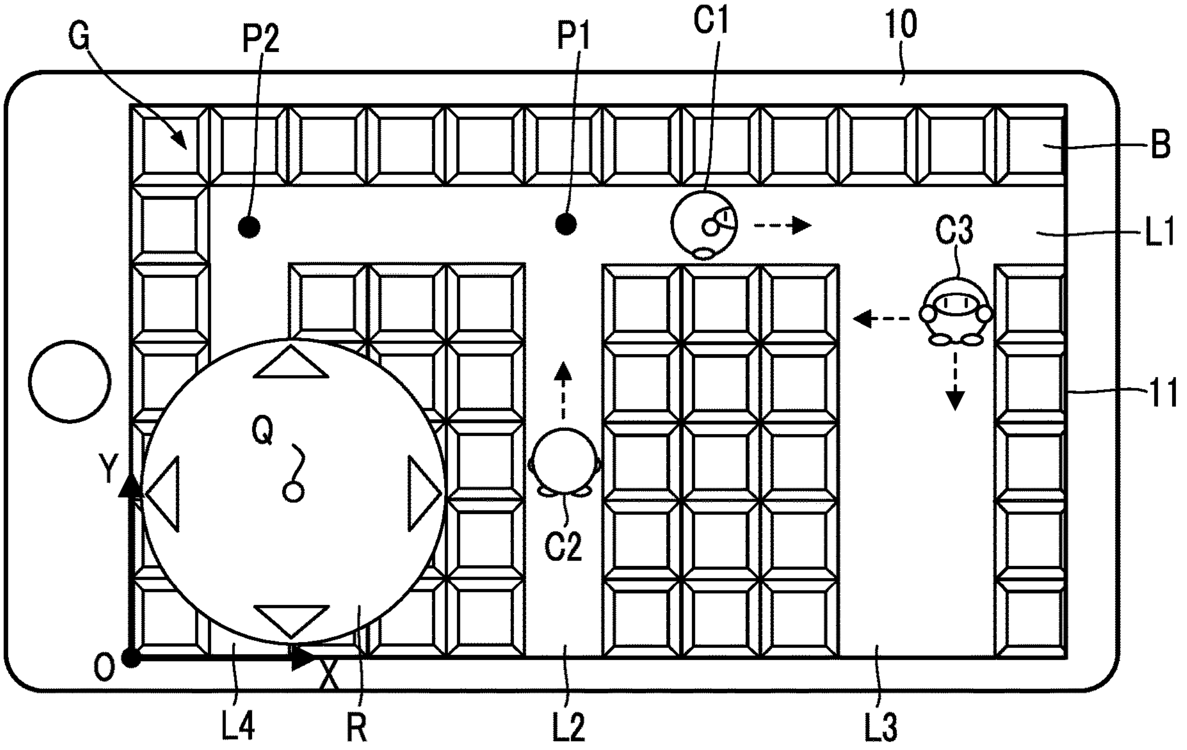
FIG. 1 is a diagram illustrating an example of an external appearance of an information processing apparatus 10 according to a First Embodiment.

FIG. 1 is a diagram illustrating an example of an external appearance of an information processing apparatus 10 according to a First Embodiment. The information processing apparatus 10 is, for example, a portable information processing apparatus, such as a smartphone, a tablet terminal, or a portable game apparatus. The information processing apparatus 10 includes a touch panel 11. The information processing apparatus 10 may be, for example, a commercial-use game apparatus installed in a store, an amusement facility, or the like, or may be a stationary information processing terminal, such as a desktop personal computer.

The touch panel 11 is a device in which a display device for displaying images and an input device (not shown) for receiving input of instructions are integrated. The touch panel 11 displays various images. For example, the touch panel 11 detects a touch location at which an object has contacted the touch panel 11, using a capacitance specified by the touch panel 11 and the object in contact with the touch panel 11. The touch panel 11 outputs touch location information indicating a touch location on the touch panel 11. In the present embodiment, as the touch location information, the touch panel 11 outputs coordinate information on an XY plane defined by an X-axis and a Y-axis, which will be described later.

As illustrated in FIG. 1, the touch location on the touch panel 11 is defined by the X-axis and the Y-axis orthogonal to each other at an origin O set on the touch panel 11. The X-axis and the Y-axis are set along the sides of the touch panel 11 in a rectangular shape. More specifically, the X-axis is set along the long side of the touch panel 11 in a rectangular shape, and the Y-axis is set along the short side of the touch panel 11. Therefore, with the user holding the information processing apparatus 10 such that the long side of the touch panel 11 is in the left-right direction, the X-axis corresponds to the left-right direction of the touch panel 11, and the Y-axis corresponds to the up-down direction of the touch panel 11.

In the following embodiments, unless otherwise specified, the up, down, left, and right (up direction, down direction, left direction, and right direction) refer to the directions in a game space G displayed on the touch panel 11 viewed by the user, with the user holding the information processing apparatus 10 such that the origin O is located at the lower left of the touch panel 11. The X-axis and the Y-axis are not limited to being set relative to the touch panel 11, and may be set relative to the game space G, for example.

The information processing apparatus 10 displays an image of a game on the touch panel 11 by executing an application program of the game.

In FIG. 1, the touch panel 11 displays an image indicating a part of the game space G as a game image. In the game space G, characters C (denoted as C1 to C3 in FIG. 1) are arranged. The part of the game space G is, for example, an image obtained by extracting a predetermined range based on the position of a character C in the game space G.

In the present embodiment, the "character C" is, for example, an example of an object, movement of which is to be instructed by using the touch panel 11. The character C is a virtual creature capable of progressing the game. The object may be not only the character C, but the object may also, for example, be an "object relating to a game" which is a virtual non-living object capable of progressing the game. In the present embodiment, the character C has a substantially circular shape, and the length in the up-down direction and the length in the left-right direction are equal to each other. Hereinafter, the length in the up-down direction and the length in the left-right direction of the character C each are referred to as a "character length". It is assumed that the character C cannot enter an area narrower than its width (a length in the left-right direction, i.e., the character length). In the present embodiment, the minimum moving distance of the character C coincides with the character length.

In the present embodiment, the "game space G" is, for example, a virtual space provided in a game, and may be a two-dimensional space or a three-dimensional space. In the present embodiment, it is assumed that the game space G is a two-dimensional space defined by the X-axis and the Y-axis. In the present embodiment, the "game space G" is divided into, for example, a "movable space" in which the character C is movable, and a "movement restricted space" in which the movement of the character C is restricted. The "movement restricted space" is, for example, a space in which movement of the character C is restricted due to an environment arranged in the game space G.

Here, the "environment" is, for example, an environment that hinders the movement of the character C in the game space. For example, the environment that restricts movement may be an environment in which an obstacle which the character C cannot enter, such as a rock, a peak, a wall, and a block B, are arranged, or an environment having specific terrains through which the character C cannot pass, such as a sea, a river, and a valley. The environment may be formed, for example, by continuously or discontinuously arranging multiple obstacles, or may be formed by combining multiple terrains. In the present embodiment, since the movement of the character C is hindered by the environment, it may be said that the "shape of the environment" is the shape of the boundary between the movable space and the movement restricted space. Elements that make up the environment, such as the obstacles and specific terrains, are referred to as "environmental components".

In the present embodiment, it is assumed that the environmental components are blocks B. The character C cannot enter a space in which a block B is arranged. In the present embodiment, the block B is in a square shape, having the length in the up-down direction equal to the length in the left-right direction. The length of the block B in the up-down direction and the length of the block B in the left-right direction are substantially equal to the character length. It is to be noted that the shape and size of the block B, the shape and size of the character C, and the like in the present embodiment are mere examples, and various forms may be employed in accordance with the specifications of a game. In the present embodiment, the block B may disappear when, for example, an item is used, a character C is operated, or the like. In this case, a space that used to be occupied by the block B, which has disappeared, becomes a part of a path L. Thus, the shape of a path L may change as the game progresses.

In the present embodiment, a space in which blocks B are not arranged is a path L (L1 to L4 in FIG. 1) in which the character C is movable. The path L is an example of a space in which the character C is movable in the game space G, i.e., the path L is an example of the above-described movable space. Blocks B, which comprise an example of an environment restricting the movement of a character C, are arranged on both sides of a path L (in a direction orthogonal to the extending direction of the path L). Therefore, although the character C is movable along the extending direction of the path L, movement not along the extending direction of the path L is restricted by the blocks B.

For example, in a case in which the distance between the blocks B on both sides of the path L is greater than the minimum moving distance of the character C, the character C is movable in the width direction in the path L, i.e., between the blocks B. On the other hand, in a case in which the distance between the blocks B on both sides of the path L is equal to the minimum moving distance of the character C, the character C cannot move in the width direction in the path L. In the present embodiment, the minimum moving distance of the character C is equal to the character length. Therefore, the character C cannot move in the path in the width direction unless the distance between the blocks B on both sides of the path L is two times or more than two times the character length. In a case in which the distance between the blocks B on both sides of the path L is smaller than the minimum moving distance of the character C, the character C cannot enter the path L.

A point at which paths L are connected to each other is defined as a connection point P (connection point P1, P2 or the like in FIG. 1). In the present embodiment, for convenience of explanation, a dot indicating the connection point P is shown, but the connection point P need not be displayed on the touch panel 11.

For example, in FIG. 1, the paths L1 to L4 are displayed on the touch panel 11. The path L1 extends in the X-axis direction and has a path width in the Y-axis direction. The path width of the path L1 is approximately the same as the width of a single block B, i.e., the character length. Therefore, the character C1 located in the path L1 is movable in the X-axis direction (left-right direction), but cannot move in the Y-axis direction (up-down direction) because there is no space to move. In FIG. 1, the character C1 is moving rightward. The path L1 is connected to the path L4 extending in the Y-axis direction at the connection point P2. A block B is arranged on the left side of the connection point P2, and the character C having moved leftward in the path L1 cannot move further to the left of the connection point P2. That is, the path L1 is terminated at the connection point P2.

The path L2 extends in the Y-axis direction and has a path width in the X-axis direction. The path width of the path L2 is approximately the same as the width of one block B, i.e., the character length. Therefore, the character C2 located in the path L2 is movable in the Y-axis direction (up-down direction), but cannot move in the X-axis direction (left-right direction) because there is no space to move. In FIG. 1, the character C2 is moving upward. The path L2 is connected to the path L1 extending in the X-axis direction at the connection point P1. A block B is arranged above the connection point P1, and the character C, which has moved upward in the path L2, cannot move to an area above the connection point P1. That is, the path L2 is terminated at the connection point P1.

The path L3 extends in the Y-axis direction and has a path width in the X-axis direction. The path width of the path L3 is equal to the width of two blocks B, i.e., twice as much as the character length. Therefore, the character C3 located in the path L3 is movable by one character length also in the X-axis direction (left-right direction) in addition to being movable in the Y-axis direction (up-down direction). In FIG. 1, the character C3 is moving downward at the right end of the path L3, for example, but is movable also leftward by one character length.

The path L4 extends in the Y-axis direction and has a path width in the X-axis direction. The path width of the path L4 is approximately the same as the width of one block B, i.e., the character length. Therefore, the character C located in the path L4 is movable in the Y-axis direction (up-down direction), but cannot move in the X-axis direction (left-right direction) because there is no space to move. The path L4 is connected to the path L1 extending in the X-axis direction at the connection point P2. A block B is arranged above the connection point P2, and the character C, which has moved upward in the path L4, cannot move to an area above the connection point P2. That is, the path L4 is terminated at the connection point P2.

In the following embodiments, the moving direction of the character C is indicated by a dotted arrow, but such an arrow need not be displayed on the actual display screen. In FIG. 1 and other drawings, for convenience of explanation, multiple characters C (characters C1 to C3 in FIG. 1) are sometimes illustrated in the game space G, but during actual game play, in principle, only one character C is displayed in the game space G. Thus, the number of characters C for which a movement is instructed by way of an operation region R described below is one.

The operation region R is set on the touch panel 11. The operation region R is an example of a region for accepting an operation from the user. The operation region R is also referred to as a virtual pad. The operation region R is provided in such a manner that the user can visually recognize the operation region R on the touch panel 11 in order to input an instruction concerning the game. In the present embodiment, the operation region R is, for example, a circular region centered on a reference point Q.

It is to be noted that the operation region R may be a virtual region for inputting an instruction concerning the game, the virtual region being provided in such a manner in which the operation region R is not visually recognized by the user on the touch panel 11. In this case, for example, a controller 130, which will be described later, may display only the reference point Q and detect a touch operation in the vicinity thereof as an input to the operation region R.

The position of the operation region R on the touch panel 11 may be fixed or variable. In a case in which the position of the operation region R is variable, the controller 130, which will be described later, may, for example, hide the operation region R when the user's finger is released from the touch panel 11, and again display the operation region R, based on the touched location as the reference point Q when the user's finger touches the touch panel 11 from the released state.

In the present embodiment, the operation region R is used for inputting an instruction (hereinafter referred to as "moving direction instruction") concerning the moving direction of the character C in the game space G. In the First Embodiment, it is assumed that the moving direction acceptable in the operation region R is limited to four directions along the X-axis or the Y-axis, i.e., the up direction, the down direction, the left direction, and the right direction. Therefore, there are four types of moving direction instructions including an upward movement instruction for moving the character C upward, a downward movement instruction for moving the character C downward, a leftward movement instruction for moving the character C leftward, and a rightward movement instruction for moving the character C rightward.

In the present embodiment, direction indicators F1 to F4 (see FIG. 3) serving as guides for the up, down, left, and right directions are displayed in the operation region R. The user touches a location corresponding to a desired moving direction in the operation region R using the direction indicators F1 to F4 as guides, thereby inputting a moving direction instruction. As described later, a touch to the operation region R is accepted in the form of one of the upward movement instruction, downward movement instruction, leftward movement instruction, and rightward movement instruction. The input of the moving direction instruction is performed by way of, for example, a thumb of the user.

As described above, in the First Embodiment, the moving direction of the character C is restricted by two factors: (1) an environment in the game space G (e.g., the arrangement of blocks B), and (2) a moving direction acceptable in the operation region R.

Figure 2A:
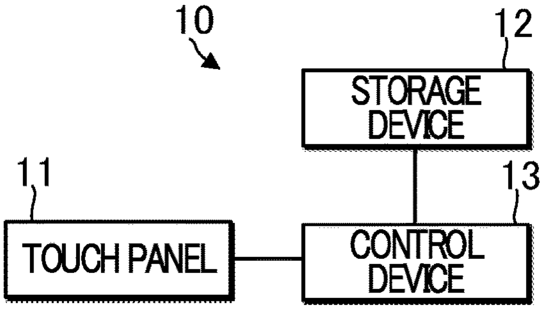
FIG. 2A is a block diagram illustrating an example of a hardware configuration of an information processing apparatus 10 according to the First Embodiment.

FIG. 2A is a block diagram illustrating an example hardware configuration of an information processing apparatus 10 according to the First Embodiment. The information processing apparatus 10 includes a storage device 12 and a control device 13 in addition to the touch panel 11 described above.

The storage device 12 is an example of a recording medium readable by a computer such as a processor (e.g., a non-transitory computer-readable recording medium). The non-transitory recording medium includes a non-volatile or volatile recording medium. The storage device 12 stores programs executable by the control device 13 (the above-described game application program) and various types of data used by the control device 13. For example, the storage device 12 is constituted by a known recording medium, such as a magnetic recording medium or a semiconductor recording medium, or a combination of multiple types of recording media.

The control device 13 is a processor such as a Central Processing Unit (CPU). The control device 13 comprehensively controls the respective element of the information processing apparatus 10. The control device 13 functions as the controller 130 illustrated in FIG. 2B by executing programs stored in the storage device 12.

Figure 2B:
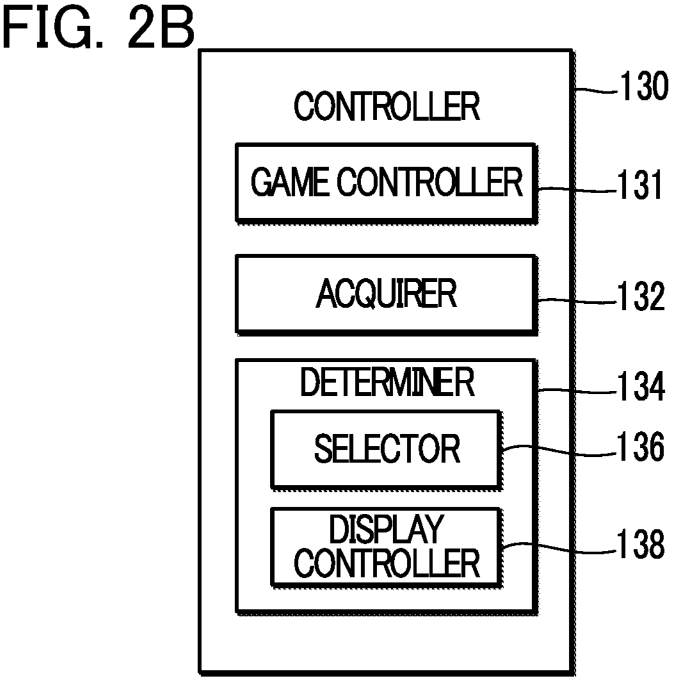
FIG. 2B is a block diagram illustrating an example of a functional configuration of a controller 130 according to the First Embodiment.

FIG. 2B is a block diagram illustrating an example functional configuration of the controller 130 according to the First Embodiment. The controller 130 includes a game controller 131, an acquirer 132, a determiner 134, a selector 136, and a display controller 138. It is to be noted that some or all of the functions of the controller 130 may be realized by dedicated electronic circuitry.

The game controller 131 controls the progress of the game. For example, the game controller 131 moves the character C in the game space G in accordance with the moving direction determined by the determiner 134, which will be described later. Furthermore, the game controller 131 generates game image information indicating an image depending on the progress of the game, and displays the image on the touch panel 11.

The acquirer 132 acquires touch location information indicating a touch location on the touch panel 11. As described above, the touch panel 11 outputs the touch location information in the form of coordinate information on the XY plane. Therefore, the acquirer 132 acquires the coordinate information of a touch location output from the touch panel 11.

The determiner 134 determines the moving direction of the character C based on the touch location information acquired by the acquirer 132. As described above, in the First Embodiment, the moving direction of the character C is limited to the four directions including the up direction, down direction, left direction, and right direction. Therefore, the determiner 134 determines the moving direction of the character C to be one of the up direction, down direction, left direction, and right direction, based on the touch location in the operation region R.

Figure 3:
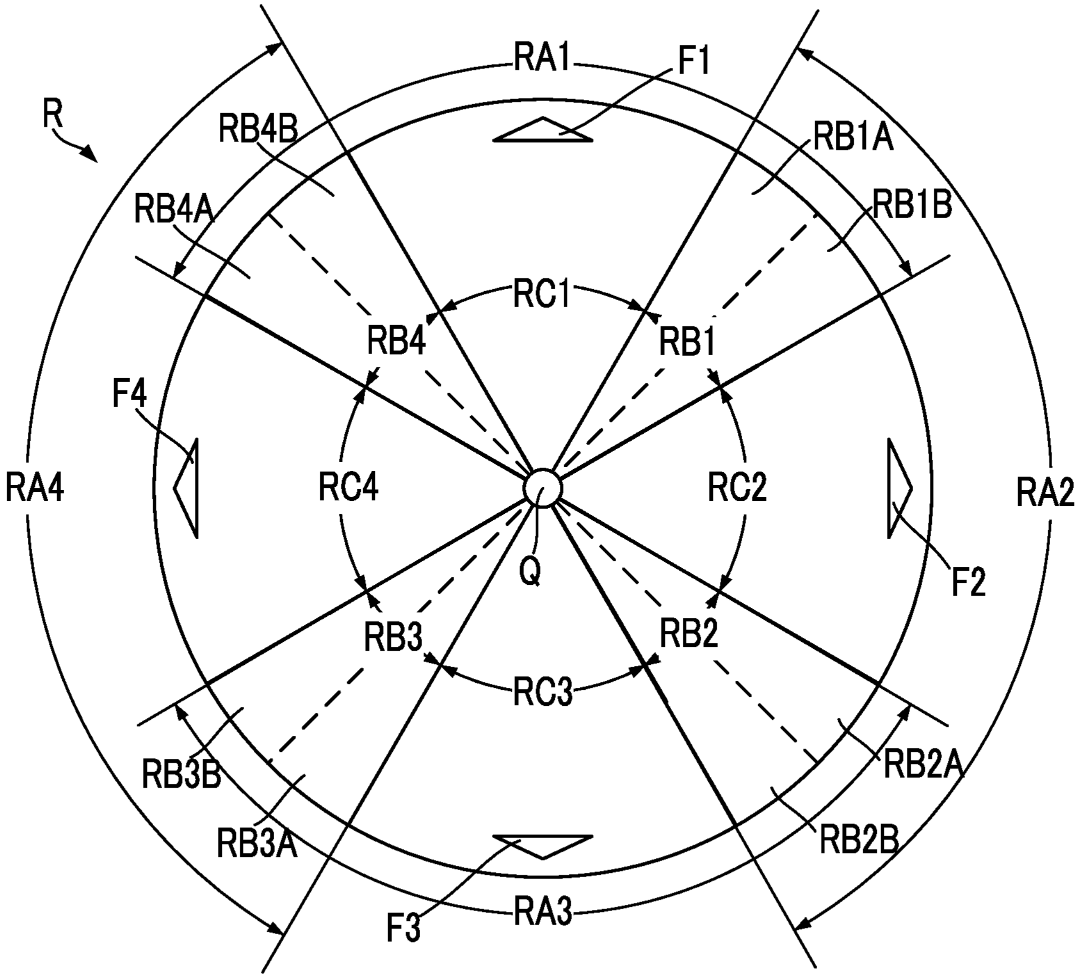
FIG. 3 is a diagram illustrating a relationship between an operation region R and a moving direction according to the First Embodiment.

FIG. 3 is a diagram illustrating a relationship between the operation region R and moving directions in the First Embodiment. The operation region R includes the reference point Q, an up-direction region RA1, a right-direction region RA2, a down-direction region RA3, and a left-direction region RA4. Hereinafter, the up-direction region RA1, the right-direction region RA2, the down-direction region RA3, and the left-direction region RA4 may each be referred to as a “direction region RA”. The reference point Q is a point serving as a reference for the position of the operation region R. In the present embodiment, the reference point Q is illustrated as a circle having a predetermined area, for sake of visibility. The reference point Q is set at, for example, a position corresponding to the center of gravity of the operation region R. The reference point Q may be set at a position different from the position corresponding to the center of gravity of the operation region R.

The up-direction region RA1 is set above the reference point Q on the touch panel 11, and the right-direction region RA2 is set to the right of the reference point Q, the down-direction region RA3 is set below the reference point Q, and the left-direction region RA4 is set to the left of the reference point Q. The up direction of the game space G is associated with the up-direction region RA1, the right direction of the game space G is associated with the right-direction region RA2, the down direction of the game space G is associated with the down-direction region RA3, and the left direction of the game space G is associated with the left-direction region RA4.

Here, the direction regions RA1 to RA4 each have a shape of a circular sector with a central angle around the reference point Q and an outer edge of the operation region R as an arc. The central angle of the circular sector is greater than an angle obtained by equally dividing the angle of 360 degrees into four parts, i.e., 90 degrees. In the present embodiment, the central angle of the respective direction region RA1 to RA4 is set to 120 degrees. Therefore, there are formed overlapping regions RB (RB1, RB2, RB3, and RB4) in which the adjacent direction regions RA overlap each other. Specifically, configured in the upper right of the reference point Q is an overlapping region RB1 in which the up-direction region RA1 and the right-direction region RA2 overlap one over the other. In the lower right of the reference point Q, an overlapping region RB2 is configured in which the right-direction region RA2 and the down-direction region RA3 overlap one over the other. In the lower left of the reference point Q, an overlapping region RB3 is configured in which the down-direction region RA3 and the left-direction region RA4 overlap one over the other. In the upper left of the reference point Q, an overlapping region RB4 is configured in which the left-direction region RA4 and the up-direction region RA1 overlap one over the other.

Each of the overlapping regions RB is associated with two directions that are the same as those of two direction regions RA overlapping in the respective overlapping region. That is, each of the overlapping regions RB is associated with two directions. For example, the overlapping region RB1 is associated with the up direction and the right direction. Similarly, the overlapping region RB2 is associated with the right direction and the down direction, the overlapping region RB3 is associated with the down direction and the left direction, and the overlapping region RB4 is associated with the left direction and the up direction.

Of the up-direction region RA1, the right-direction region RA2, the down-direction region RA3, and the left-direction region RA4, regions other than the overlapping regions RB1, RB2, RB3, and RB4, i.e., regions that do not overlap another direction region RA are referred to as non-overlapping regions RC (RC1, RC2, RC3, and RC4). Since the non-overlapping region RC1 is a part of the up-direction region RA1, the up direction is associated with the non-overlapping region RC1. Similarly, the right direction is associated with the non-overlapping region RC2, the down direction is associated with the non-overlapping region RC3, and the left direction is associated with the non-overlapping region RC4.

That is, the up-direction region RA1 includes the non-overlapping region RC1, the overlapping region RB1 overlapping the right-direction region RA2, and the overlapping region RB4 overlapping the left-direction region RA4. The right-direction region RA2 includes the non-overlapping region RC2, the overlapping region RB1 overlapping the up-direction region RA1, and the overlapping region RB2 overlapping the down-direction region RA3. The down-direction region RA3 includes the non-overlapping region RC3, the overlapping region RB2 overlapping the right-direction region RA2, and the overlapping region RB3 overlapping the left-direction region RA4. The left-direction region RA4 includes the non-overlapping region RC4, the overlapping region RB3 overlapping the down-direction region RA3, and the overlapping region RB4 overlapping the up-direction region RA1.

The overlapping regions RB1 to RB4 are further divided into two regions. In the present embodiment, for example, the central angle of the overlapping region RB1 is divided into two equal parts, whereby the overlapping region RB1 is divided into an overlapping region RB1A adjoining the non-overlapping region RC1, and an overlapping region RB1B adjoining the non-overlapping region RC2. The central angle of the overlapping region RB2 is divided into two equal parts, whereby the overlapping region RB2 is divided into an overlapping region RB2A adjoining the non-overlapping region RC2, and an overlapping region RB2B adjoining the non-overlapping region RC3. The central angle of the overlapping region RB3 is divided into two equal parts, whereby the overlapping region RB3 is divided into an overlapping region RB3A adjoining the non-overlapping region RC3, and an overlapping region RB3B adjoining the non-overlapping region RC4. The central angle of the overlapping region RB4 is divided into two equal parts, whereby the overlapping region RB4 is divided into an overlapping region RB4A adjoining the non-overlapping region RC4, and an overlapping region RB4B adjoining the non-overlapping region RCL.

The boundaries of the respective regions (the direction regions RA, the overlapping regions RB, and the non-overlapping regions RC) in the operation region R shown in FIG. 3 may be virtually configured in a manner that is not visually recognized by the user on the touch panel 11, or may be displayed in a manner visually recognizable by the user.

Next, the determination of the moving direction based on the touch location will be described in detail. The determiner 134 determines the moving direction of a character C based on a touch location in the operation region R and the shape of a path L in which the character C is located. It is to be noted that the shape of the path L in which the character C is located, i.e., the shape of a movable area or the shape of a non-movable area in the game space G, is acquired by referring to the map data of the game space G included in the application program of the game, for example. In the map data, there are recorded at least the shapes of paths L in the game space G, in other words, the arrangement of blocks B in the game space G. In a case in which the shape of a path L in the game space G changes, such as when a block B disappears, the map data is also updated accordingly. For example, the determiner 134 refers to the map data of a predetermined range from the current location of the character C in the game space G, to acquire information on the shape of a path L in which the character C is located.

In the following, a case in which the touch location is in the non-overlapping region RC (Scenario 1) and a case in which the touch location is in the overlapping region RB (Scenario 2) will be described separately.

Scenario 1-1: Case in which (i) and (ii) are Both Satisfied: (i) a Touch Location is in the Non-Overlapping Region RC; and (ii) there is a Path Extending in a Direction Corresponding to the Touched Non-Overlapping Region RC.

In a case in which (i) a touch location is in the non-overlapping region RC and in which (ii) there is a path extending in the direction corresponding to the touched non-overlapping region RC, the determiner 134 determines the moving direction of the character C to be a direction associated with the touched non-overlapping region RC. For example, in a case in which the touch location is in the non-overlapping region RC1 and in which the character C is located in a path L extending in at least the up direction (which may be the up-down direction), the determiner 134 determines the moving direction of the character C to be the up direction. In a case in which the touch location is in the non-overlapping region RC2 and the character C is located in a path L extending in at least the right direction (which may be the left-right direction), the determiner 134 determines the moving direction of the character C to be the right direction. It is to be noted that the character C being located in the path L extending in a predetermined direction means, for example, that there is no block B at a position less than the minimum moving distance from the location of the character C in the predetermined direction.

More specifically, Scenario 1-1 corresponds to, for example, a case in which the non-overlapping region RC1 is touched when the current location of the character C is in the path L2 (other than the connection point P1) in FIG. 1. The non-overlapping region RC1 is associated with the up direction and the path L2 extends in the up direction except for the connection point P1. Therefore, the character C is movable in the up direction along the path L2. Accordingly, the determiner 134 determines the moving direction of the character C to be the up direction. Furthermore, Scenario 1-1 corresponds to, for example, a case in which the non-overlapping region RC2 is touched when the current location of the character C is in the path L1 in FIG. 1. Since the non-overlapping region RC2 is associated with the right direction and the path L1 extends in the right direction, the character C is movable in the right direction along the path L1. Accordingly, the determiner 134 determines the moving direction of the character C to be the right direction.

As described in the foregoing, in Scenario 1-1, in a case in which the touch location indicated by the touch location information is in a first region, the determiner 134 determines the movement of the character C to be a first direction, the character C being located in a first path that is in the first direction in the game space G. Furthermore, in Scenario 1-1, in a case in which the touch location indicated by the touch location information is in a second region partially overlapping the first region, the determiner 134 determines the movement of the character C to be a second direction, the character C being located in a second path that is in the second direction in the game space G. When applied to the example using FIG. 1, the first region corresponds to the up-direction region RA1, the first direction corresponds to the up direction, the first path corresponds to the path L2, the second region corresponds to the right-direction region RA2, the second direction corresponds to the right-direction region, and the second path corresponds to the path L1.

In the example using FIG. 1, the first region and the second region correspond to a combination of the up-direction region RA1 and the right-direction region RA2. However, the first region and the second region may be a combination of the right-direction region RA2 and the down-direction region RA3, may be a combination of the down-direction region RA3 and the left-direction region RA4, or may be a combination of the left-direction region RA4 and the up-direction region RA1, for example.

In the example using FIG. 1, a case is described in which the first region is the up-direction region RA1, the first direction is the up direction, the second region is the right-direction region RA2, and the second direction is the right direction. However, for example, the first region may be the right-direction region RA2, the first direction may be the right direction, the second region may be the up-direction region RA1, and the second direction may be the up direction. That is, one of the two direction regions RA sharing an overlapping region RB may be defined as the first region, the other may be defined as the second region, a direction associated with the first region may be defined as the first direction, and a direction associated with the second region may be defined as the second direction.

Scenario 1-2: Case in which (i) and (ii) are Both Satisfied: (i) the Touch Location is in the Non-Overlapping Region RC; and (ii) there is No Path Extending in a Direction Corresponding to the Touched Non-Overlapping Region RC.

In a case in which (i) the touch location is in the non-overlapping region RC and in which (ii) there is no path extending in the direction corresponding to the touched non-overlapping region RC, the determiner 134 determines to stop the character C from moving. For example, in a case in which the non-overlapping region RC1 is touched when the current location of the character C is in the path L1 of FIG. 1, the direction corresponding to the touch location is the up direction. However, the path L1 extends in the left-right direction, and the path width is the same as the character length. Therefore, the character C cannot move in the up-down direction. Accordingly, the determiner 134 determines not to have the character C move, i.e., to stop the movement. At this time, the game controller 131 may generate an error sound, for example, or may display a part or parts (e.g., legs) of the character C moving without shifting the position in itself of the character C. The character C remains unmoved because the movement of the character C is restricted by the shape of the path L. The character C remains unmoved also for facilitating the user's understanding of a possible erroneous operation.

As described above, in Scenario 1-2, the determiner 134 determines to stop the movement of an object in a case in which (i) and (ii) are both satisfied: (i) a touch location indicated by the touch location information is in a first region; and (ii) the object is blocked from moving in the first direction of the game space G. When applied to the example using FIG. 1, the first region corresponds to the up-direction region RA1, and the first direction corresponds to the up direction.

Scenario 2: Case in which the Touch Location is in the Overlapping Region RB.

As described above, each of the overlapping regions RB is associated with two directions. Therefore, in a case in which the touch location is in the overlapping region RB, the determiner 134 determines the moving direction of the character C to be one of the two directions associated with the touched overlapping region RB.

Scenario 2-1: Case in which the Extending Direction of the Path L when the Character C is Located is Only One or the Other of the Two Directions Associated with the Overlapping Region RB in which the Touch Location is Present.

In a case in which the extending direction of the path L in which the character C is located is only one or the other of the two directions associated with the overlapping region RB in which the touch location is present, the determiner 134 determines the moving direction of the character C to be the extending direction of the path L. Specifically, Scenario 2-1 corresponds to, for example, a case in which the touch location is in the overlapping region RB1 and the location of the character C is either in the path L2 (other than the connection point P1 with the path L1) in FIG. 1 or in the path L1 in FIG. 1. In a case in which the location of the character C is in the path L2, the extending direction of the path L2 is the up direction only, among the up direction and the right direction associated with the overlapping region RB1. Accordingly, the determiner 134 determines the moving direction of the character C to be the up direction. In a case in which the location of the character C is in the path L1, the extending direction of the path L is the right direction only, among the up direction and the right direction associated with the overlapping region RB1.

Accordingly, the determiner 134 determines the moving direction of the character C to be the right direction. Unlike Scenario 2-2, described later, in Scenario 2-1, the moving direction is determined regardless of the touch location in the overlapping region RB.

As described above, in Scenario 2-1, in a case in which the touch location indicated by the touch location information is in a first region, the determiner 134 determines the movement of the character C to be a first direction, the character C being located in a first path that is in the first direction in the game space G. Furthermore, in Scenario 2-1, in a case in which the touch location indicated by the touch location information is in a second region partially overlapping the first region, the determiner 134 determines the movement of the character C to be a second direction, the character C being located in the second path that is in the second direction in the game space G. When applied to the example using FIG. 1, the first region corresponds to the up-direction region RA1, the first direction corresponds to the up direction, the first path corresponds to the path L2, the second region corresponds to the right-direction region RA2, the second direction corresponds to the right-direction region, and the second path corresponds to the path L1.

In the example using FIG. 1, the first region and the second region correspond to a combination of the up-direction region RA1 and the right-direction region RA2. However, the first region and the second region may correspond to a combination of the right-direction region RA2 and the down-direction region RA3, a combination of the down-direction region RA3 and the left-direction region RA4, or a combination of the left-direction region RA4 and the up-direction region RA1, for example.

Furthermore, in the example using FIG. 1, a case is described in which the first region is the up-direction region RA1, the first direction is the up direction, the second region is the right-direction region RA2, and the second direction is the right direction. However, for example, the first region may be the right-direction region RA2, the first direction may be the right direction, the second region may be the up-direction region RA1, and the second direction may be the up direction. That is, one of the two direction regions RA sharing an overlapping region RB may be defined as the first region, the other may be defined as the second region, a direction associated with the first region may be defined as the first direction, and a direction associated with the second region may be defined as the second direction.

Scenario 2-2: Case in which the Extending Directions of the Path L in which the Character C is Located Includes Both of the Two Directions Associated with the Overlapping Region RB in which the Touch Location is Present.

In a case in which the extending directions of the path L in which the character C is located includes both of the two directions associated with the overlapping region RB in which the touch location is present, the determiner 134 determines the moving direction of the character C based on the touch location in the overlapping region RB. Specifically, the determiner 134 determines the moving direction of the character C to be a direction associated with a non-overlapping region RC closer to the touch location, from among the non-overlapping regions RC adjoining the overlapping region RB.

Scenario 2-2 corresponds to, for example, a case in which the touch location is in the overlapping region RB2 and the location of the character C is at the connection point P1 of the path L1 and L2 in FIG. 1. At the connection point P1, the character C is movable in the right direction, the left direction, and the down direction. The right direction and the down direction are associated with the overlapping region RB2. Therefore, the question is whether the moving direction of the character C should be in the right direction or the down direction.

In this case, the determiner 134 determines to which one of the non-overlapping region RC2 and the non-overlapping region RC3, the touch location in the overlapping region RB2 is closer. The non-overlapping region RC2 and the non-overlapping region RC3 are regions adjoining the overlapping region RB2. Specifically, in a case in which the touch location is in the overlapping region RB2A, which adjoins the non-overlapping region RC2, the determiner 134 determines the moving direction of the character C to be the right direction. In a case in which the touch location is in the overlapping region RB2B, which adjoins the non-overlapping region RC3, the determiner 134 determines the moving direction of the character C to be the down direction. By so doing, it is possible to move the character C in a manner that accurately reflects the intention of the user.

That is, in a case in which the touch location indicated by the touch location information is in the overlapping region of a first region and a second region, the determiner 134 divides the overlapping region RB into a first overlapping region, which is a part of the first region, and a second overlapping region, which is a part of the second region. The first overlapping region adjoins a first non-overlapping region and does not overlap the second region. The second overlapping region adjoins a second non-overlapping region and does not overlap the first region. The determiner 134 selects a first direction as the moving direction of the character C at the connection point P in a case in which the touch location is in the first overlapping region, and selects a second direction as the moving direction of the character C at the connection point P in a case in which the touch location is in the second overlapping region. When applied to the example using FIG. 1, the first region corresponds to the right-direction region RA2, the second region corresponds to the down-direction region RA3, the overlapping region RB corresponds to the overlapping region RB2, the first non-overlapping region corresponds to RC2, the first overlapping region corresponds to RB2A, the second non-overlapping region corresponds to RC3, the second overlapping region corresponds to RB2B, the connection point P corresponds to the connection point P1, the first direction corresponds to the right direction, and the second direction corresponds to the down direction.

In other words, in a case in which (i) and (ii) are both satisfied: (i) a direction region RA corresponding to the first direction and another direction region RA corresponding to the second direction overlap in the overlapping region RB; and (ii) at the connection point P the extending directions of the path L in which the character C is movable include two directions, namely, the first direction and the second direction, the determiner 134 determines the moving direction to be the first direction if the touch location is close to a non-overlapping region RC corresponding to the first direction. The determiner 134 determines the moving direction to be the second direction if the touch location is close to the other non-overlapping region RC corresponding to the second direction.

For example, there is a case in which (i) and (ii) are both satisfied: (i) the character C3 is located at a position (in which the character is movable upward, downward, and leftward) as shown in FIG. 1; and (ii) the overlapping region RB3 (corresponding to the down direction and the left direction) is touched. In this case also, the determiner 134 may determine the moving direction of the character C in the above-described manner.

In the example using FIG. 1, the first region and the second region correspond to a combination of the right-direction region RA2 and the down-direction region RA3. However, for example, the first region and the second region may be a combination of the up-direction region RA1 and the right-direction region RA2, a combination of the down-direction region RA3 and the left-direction region RA4, or a combination of the left-direction region RA4 and the up-direction region RA1.

Furthermore, in the example using FIG. 1, the first region is the right-direction region RA2, the first direction is the right direction, the second region is the down-direction region RA3, and the second direction is the lower direction. However, for example, the first region may be the down-direction region RA3, the first direction may be the down direction, the second region may be the right-direction region RA2, and the second direction may be the right direction. That is, one of the two direction regions RA sharing an overlapping region RB may be defined as the first region, the other may be defined as the second region, a direction associated with the first region may be defined as the first direction, and a direction associated with the second region may be defined as the second direction.

Scenario 2-3: Case in which None of the Two Directions Associated with the Overlapping Region RB in which the Touch Location is Present is the Same as the Extending Direction of the Path L in which the Character C is Located.

In a case in which the extending direction of the path L in which the character C is located does not include any of the two directions associated with the overlapping region RB in which the touch location is located, the determiner 134 determines to stop the moving of the character C. For example, in a case in which the overlapping region RB4 is touched when the current location of the character C is at the connection point P2 of FIG. 1, directions corresponding to the touch location comprise the left direction and the up direction. However, at the connection point P2, the path L1 extends only in the right direction, and the path L4 extends only in the down direction. Thus, there is no path extending in the direction corresponding to the touch location. Accordingly, the determiner 134 determines to not have the character C move, i.e., to stop the movement. At this time, similarly to Scenario 1-2, the game controller 131 may generate an error sound, for example, or may display a part or parts (e.g., legs) of the character C moving without shifting the position in itself of the character C. The character C remains unmoved because the movement of the character C is restricted by the shape of the path L. The character C remains unmoved also for facilitating the user's understanding of a possible erroneous operation.

As described in the foregoing, in Scenario 2-3, the determiner 134 determines to stop the movement of an object based on satisfying both (i) and (ii): (i) the touch location indicated by the touch location information is in the overlapping region between a first region and a second region; and (ii) the movement of the object in the first direction and the second direction in the game space G is blocked. When applied to the example using FIG. 1, the first region corresponds to the up-direction region RA1, the second region corresponds to the left-direction region RA4, the overlapping region between the first region and the second region corresponds to the overlapping region RB4, the first direction corresponds to the up direction, and the second direction corresponds to the left direction.

In the example using FIG. 1, the first region and the second region comprise a combination of the up-direction region RA1 and the left-direction region RA4. However, for example, the first region and the second region may comprise a combination of the up-direction region RA1 and the right-direction region RA2, a combination of the right-direction region RA2 and the down-direction region RA3, or a combination of the down-direction region RA3 and the left-direction region RA4.

Furthermore, in the example using FIG. 1, a case is described in which the first region is the up-direction region RA1, the first direction is the up direction, the second region is the left-direction region RA4, and the second direction is the left direction. However, for example, the first region may be the left-direction region RA4, the first direction may be the left direction, the second region may be the up-direction region RA1, and the second direction may be the up direction. That is, one of the two direction regions RA sharing an overlapping region RB may be defined as the first region, the other may be defined as the second region, a direction associated with the first region may be defined as the first direction, and a direction associated with the second region may be defined as the second direction.

The determiner 134 further functions as a selector 136 and a display controller 138 (see FIG. 2B). In a case in which there is a connection point P connecting to another path L in an area in the moving direction of the character C, the selector 136 selects the moving direction of the character C at the connection point P based on the touch location information. The selector 136 refers to the map data of the game space G included in the application program of the game, for example. For example, the determiner 134 refers to the map data of a predetermined range from the current location of the character C in the game space G, and determines whether or not there is a connection point P with another path L in an area in the moving direction of the character C. The predetermined range may be freely decided. However, the predetermined range may be, for example, a range of the game space G currently displayed on the touch panel 11, may be within a predetermined distance in the game space G from the current location of the character C, or may be a range reachable by the character C within a predetermined time when the character C moves in the path L at a moving speed defined in the game.

The selector 136 selects the moving direction at the connection point P for the character C, assuming that the current touch location is continued until the character C reaches the connection point P. The method of selecting the moving direction by the selector 136 is the same as the method of determining the moving direction by the determiner 134 described above, i.e., Scenarios 1-1, 1-2, 2-1, 2-2, and 2-3. In a case in which the touch location is changed before the character C reaches the connection point P, the selector 136 may again select the moving direction at the connection point P for the character C based on the changed touch location.

The display controller 138 displays in the game space G an image (hereinafter, referred to as a "selection result image") indicating a selection result by the selector 136. The selection result image may be, for example, an icon indicating a path selected by the selector 136.

Figure 4:
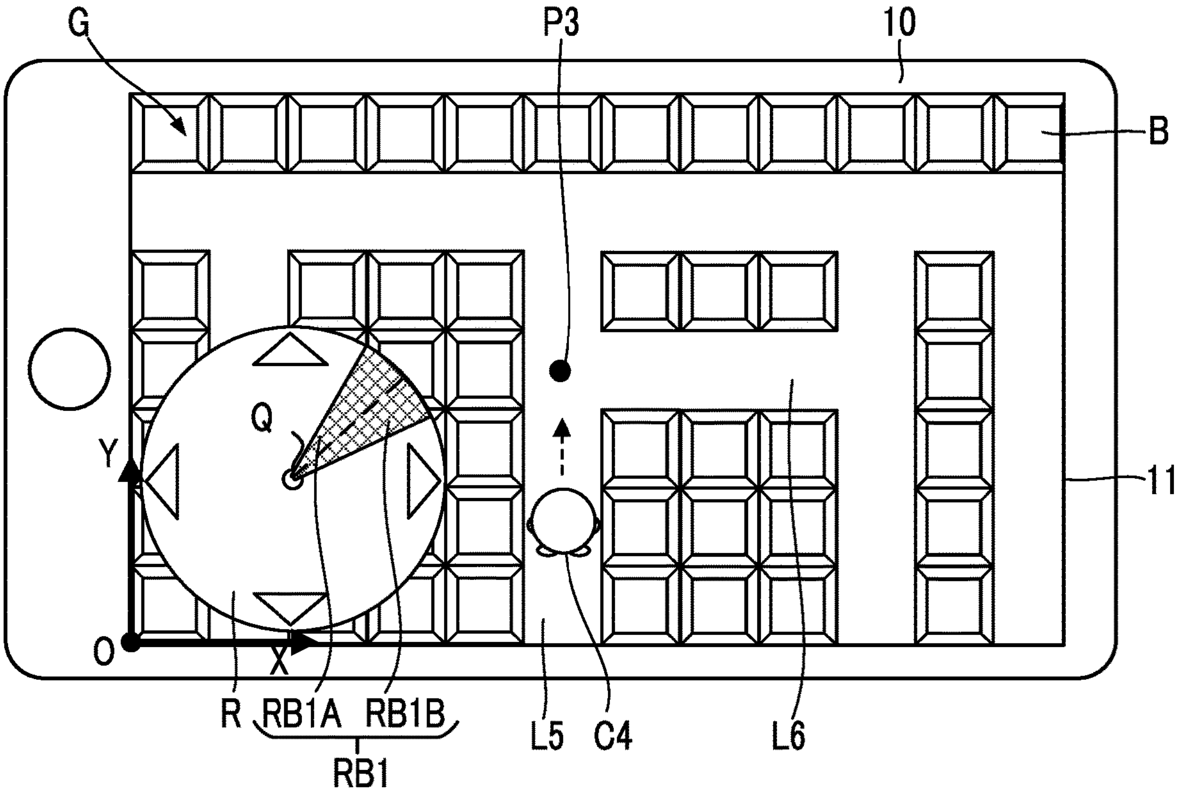
FIG. 4 is a diagram illustrating an example display on the touch panel 11 according to the First Embodiment.
Figure 5:
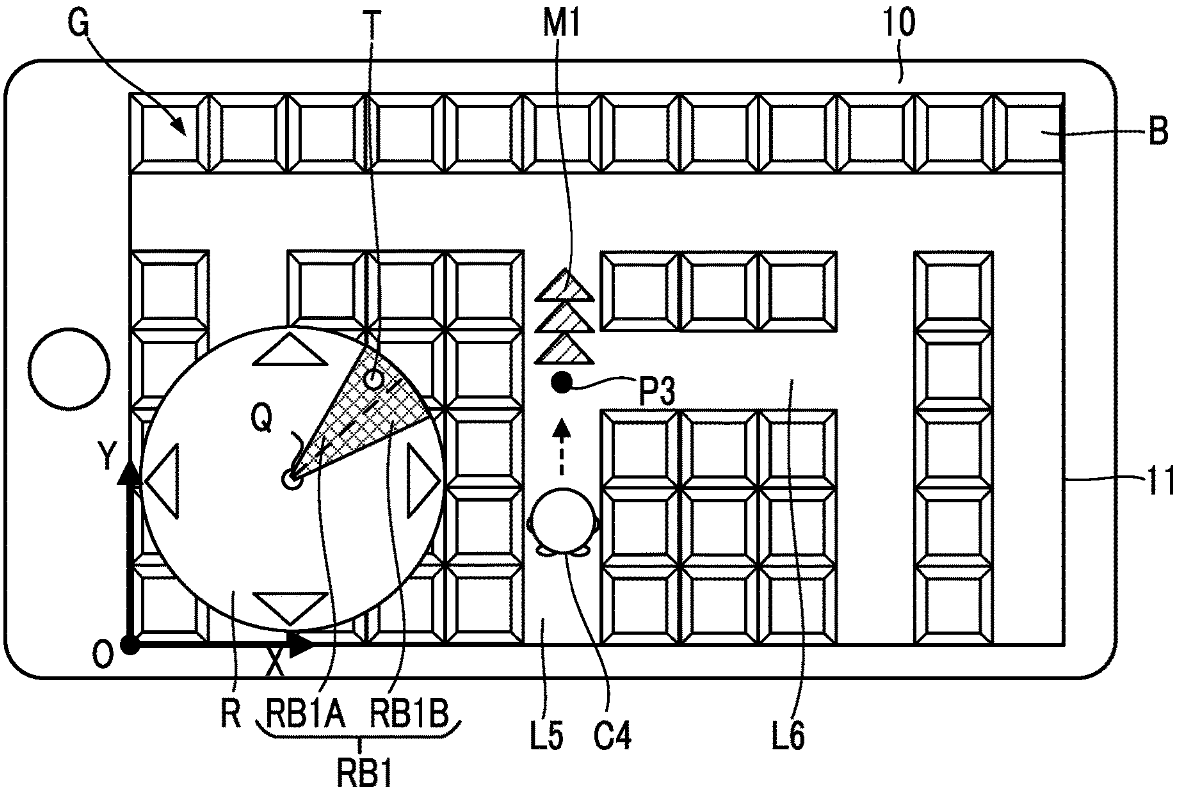
FIG. 5 is a diagram illustrating an example display on the touch panel 11 according to the First Embodiment.
Figure 6:
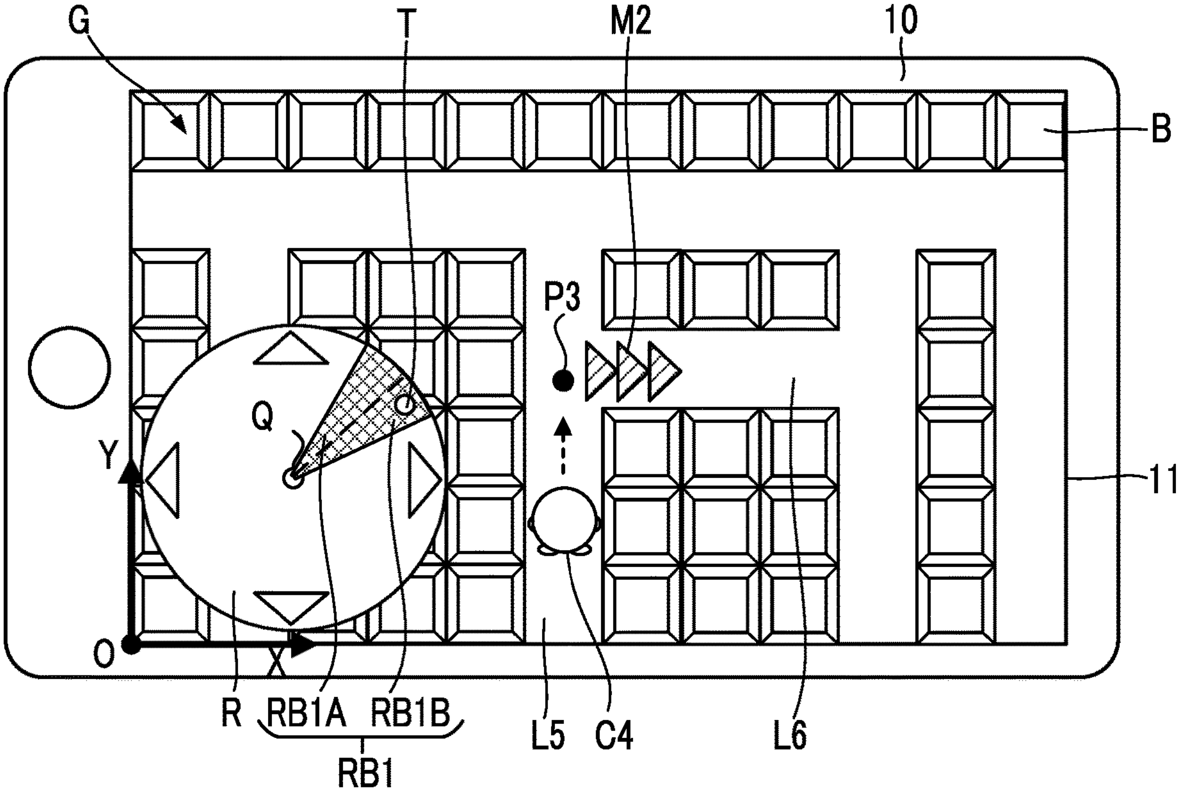
FIG. 6 is a diagram illustrating an example display on the touch panel 11 according to the First Embodiment.

FIGS. 4 to 6 are diagrams illustrating examples of the display on the touch panel 11 according to the First Embodiment. On the touch panel 11 illustrated in FIG. 4, there is displayed an area, of the game space G, including a path L5 extending in the Y-axis direction (up-down direction), a path L6 extending in the X-axis direction (left-right direction), and a connection point P3 of the path L5 and the path L6. The respective path width of the path 5 and the path L6 is equal to the character length, and the character C cannot move in the path width direction in the path 5 or the path L6. Furthermore, a block B is arranged on the left side of the connection point P3, and the character C having moved leftward in the path L6 cannot move further to the left of the connection point P3. That is, the path L6 is terminated at the connection point P3.

Here, as illustrated in FIG. 4, it is assumed that the character C4 is located below the connection point P3 of the path L5, and the touch location is located at a position in the overlapping region RB1 indicated by the shading. In this case, the determiner 134 determines the moving direction of the character C4 to be the up direction in accordance with Scenario 2-1. That is, since the path L5 in which the character C4 is located extends in the up-down direction and also since the overlapping region RB1, which is the touch location, is associated with the up direction and the right direction, the determiner 134 determines the moving direction of the character C to be the up direction.

There is a connection point P3 of the path L5 and the path L6 in the moving direction (up direction) of the character C4 determined by the determiner 134. For example, Scenario 2-2 will apply in a case in which the touch location by the user remains in the overlapping region RB1, and the character C4 moves either in the up direction or in the right direction at connection point P3. However, it would not be easy for the user to anticipate in which direction the character C4 will be moving at the connection point P3 if they continue with the present operation state. If the character C4 moves in a direction not desired by the user at the connection point P3, the operation instructing the moving direction at the connection point P3 will be an erroneous operation for the user. If such erroneous operation occurs, the user may lose time to change the moving direction of the character C4, for example, and may suffer a disadvantage in the progress of the game.

Therefore, in a case in which there is a connection point P with another path L in an area in the moving direction of the character C4, the determiner 134 selects in advance the moving direction based on the current touch location by the selector 136. In addition, the determiner 134, by the display controller 138, displays a selection result image in the game space G prior to the character C4 reaching the connection point P. The user can check the displayed selection result image and determine whether to continue with the current touch location or change the touch location in advance (prior to the character C4 reaching the connection point P), thereby reducing or preventing erroneous operations.

The selector 136 may select the moving direction at the connection point P for the character C based on the touch location information only when the touch location is in the overlapping region RB and when there is a connection point P with another path L in an area in the moving direction of the character C, for example. According to such a configuration, even in a case in which it is relatively difficult to estimate the moving direction at the connection point P based on the touch location being in the overlapping region RB, the user is still able to anticipate the moving direction at the connection point P. Consequently, erroneous operations can be reduced or prevented. Furthermore, for example, in a case in which there is a connection point P in an area in the moving direction of the character C, the user is able to grasp whether the touch location is in the overlapping region RB or is in the non-overlapping region RC based on whether or not a selection result image is displayed.

In the present embodiment, description will be given assuming that the moving direction at the connection point P is selected also in a case in which the touch location is in the non-overlapping region RC.

Specifically, for example, as illustrated in FIG. 5, in a case in which the touch location T is in the overlapping region RB1A, the selector 136 selects the up direction as the moving direction at the connection point P3 for the character C4. This determination is made by applying the above-described Scenario 2-2 in the determiner 134. The display controller 138 displays a mark M1 in the game space G, prior to the character C4 reaching the connection point P3. The mark M1 indicates that the moving direction at the connection point P3 for the character C4 is the up direction. The mark M1 is an example of the selection result image.

In the example of FIG. 5, the mark M1 has a shape in which three triangles are connected along the extending direction of the path L5, with the base of the respective triangle extending along the widthwise direction of the path L5, and the diagonal angle being located above with respect to the base. Such a mark M1 is suggestive of a move in the up direction. Furthermore, in the example of FIG. 5, the mark M1 is displayed at a position in the vicinity of the connection point P3 in the path L5. Displaying the mark M1 in the vicinity of the connection point P3 makes it easier for the user to recognize that the moving direction of the character C4 indicated by the mark M1 is the moving direction at the connection point P3.

By looking at the mark M1, the user is able to recognize that the character C4 will be moving upward at the connection point P3. If the user allows upward movement of the character C4 at the connection point P3, the user should maintain the current touch location T. On the other hand, if the user wishes to move the character C4 to the right at the connection point P3, the user should move the touch location T closer to the non-overlapping region RC2 (see FIG. 3) so that the touch location T enters the overlapping region RB1B.

Furthermore, for example, as illustrated in FIG. 6, in a case in which the touch location T is in the overlapping region RB1B, the selector 136 selects the right direction as the moving direction at the connection point P3 for the character C. This determination is made by applying the above-described Scenario 2-2 in the determiner 134. The display controller 138 displays a mark M2 in the game space G prior to the character C4 reaching the connection point P3. The mark M2 indicates that the moving direction at the connection point P3 for the character C4 is the right direction. The mark M2 is also an example of the selection result image.

In the example of FIG. 6, the mark M2 has a shape in which three triangles are connected along the extending direction of the path L6, with the base of the respective triangle extending along the widthwise direction of the path L6, and the diagonal angle being located to the right with respect to the base. Such a mark M2 is suggestive of a move in the right direction. Furthermore, in the example of FIG. 6, the mark M2 is displayed at a position in the vicinity of the connection point P3 in the path L6. Displaying the mark M2 in the vicinity of the connection point P3 makes it easier for the user to recognize that the moving direction of the character C4 indicated by the mark M2 is the moving direction at the connection point P3.

By looking at the mark M2, the user is able to recognize that the character C4 will be moving rightward at the connection point P3. If the user allows rightward movement of the character C4 at the connection point P3, the user should maintain the current touch location. On the other hand, if the user wishes to move the character C4 upward at the connection point P3, the user should move the touch location closer to the non-overlapping region RC1 (see FIG. 3) so that the touch location enters the overlapping region RB1A.

For example, as shown in FIG. 5, it is assumed that the touch location T is in the overlapping region RB1A. It is also assumed that the user moves the touch location T to the overlapping region RB1B prior to the character C reaching the connection point P3 as a result of the mark M1 indicating upward movement being displayed in the vicinity of the connection point P3 in the path L5. In this case, the selector 136 changes the moving direction at the connection point P3 to the right direction, and the display controller 138 changes the image displayed in the vicinity of the connection point P3 to the mark M2 indicating the movement in the right direction, as shown in FIG. 6.

As described above, in a case in which (i) and (ii) are both satisfied: (i) the touch location indicated by the touch location information is in the overlapping region RB of a first region and a second region; and (ii) there is a connection point P of a first path and a second path in an area in the moving direction of the character C in the game space G, the selector 136 selects based on the touch location information the moving direction at the connection point P for the character C from among a first direction and a second direction. The display controller 138 displays a selection result image in the game space before the character C reaches the connection point. When this is applied to the example using the above FIGS. 4 to 6, the first region corresponds to the up-direction region RA1, the second region corresponds to the right-direction region RA2, the overlapping region of the first region and the second region corresponds to the overlapping region RB1, the area in the moving direction of the character C corresponds to the up direction, the connection point of the first path and the second path corresponds to P3, the first direction corresponds to the up direction, the second direction corresponds to the right direction, and the image indicating the selection result corresponds to the mark M1 or the mark M2.

Furthermore, the overlapping region is divided into a first overlapping region, which is a part of the first region, and a second overlapping region, which is a part of the second region. The first overlapping region adjoins a first non-overlapping region and does not overlap the second region. The second overlapping region adjoins a second non-overlapping region and does not overlap the first region. The selector 136 selects the first direction as the moving direction at the connection point for the character C in a case in which the touch location is in the first overlapping region, and selects the second direction as the moving direction at the connection point for the character C in a case in which the touch location is in the second overlapping region. When this is applied to the examples using the above-described FIGS. 4 to 6, the overlapping region corresponds to the overlapping region RB1, the first region corresponds to the up-direction region RA1, the second region corresponds to the right-direction region RA2, the first non-overlapping region corresponds to the non-overlapping region RC1, the first overlapping region corresponds to the overlapping region RB1A, the second non-overlapping region corresponds to the non-overlapping region RC2, the second overlapping region corresponds to RB1B, the connection point corresponds to the connection point P3, the first direction corresponds to the up direction, and the second direction corresponds to the right direction.

Furthermore, the display controller 138 displays in the game space a selection result image at a position based on the connection point P. The position based on the connection point P may be, for example, a position having a predetermined positional relationship with the connection point P, a position within a range of a predetermined distance or less from the connection point P, or a position in a predetermined direction with respect to the connection point P. Specifically, the position based on the connection point P may be, for example, a position of the connection point in the game space G, a position that is advanced toward the moving direction selected by the selector 136 relative to the connection point P, or a position between the connection point P and the object. Furthermore, the position based on the connection point P may be, for example, a movement restricted space (e.g., on a block) in the vicinity of the connection point P. When this is applied to the examples using the above-described FIGS. 4 to 6, the selection result images correspond to the mark M1 and the mark M2, and the position based on the connection point P corresponds to a point in the path L at the predetermined distance or less from the connection point P3.

It is to be noted that, for example, the selector 136 may select the moving direction at the connection point P for the character C even in a case in which at least one of the extending directions of multiple paths L connected to the connection point P that is in an area in the moving direction of the character C does not match any of the two directions associated with the overlapping region RB in which the touch location is present (e.g., there is a connection point P of a path L extending in the up direction and a path L extending in the left direction when the touch location is in the overlapping region RB1). The selector 136 may select the moving direction at the connection point P for the character C even in a case in which the two directions associated with the overlapping region RB are not included in the extending directions of the multiple paths L connected to the connection point P (e.g., there is a connection point P of a path L extending in the right direction and a path L extending in the left direction when the touch location is in the overlapping region RB1).

Figure 7:
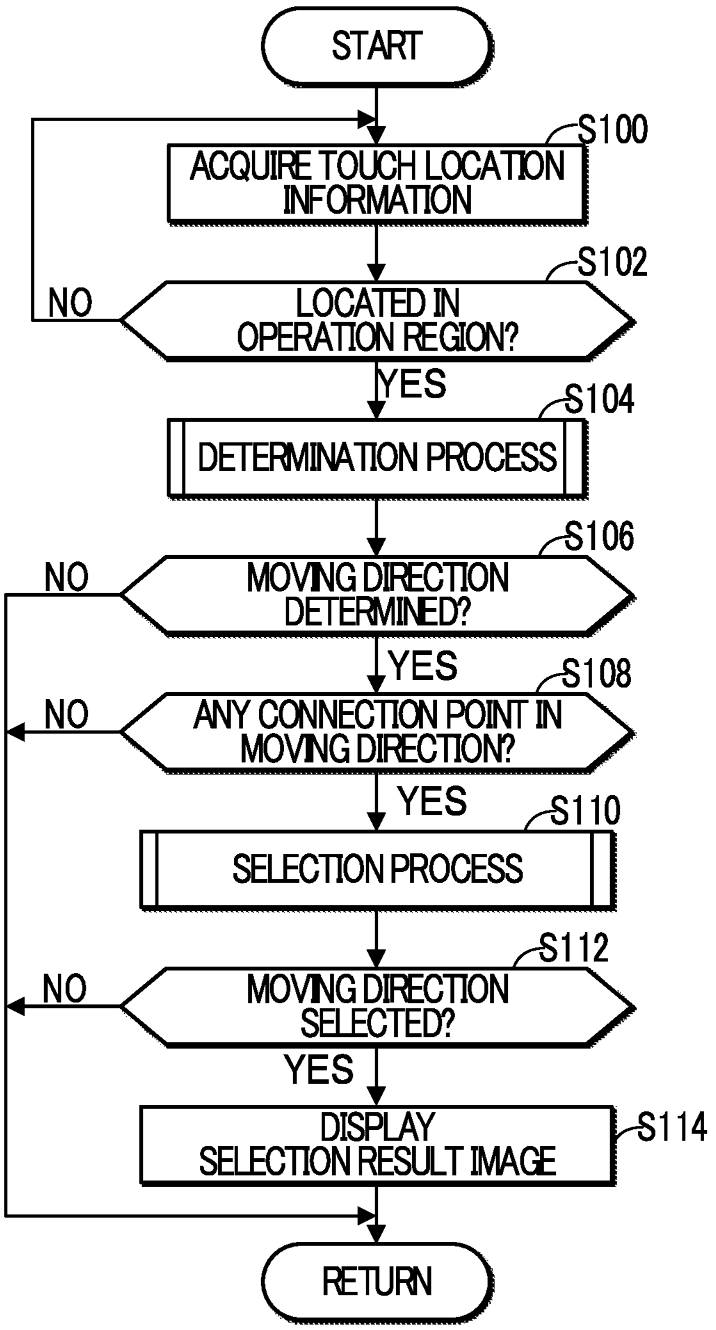
FIG. 7 is a flowchart showing a process of the controller 130 according to the First Embodiment.

Next, an example operation of the controller 130 of the information processing apparatus 10 will be described with reference to FIGS. 7 to 9. The operation illustrated in FIG. 7 is started in response to a predetermined start operation.

The acquirer 132 acquires touch location information indicating a touch location on the touch panel 11 (step S100). In a case in which the touch location indicated by the touch location information is not located in the operation region R (step S102: NO), the controller 130 returns to step S100. When the touch location is located in the operation region R (step S102: YES), the determiner 134 executes a subroutine determination process for determining the moving direction of the character C from the current position (step S104).

Figure 8:
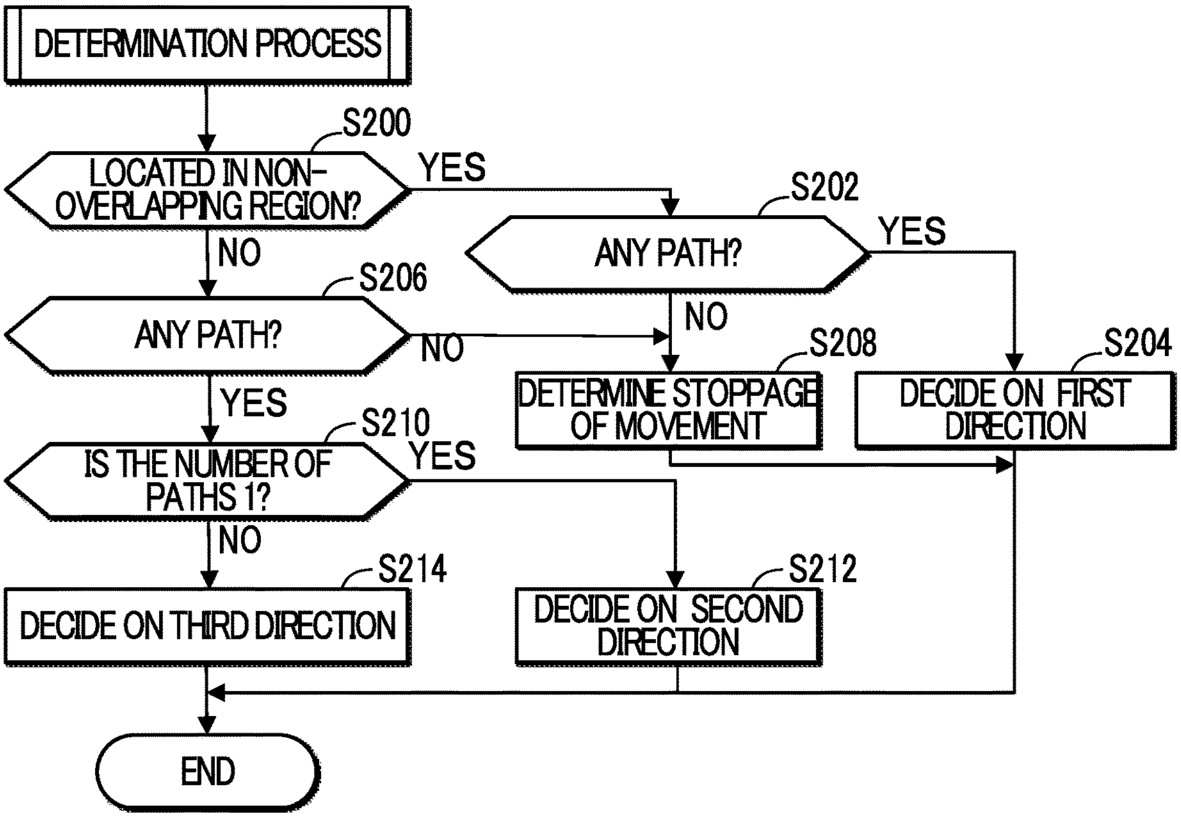
FIG. 8 is a flowchart showing a process of the controller 130 according to the First Embodiment.

FIG. 8 is a flowchart illustrating a procedure of the determination process. The determiner 134 judges whether or not the touch location indicated by the touch location information is located in any of the non-overlapping regions RC of the operation region R (step S200). In a case in which the touch location is located in the non-overlapping region RC (step S200: YES), the determiner 134 judges whether or not there is a path L extending in a direction associated with the touched non-overlapping region RC from the location of the character C (step S202).

In a case in which there is such a path L (step S202: YES), the determiner 134 determines the moving direction of the character C to be a first direction (step S204), and ends the process shown in the flowchart. The first direction is associated with the touched non-overlapping region RC. On the other hand, in a case in which there is no path L (step S202: NO), the determiner 134 determines to stop the moving of the character C from the current position (step S208), and ends the process shown in the flowchart.

In a case in which the touch location is not located in the non-overlapping region RC (step S200: NO), this means that the touch location is located in the overlapping region RB. The determiner 134 judges whether or not there is a path L extending from the location of the character C in at least one of the two directions associated with the touched overlapping region RB (step S206). In a case in which there is no path L (step S206: NO), the determiner 134 determines to stop moving the character C from the current position (step S208), and ends the process shown in the flowchart.

In a case in which there is a path L (step S206: YES), the determiner 134 judges whether or not the number of the paths L is one, i.e., whether there is only a path L extending in one of the two directions associated with the touched overlapping region RB, or whether there are two paths L directed to the two directions (step S210). In a case in which the number of the paths L is one (step S210: YES), the determiner 134 determines the moving direction of the character C to be the second direction (step S212), and ends the process of the flowchart. The second direction is an extending direction of the path L. In a case in which the number of the paths L is not one (step S210: NO), that is, when there are two paths L, the determiner 134 determines the moving direction of the character C to be a third direction (step S214), and ends the process of the flowchart. The third direction is determined based on the touch location in the overlapping region RB. More specifically, the determiner 134 determines the moving direction of the character C to be a direction (third direction) associated with a non-overlapping region RC that is closer to the touch location, from among the two non-overlapping regions RC adjoining the touched overlapping region RB.

When the determination process of step S104 is completed, the game controller 131 moves the character C in the game space G in the determined moving direction in a case in which the moving direction of the character C from the current position is determined in the determination process (steps S204, S212, S214). Furthermore, in a case in which it is determined in the determination process that the movement of the character C is to be stopped (step S208), the game controller 131 stops the movement of the character C in the game space G.

When the determination process of step S104 is completed, the selector 136 judges whether or not the moving direction of the character C from the current position has been determined in the determination process (step S106). The controller 130 returns to step S100 in a case in which the moving direction from the current position has not been determined (step S106: NO), that is, in a case in which the movement is stopped at the current position because there is no path L along which the character C is movable.

On the other hand, in a case in which the moving direction from the current position is determined (step S106: YES), the selector 136 judges whether or not, in the path L in an area in the moving direction, there is a connection point P to which another path L is connected (step S108). In a case in which there is no such connection point P (step S108: NO), the controller 130 returns to step S100. On the other hand, in a case in which there is a connection point P (step S108: YES), the selector 136 executes a subroutine selection process for selecting a moving direction at the connection point P for the character C (step S110).

Figure 9:
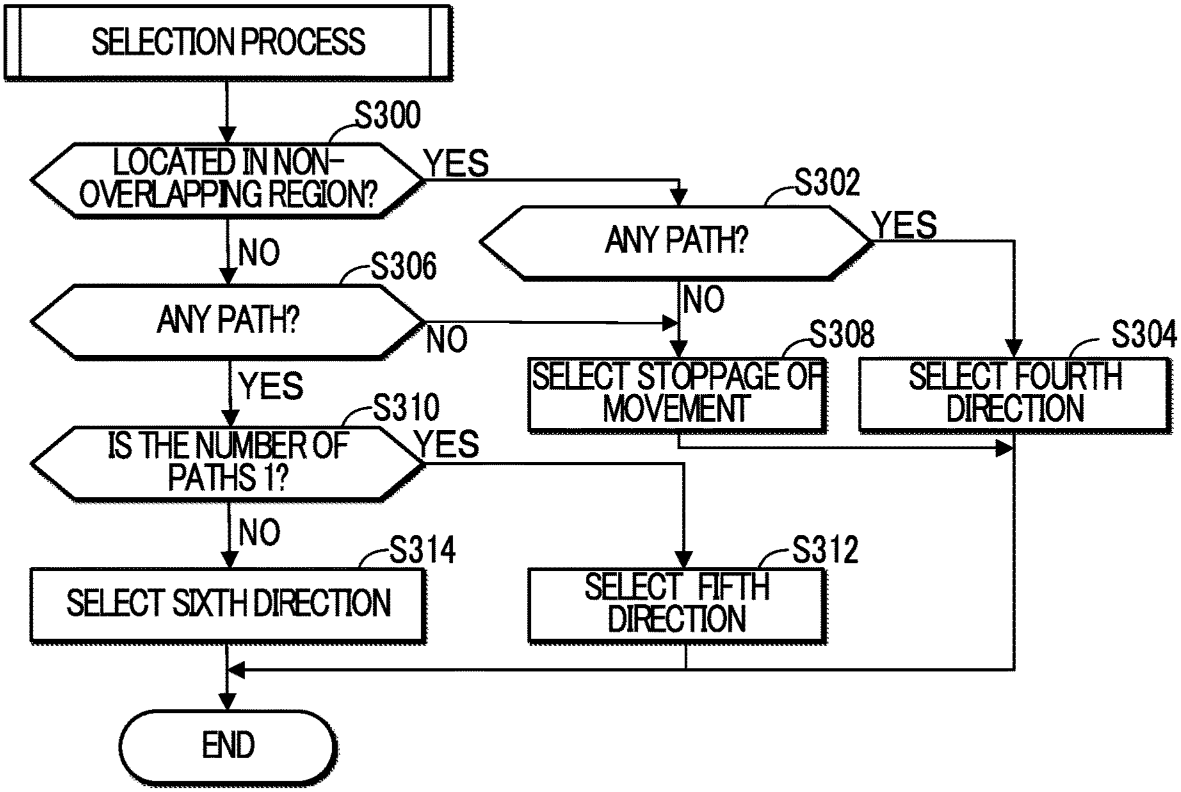
FIG. 9 is a flowchart showing a process of the controller 130 according to the First Embodiment.

FIG. 9 is a flowchart illustrating a procedure of the selection process. The selector 136 judges whether or not the touch location indicated by the touch location information is located in any of the non-overlapping regions RC of the operation region R (step S300). In a case in which the touch location is located in the non-overlapping region RC (step S300: YES), the selector 136 judges whether or not there is a path L extending from the connection point P in a direction associated with the touched non-overlapping region RC (step S302).

In a case in which there is a path L (step S302: YES), the selector 136 selects a fourth direction as the moving direction of the character C from the connection point P (step S304), and ends the process of the flowchart. The fourth direction is a direction associated with the touched non-overlapping region RC. On the other hand, in a case in which there is no path L (step S302: NO), the selector 136 selects to stop the moving of the character C at the connection point P (step S308), and ends the process of the flowchart.

In a case in which the touch location is not located in the non-overlapping region RC (step S300: NO), this means that the touch location is located in the overlapping region RB. The selector 136 judges whether or not there is a path L extending from the connection point P in at least one of the two directions associated with the touched overlapping region RB (step S306). In a case in which there is no path L (step S306: NO), the selector 136 selects to stop the moving of the character C at the connection point P (step S308), and ends the process of the flowchart.

In a case in which there is a path L (step S306: YES), the selector 136 judges whether or not the number of the paths L is one, that is, whether there is only a path L extending in one of the two directions associated with the touched overlapping region RB or whether there are two paths L respectively directed to two directions (step S310). In a case in which the number of the paths L is one (step S310: YES), the selector 136 selects a fifth direction as the moving direction of the character C (step S312), and ends the process of the flowchart. The fifth direction is an extending direction in which the path L extends from the connection point P. In a case in which the number of paths L is not one (step S310: NO), that is, in a case in which there are two paths L, the selector 136 selects a sixth direction as the moving direction of the character C (step S314), and ends the process of the flowchart. The sixth direction is selected based on the touch location in the overlapping region RB. More specifically, the selector 136 selects the moving direction of the character C to be a direction (sixth direction) that is associated with a non-overlapping region RC that is closer to the touch location from among the two non-overlapping regions RC adjoining the touched overlapping region RB.

When the selection process at step S110 is completed, the display controller 138 judges whether or not the moving direction of the character C from the connection point P has been selected in the selection process (step S112). In a case in which the moving direction from the connection point P is not selected (step S112: NO), that is, in a case in which the movement is to be stopped at the connection point P because there is no path L in which the character C is movable at the connection point P, the controller 130 returns to step S100.

On the other hand, in a case in which the moving direction from the connection point P is selected (step S112: YES), the display controller 138 displays a selection result image in the game space G, that is, an image indicating the moving direction at the connection point P of the character C (step S114), and the controller 130 returns to step S100. For example, in a case in which the character C passes through the connection point P after the selection result image is displayed at step S114, the judgement at step S108 as to whether or not there is a connection point P in an area in the moving direction will be NO. Accordingly, the process does not reach step S114, and a selection result image is no longer displayed. Furthermore, for example, in a case in which, after the selection result image is displayed at step S114, the connection point P is no longer positioned in an area in the moving direction due to the character C changing the moving direction, the judgement at step S108 to determine whether or not there is a connection point P in an area in the moving direction will be NO. Accordingly, the process does not reach step S114, and no selection result image is displayed.

As described above, according to the First Embodiment, in a case in which there is a connection point of paths L in an area in the moving direction of the character C in the game space G, the selector 136 selects the moving direction of the character C at the connection point, and the display controller 138 displays a selection result image before the character C reaches the connection point P. Thus, the user can grasp the moving direction at the connection point P for the character C in advance, and it is possible to reduce or prevent erroneous operations, such as an instruction to move the character C in an unintended direction.

In the First Embodiment, for example, configurations exemplified below may be adopted.

Modification A1

Figure 17:
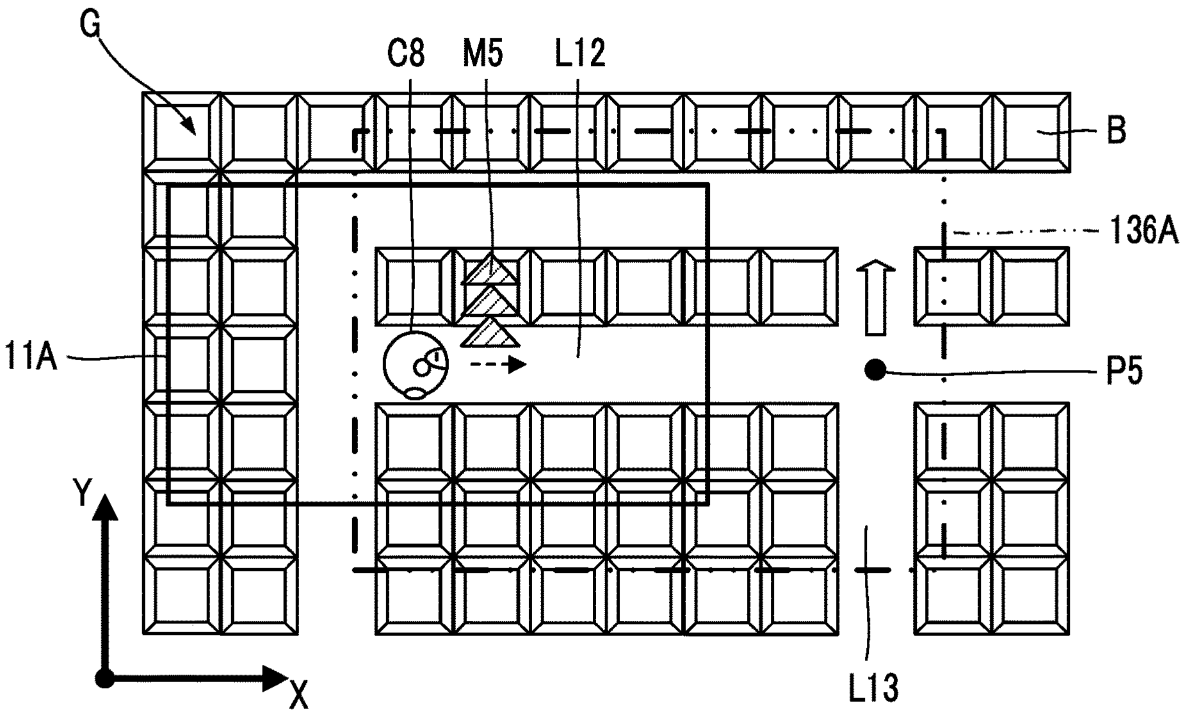
FIG. 17 is a diagram showing an example display of the touch panel 11 according to Modification A2.

In the First Embodiment described above, the display controller 138 displays in the game space G a selection result image at a position based on the connection point P. However, the present invention is not limited thereto, and the display controller 138 may display the selection result image at a position based on the character C in the game space G. Specifically, for example, as shown in FIG. 17, a selection result display in the form of a mark M5 may be displayed ahead of and in the vicinity of a character C8.

The "position based on the character C" may be a position having a predetermined positional relationship with the character C, may be a position within a range of a predetermined distance or less from the character C, or may be a position in a predetermined direction with respect to the character C, for example. Specifically, the "position based on the character C" may be, for example, the current location of the character C in the game space G, or may be a position in the path ahead or behind in the moving direction of the character C. Furthermore, the "position based on the character C" may be, for example, a movement restricted space in the vicinity of the character C (e.g., on the block B). In general, a user who is playing a game often gazes at the character C. With a selection result image being displayed at a position based on the character C, the user can check the selection result image without greatly moving the line of sight from the character C.

Modification A2

In the First Embodiment described above, the selection result image is an image indicating a selection result at a connection point P that is located within the display range of the touch panel 11. However, the present invention is not limited thereto. For example, a selection result image corresponding to a connection point P located outside the display range of the touch panel 11 may be displayed. That is, the display controller 138 may cause an image representing a part of the game space G to be displayed on the touch panel 11, and may cause a selection result image to be displayed at a position based on a positional relationship between the range (hereinafter referred to as a "display range") displayed on the touch panel 11 and the connection point P in the game space G.

The "image representing a part of the game space" is, for example, an image obtained by extracting the part of the game space G, and in this image, not the entire area of the game space G is displayed. The image representing the part of the game space G is, for example, an image obtained by extracting a predetermined range based on the location of the character C in the game space G. Furthermore, the "position based on the positional relationship between the display range and the connection point" may be, for example, a position that is selectively changed depending on whether or not the connection point P is included in the display range. For example, in a case in which the connection point P is located within the display range, the connection point P may be configured to be "a position based on the positional relationship between the display range and the connection point", and in a case in which the connection point P is located outside the display range, a position on the character C (or a position between the character C and the connection point within the display range) may be set to "a position based on the positional relationship between the display range and the connection point".

Figure 18:
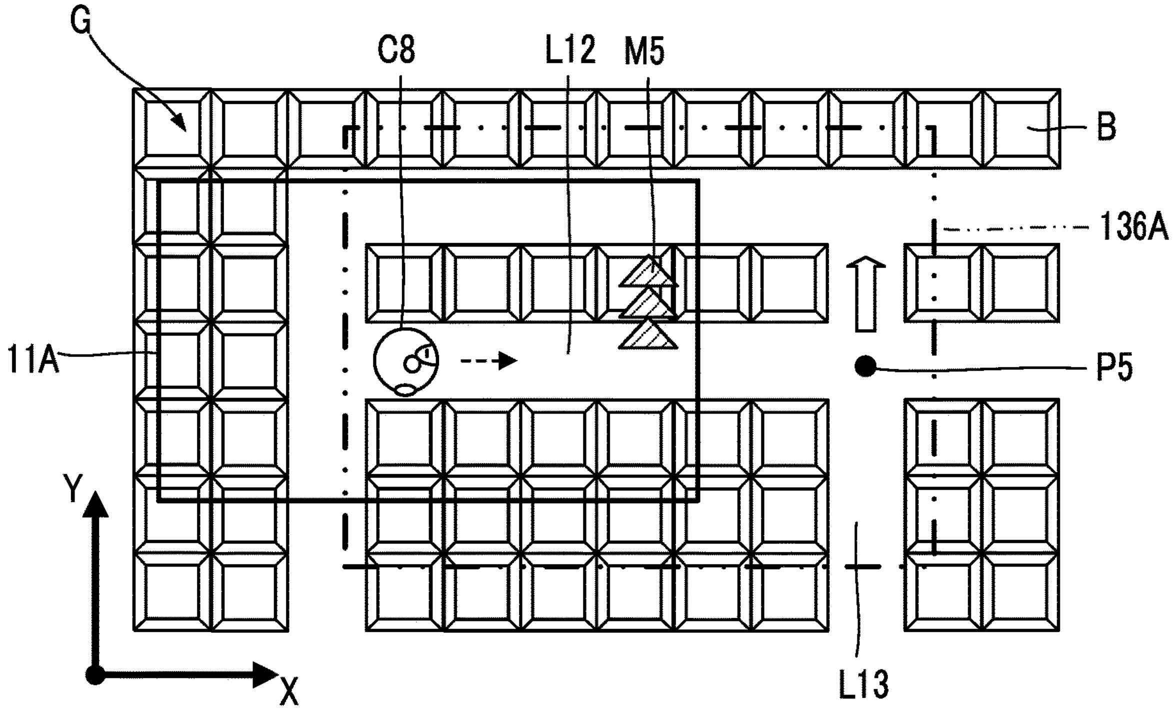
FIG. 18 is a diagram showing an example display on the touch panel 11 according to Modification A2.

FIGS. 17 and 18 are each a diagram illustrating an example of how a display selection result image is displayed on the touch panel 11 according to Modification A2. FIGS. 17 and 18 each show a game space G that is larger than the display range 11A of the touch panel 11. In FIGS. 17 and 18, the display range 11A of the touch panel 11 is a predetermined range based on the location of the character C8. Therefore, as the character C8 moves, the display range 11A of the touch panel 11 also moves. The character C8 moves rightward in a path L12 extending in the X-axis direction. In the area outside the display range 11A in the moving direction of the character C8, the path L12 is connected to a path L13 extending in the Y-axis direction. The connection point of the path L12 and the path L13 is denoted as P5.

For example, in a case in which a processing target area to be processed by the selector 136 (e.g., the range of map data to be acquired) is larger than the display range 11A at least in the moving direction of the character C8 (e.g., such as an area 136A shown in FIG. 17), the moving direction at the connection point P5 is selected prior to the connection point P5 being displayed on the touch panel 11. In the example in FIG. 17, it is assumed that the character C8 moves upward, for example, at the connection point P5.

The display controller 138 displays the selection result, starting from before the connection point P5 is displayed on the touch panel 11. Specifically, for example, as shown in FIG. 17, a selection result image in the form of the mark M5 may be displayed in the vicinity of the character C8. The displayed position of the mark M5 is changed as the character C moves. That is, the mark M5 is displayed so that a positional relationship between the display position of the mark and the character C8 is constant. The mark M5 has a shape in which three triangles are connected along the Y direction, which is the extending direction of the path L13, with the base of the respective triangle extending along the X direction, which is the widthwise direction of the path L13, and the diagonal angle being located above with respect to the base. Such a mark M5 is suggestive of a move in the up direction.

By looking at the mark M5, the user is able to know in advance that the connection point P5 is present in the moving direction of the character C8 (prior to the connection point P5 entering the display range). In addition, by looking at the mark M5, the user is able to know in advance (prior to reaching the connection point P5) that the moving direction at the connection point P5 for the character C8 is the up direction. Also, in general, a user who is playing a game often gazes at the character C. With the mark M5 being displayed in the vicinity of the character C8, the user can recognize the mark M5 without greatly moving the line of sight from the character C8.

Although the mark M5 is displayed ahead of and in the vicinity of the character C8 in FIG. 17, the mark may be displayed at one of various "positions based on the character C" as shown in Modification A1. In other words, FIG. 17 shows a display mode according to Modification A1.

Furthermore, for example, as illustrated in FIG. 18, the mark M5 may be displayed in an end portion adjacent to the connection point P5, in the display range 11A of the touch panel 11. By displaying the mark M5 in the end portion of the touch panel 11, the user can intuitively grasp a direction in which the connection point P5 is located.

It is to be noted that, in the display mode shown in FIG. 17, in a case in which the character C8 moves, resulting in the connection point P5 entering the display range of the touch panel 11, the display position of the mark M5 may be changed to the position of the connection point P5, or the display position of the mark M5 may remain in the vicinity of the character C8, for example. For example, the mark M5 may be displayed at two locations, i.e., at the connection point P5 and in the vicinity of the character C8. In the display mode shown in FIG. 18, in a case in which the character C8 moves, resulting in the connection point P5 entering the display range of the touch panel 11, the movement of the mark M5 relative to the game space G may be stopped at a timing at which the display position of the mark M5 overlaps with the connection point P5, and the display position of the mark M5 may be set to the position of the connection point P5, for example.

Furthermore, for example, a selection result image may be displayed in a different appearance depending on a positional relationship between the display range 11A and the connection point P5, in other words, a positional relationship between the character C and the connection point P5. Specifically, for example, the closer the position of the character C is to the position of the connection point P5 is, the darkness of the displayed color of the selection result image may be increased, the size of the selection result image may be increased, or the blinking rate of the selection result image may be increased. As a result, the user can intuitively grasp a positional relationship between a connection point P not in the display range of the touch panel 11 and the character C.

Modification A3

In the First Embodiment described above, the selector 136 selects the moving direction at the connection point P closest to the character C in the path L in which the character C moves, and the display controller 138 displays a selection result image. The present invention is not limited thereto, and the selector 136 may, for example, select a respective moving direction at multiple connection points P in a path L in which the character C moves, and the display controller 138 may display the respective selection result image.

Figure 19:
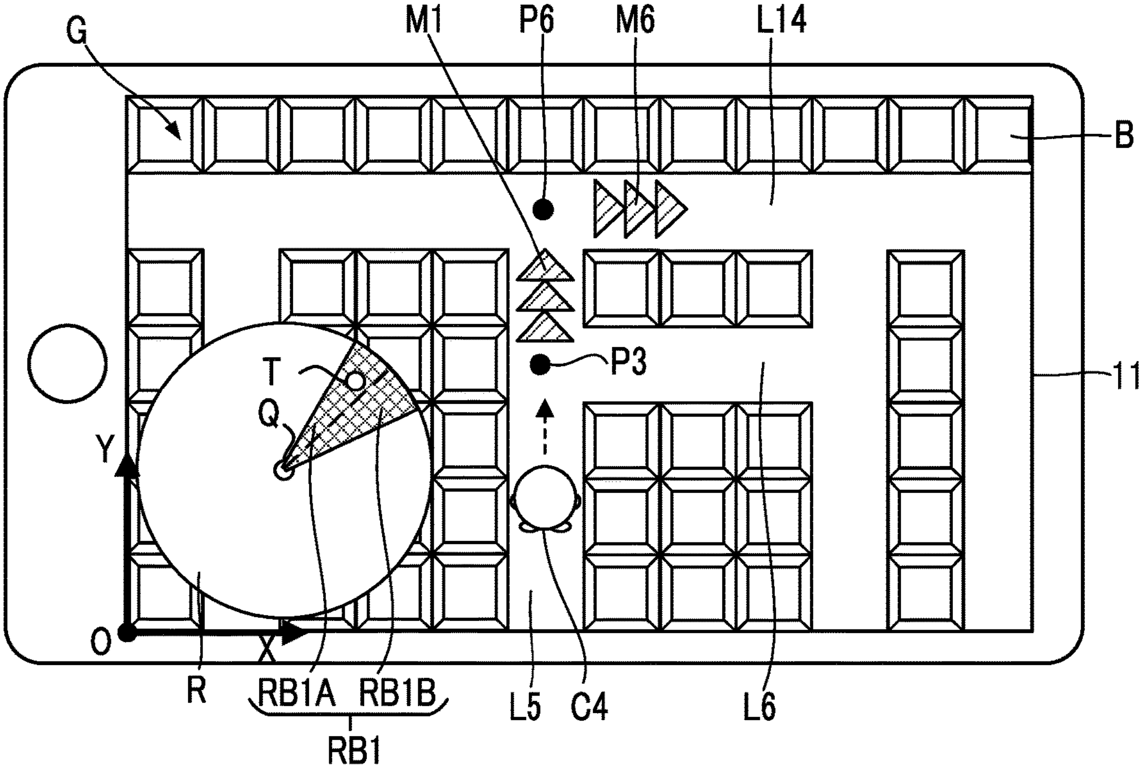
FIG. 19 is a diagram showing an example display on the touch panel 11 according to Modification A3.

FIG. 19 is a diagram illustrating an example display of the touch panel 11 according to Modification A3. On the touch panel 11 shown in FIG. 19, there is displayed the same game space G as in FIGS. 4 to 6, i.e., an area including the path L5 extending in the Y-axis direction (up-down direction), the path L6 extending in the X-axis direction (left-right direction), and the connection point P3 of the path L5 and the path L6. Here, the path L5 is connected to a path L14 at a connection point P6 located above the connection point P3. The path L14 extends in the X-axis direction (left-right direction), and the path width is equal to the character length. A block B is arranged above the connection point P6, and the character C4 which has moved upward in the path L5 cannot move to an area above the connection point P6. That is, the path L5 is terminated at the connection point P6.

Here, as shown in FIG. 19, it is assumed that a character C4 is located below the connection point P3 of the path L5, and the touch location is located in the overlapping region RB1A. In this case, as described with reference to FIGS. 4 and 5, the determiner 134 determines the moving direction of the character C4 in the path L5 to be the up direction. Furthermore, the selector 136 selects the up direction as the moving direction at the connection point P3 for the character C4. Prior to the character C4 reaching the connection point P3, the display controller 138 displays, in the vicinity of the connection point P3 in the game space G, the mark M1 indicating that the moving direction at the connection point P3 for the character C4 is the up direction.

After moving upward at the connection point P3, the character C4 reaches the connection point P6. That is, the connection point P6 connecting to the path L14 is in an area in the moving direction of the character C4. The selector 136 selects the moving direction at the connection point P6 for the character C4 based on the touch location. In an example of FIG. 19, the touch location is in the overlapping region RB1A. The overlapping region RB1A (overlapping region RB1) is associated with the up direction and the right direction, but the direction in which a character is movable at the connection point P6 is the right direction or the left direction. That is, as in the above-described Scenario 2-1, the existing path L extends only in one direction (the path L14 extending in the right direction), among the two directions (the up direction and the right direction) associated with the overlapping region RB1. Accordingly, the selector 136 selects the moving direction at the connection point P6 for the character C4 to be the right direction, and the display controller 138 displays in the vicinity of the connection point P6 in the game space G a selection result image of the moving direction at the connection point P6 selected for the character C4.

Thus, there is a case in which (i), (ii), and (iii) are all satisfied: (i) the selector 136 has selected a first direction as the moving direction of the character C at a first connection point; (ii) a touch location indicated by touch location information is in the overlapping region RB; and (iii) in an area in the moving direction of the character C that has passed the connection point P, there is a second connection point at which a third path that is in a third direction is connected to the first path. In this case, the selector 136 selects based on the touch location information the moving direction of the character C at the second connection point from among the first direction and the third direction. The display controller 138 displays in the game space G a selection result image corresponding to the first connection point and a selection result image corresponding to the second connection point.

The "third direction" is a direction in the game space G. The third direction is a direction differing at least from the first direction. The third direction may be a direction differing from both the first direction and the second direction. The third direction may be the same direction as the second direction. When applied to the example using FIG. 19, the first direction corresponds to the up direction, the first connection point corresponds to the connection point P3, the overlapping region RB corresponds to the overlapping region RB1A, the third direction corresponds to the right direction, the third path corresponds to the path L14, the first path corresponds to the path L5, the second connection point corresponds to the connection point P6, the selection result image corresponding to the first connection point corresponds to the mark M1, and the selection result image corresponding to the second connection point corresponds to the mark M6.

By so doing, the user can check the moving direction at multiple connection points P in advance (before the character C reaches the connection point P) to determine whether or not to change the touch location. Accordingly, it is possible to reduce or prevent erroneous operations. In particular, there is a case in which a distance between adjacent connection points P is small. In such a case, if a selection result only for a connection point P closer to the character C is displayed, a user operation for a moving direction instruction for a farther connection point P might be delayed. By displaying moving directions for multiple connection points P in advance, the user can perform an operation for a moving direction instruction in plenty of time.

Modification A4

In the First Embodiment, a selection result image is displayed in a case in which the moving direction at the connection point P is determined, and no image is displayed in a case in which the character C stops moving at the connection point P (Step S112 in FIG. 7: NO). However, also in a case in which the character C stops moving at the connection point P, the display controller 138 may display an image indicating that the character C stops moving at the connection point P.

Figure 20:
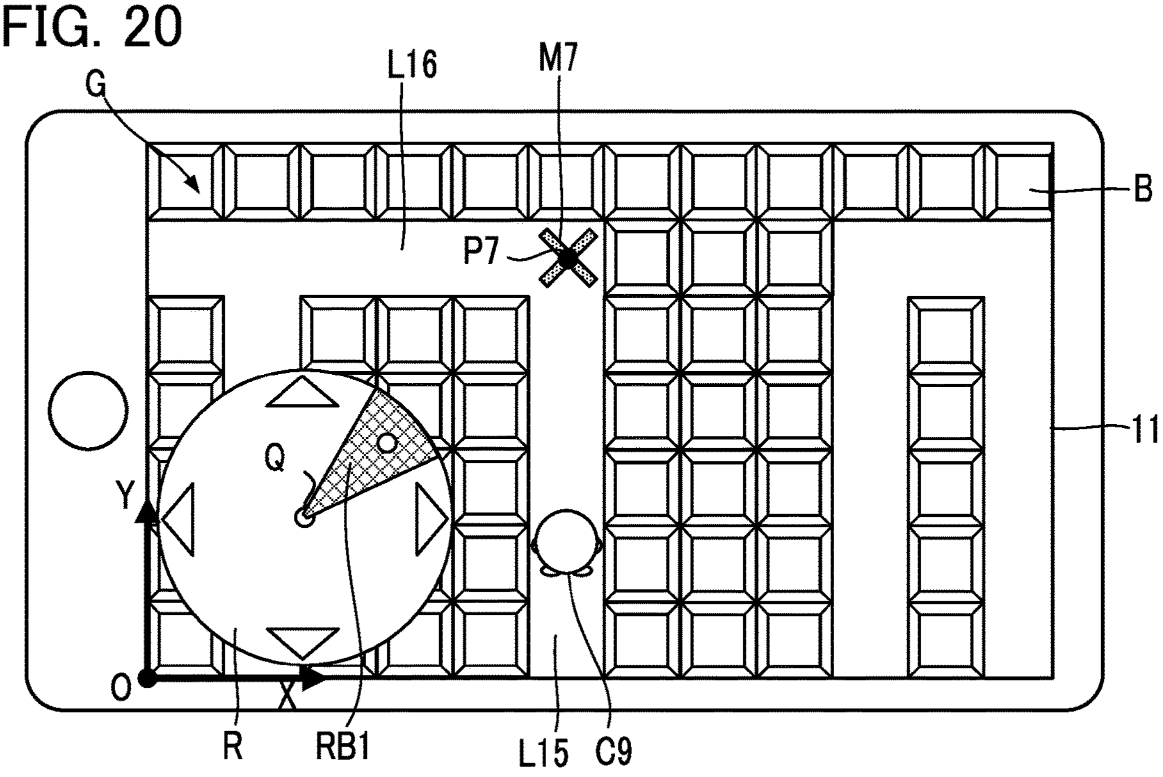
FIG. 20 is a diagram showing an example display on the touch panel 11 according to Modification A4.

FIG. 20 is a diagram illustrating an example display of the touch panel 11 according to Modification A4. On the touch panel 11 shown in FIG. 20, there is displayed an area including a path L15 extending in the Y-axis direction (up-down direction), a path L16 extending in the X-axis direction (left-right direction), and a connection point P7 of the path L15 and the path L16. A block B is arranged above the connection point P7, and the character C9 which has moved upward in the path L15 cannot move to an area above the connection point P7. That is, the path L15 is terminated at the connection point P7. Furthermore, a block B is also arranged on the right side of the connection point P7, and the character C9 which has moved rightward in the path L16 cannot move to an area to the right of the connection point P7. That is, the path L16 is also terminated at the connection point P7.

It is assumed that the character C9 is located below the connection point P7 in the path L15, and the touch location is located in the overlapping region RB1. In this case, the determiner 134 determines the moving direction of the character C9 in the path L15 to be the up direction. The connection point P7 is located in an area in the moving direction in the path L15. The selector 136 refers to the map data showing an area ahead in the moving direction of the character C, and selects the moving direction at the connection point P7 for the character C9. For example, in FIG. 20, the character C9 is hindered from moving, by the block B on the upper side of the connection point P7. If a path extending in the right direction was connected to the connection point P7, the character C9 would move in the right direction because the touch location is in RB1, so that stoppage could be avoided. However, the path L16 extending only leftward is connected to the connection point P7, and thus stoppage cannot be avoided. Accordingly, the selector 136 selects to stop the character C9 at the connection point P7.

The display controller 138 displays, in the game space G, an image indicating that the character C9 will be stopping at the connection point P7 as a selection result image. In FIG. 20, the display controller 138 displays the mark M7 "X" at the position of the connection point P7. Although the mark M7 may be displayed at any position, it is preferable that the user be able to anticipate at which position the character C9 will be stopping, and therefore, it is preferable that the position be based on, for example, a position at which the movement of the character C9 is blocked.

Furthermore, for example, also in a case in which the determiner 134 determines that the movement of the character C is stopped at a place other than the connection point P (e.g., end of a path L), an image indicating that the movement of the character C is stopped may be displayed. For example, in a case in which (i) and (ii) are satisfied: (i) the character C is moving toward a block B, which is at a distance greater than the minimum moving distance of the character C; and (ii) the movement of the character C is to be stopped at the position of the block B, the determiner 134 may determine to stop the movement of the character C in advance (before the distance between the character C and the block B becomes less than or equal to the minimum moving distance of the character C). Also in this case, the display controller 138 may display in the game space G an image indicating a result of determination to stop, by the determiner 134.

As illustrated in FIG. 2B, the selector 136 is a part of the determiner 134. Therefore, for example, as illustrated in FIG. 20, the selector 136 selecting to stop the character C at the connection point P is also one aspect of the determiner 134 determining to stop the movement of the character C.

Thus, in a case in which (i) and (ii) are both satisfied: (i) a touch location indicated by the touch location information is in a first region or a second region; and (ii) there is a portion in which the movement in the first direction and the second direction is hindered in an area in the moving direction of the character C in the game space G, the determiner 134 determines to stop the movement of the character C at a location at which the movement is hindered. The display controller 138 displays in the game space G an image indicating a determination result by the determiner 134. When applied to the example using FIG. 20, the first region corresponds to the upper direction, the second region corresponds to the right direction, the first direction corresponds to the upper direction, the second direction corresponds to the right direction, the location at which the movement is hindered corresponds to the connection point P7, and the image indicating the determination result corresponds to the mark M7.

The "location at which movement is blocked" is, for example, a location where an obstacle (environmental component) that restricts movement of the character C such as a block B is arranged. Furthermore, the "image indicating the determination result" is, for example, an image suggesting that the movement of the character C will be stopped. The "image indicating the determination result" may be, for example, an image that can be easily distinguished from an "image indicating the selection result" such as the mark M1 in FIG. 4, and may be, for example, an image that simulates an "X" mark as in FIG. 20 or a stop sign.

In this way, the user is able to know in advance that the character C will be stopping in a path L, and as necessary, can perform an operation (e.g., change of the touch location) for avoiding the stop.

Modification A5

In the First Embodiment, the display controller 138 may display an image indicating a touch location in the operation region R, in particular, in the overlapping region RB. The image may also serve as a selection result image.

Figure 21:
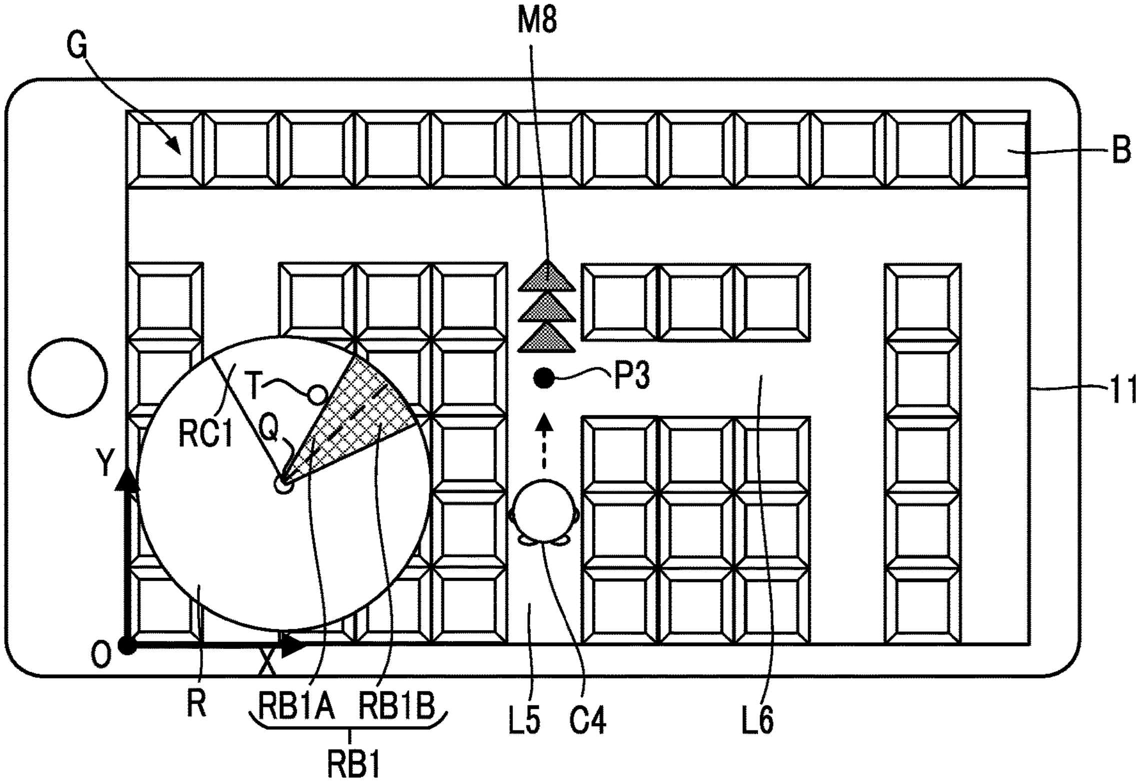
FIG. 21 is a diagram showing an example display on the touch panel 11 according to Modification A5.
Figure 22:
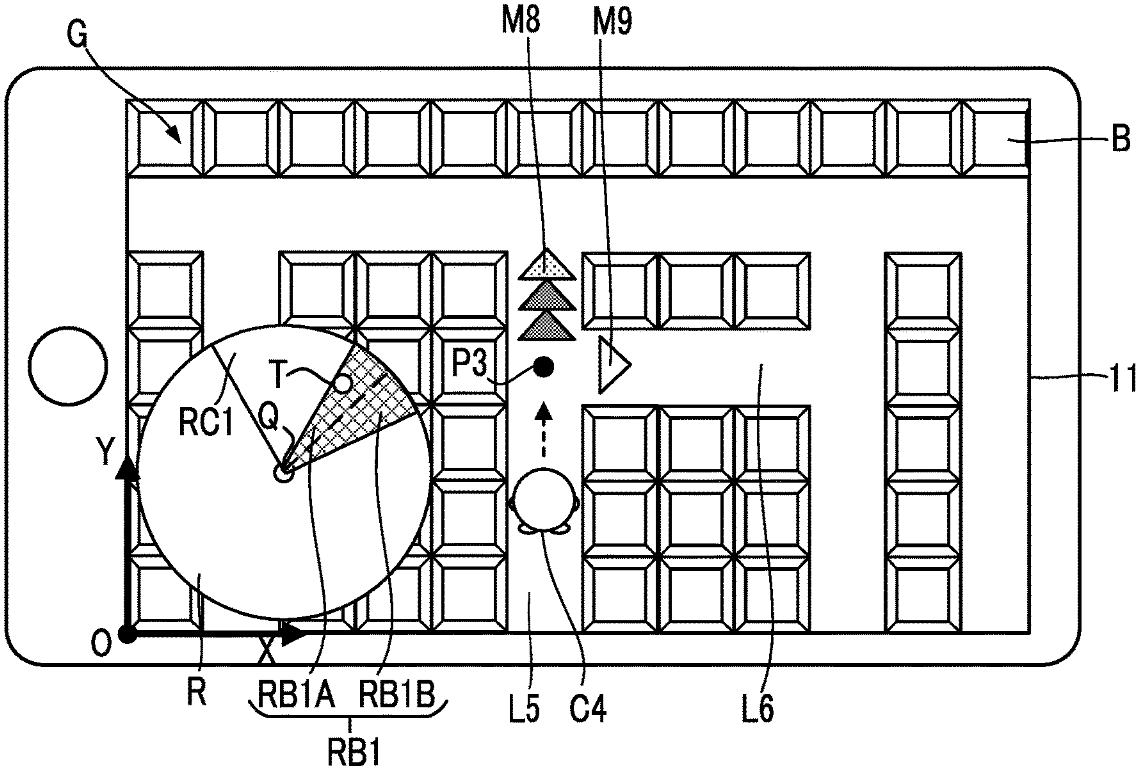
FIG. 22 is a diagram showing an example display on the touch panel 11 according to Modification A5.
Figure 23:
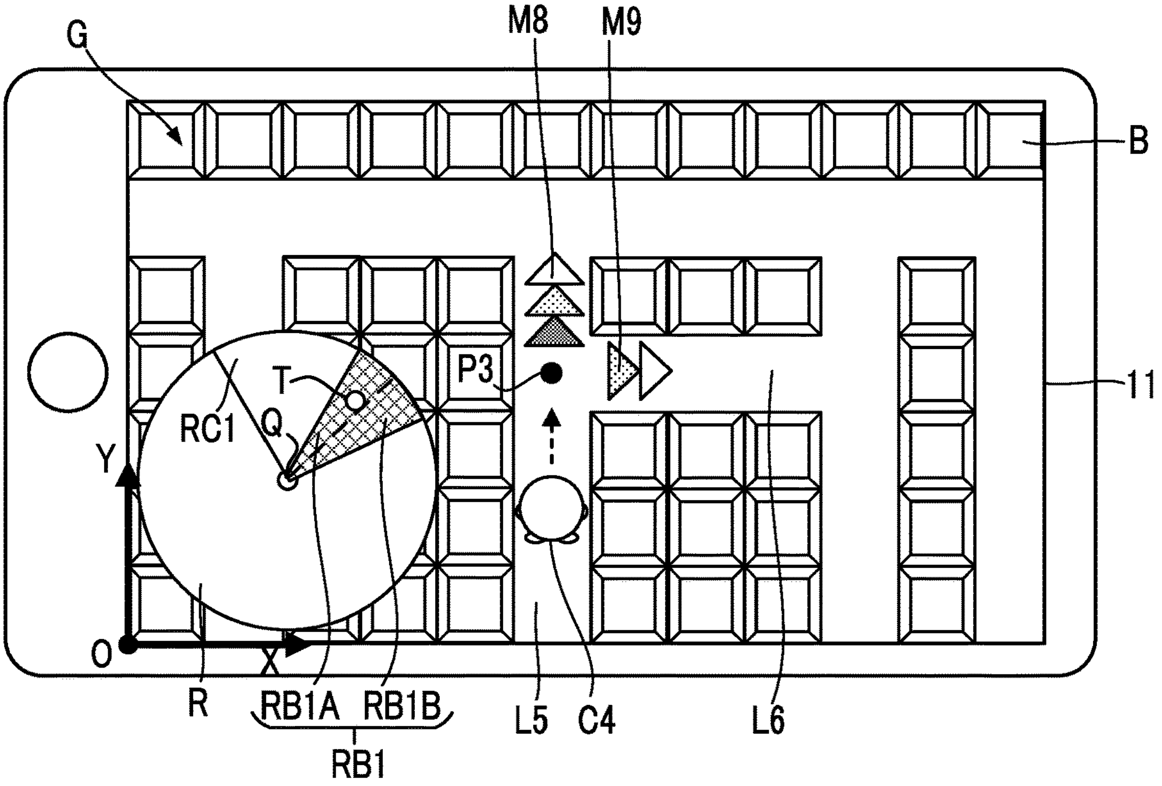
FIG. 23 is a diagram showing an example display on the touch panel 11 according to Modification A5.

FIGS. 21 to 23 are each a diagram illustrating an example display of the touch panel 11 according to Modification A5. On the touch panel 11 illustrated in FIGS. 21 to 23, as in FIG. 4 and the like, there is displayed an area, of the game space G, including the path L5 extending in the Y-axis direction (up-down direction), the path L6 extending in the X-axis direction (left-right direction), and the connection point P3 of the path L5 and the path L6.

As shown in FIG. 21, for example, in a case in which (i) and (ii) are both satisfied: (i) the character C4 is located below the connection point P3 in the path L5; and (ii) the touch location is in the non-overlapping region RC1, the determiner 134 determines the moving direction of the character C4 to be the up direction according to Scenario 1-1. According to Scenario 1-1, the selector 136 selects the up direction as the moving direction at the connection point P3 for the character C4. That is, a move to the path L5 is selected.

The display controller 138 displays a mark M8 as the selection result image. The mark M8 indicates, from among two paths L5 and L6 connected at the connection point P3, a path L5 that is selected by the selector 136. Specifically, the mark M8 has a shape in which three triangles are connected along the extending direction of the path L5, with the base of the respective triangle extending along the widthwise direction of the path L5, and the diagonal angle being located above with respect to the base. The three triangles constituting the mark M8 are displayed in the same color tone. In addition, the mark M8 is in the path L5 in the vicinity of the connection point P3. Such a mark M8 is suggestive of a move to the path L5.

From the state shown in FIG. 21, for example, it is assumed that the touch location T has moved to the overlapping region RB1A as shown in FIG. 22. The touch location T in FIG. 22 is a region close to the non-overlapping region RC1 in the overlapping region RB1A. The selector 136 selects the moving direction at the connection point P3 for the character C4 according to Scenario 2-2. The selector 136 selects the up direction, i.e., the path L5, as the moving direction of the character C4 because, of the overlapping region RB1, the touch location T is in the overlapping region RB1A adjoining the non-overlapping region RC1.

The display controller 138 continues with the displaying of the mark M8 in the path L5 and also displays a mark M9 in the path L6. The mark M9 is a triangle, its base extending along the width-wise direction of the path L6 and its diagonal angle being located to the right with respect to the base. The color of the mark M9 is displayed in a lighter tone (e.g., lower brightness or saturation) than the three triangles that constitute the mark M8. Furthermore, among the three triangles constituting the mark M8, the one farthest from the connection point P3 is displayed in a light color tone as compared with the mark M8 in FIG. 21. The mark M8 indicates that the path L5 is selected as the moving direction of the character C4, as described above. The mark M9 indicates that due to the change in the touch location T as compared with that in FIG. 21, the path L6 is also selectable as the moving direction of the character C4. That is, the mark M9 indicates that the touch location T has entered the overlapping region RB1.

Furthermore, from the state in FIG. 22, for example, it is assumed that the touch location T has changed to a region close to the overlapping region RB1B in the overlapping region RB1A as shown in FIG. 23. In FIG. 23, as in FIG. 22, a selection result by the selector 136 is the path L5. On the other hand, the display controller 138 changes the display appearances of the mark M8 and the mark M9. Specifically, for example, in the mark M9, two triangles are connected along the path L6 such that the bases extend along the widthwise direction of the path L6 and the respective diagonal angle is located to the right with respect to the base. That is, in the mark M9 in FIG. 23, one triangle has been added as compared with the mark M9 in FIG. 22. Of the two triangles constituting the mark M9, one close to the connection point P3 is displayed in a darker color tone, and the other far from the connection point P3 is displayed in a lighter color tone. Also, the color tones of the three triangles constituting the mark M8 are displayed in lighter color as the distance from the connection point P3 increases.

With such a display, it is possible to cause the user to recognize that the touch location T is approaching a region in which the path L6 is selected (overlapping region RB1B), while indicating that the path L5 has been selected as the moving direction of the character C4. For example, even if the user does not gaze at the operation region R, the user can grasp the touch location in the operation region R, which is advantageous in improving operability.

It is to be noted that, for example, when from the state shown in FIG. 23 the touch location T enters the overlapping region RB1B, the moving direction at the connection point P3 will change to the right direction. In this case, the display controller 138 adds one triangle to the mark M9 to display the mark in a form of three connected triangles, and deletes one triangle from the mark M8 to display the mark in a form of two connected triangles. Consequently, the display area of the mark M9 will be larger than the display area of the mark M8, and then the user can recognize that the path L6 corresponding to the mark M9 is the path L selected as the moving direction at the connection point P3. In a case in which the touch location T moves to a position close to the non-overlapping region RC2 in the overlapping region RB1B, the display controller 138 deletes one triangle from the mark M8 to have one triangle while maintaining the mark M9 in the shape of three connected triangles. Furthermore, in a case in which the touch location T moves to the non-overlapping region RC2, the display controller 138 ends the display of the mark M8 to display only the mark M9.

Thus, in a case in which the touch location T is located in the overlapping region RB between a first region and a second region, the display controller 138 displays an image indicating a positional relationship between the touch location and at least one of the first region or the second region. In this case, the display controller 138 displays a first image indicating a direction selected by the selector 136 from among the first direction and the second direction, and a second image indicating a direction not selected by the selector 136 from among the first direction and the second direction, and changes the visual effect of the first image and the visual effect of the second image based on the touch location in the overlapping region RB.

When applied to the examples shown in FIGS. 21 to 23, the first region corresponds to the up-direction region RA1, the second region corresponds to the right-direction region RA2, the overlapping region RB corresponds to the overlapping region RB1, and the images indicating the positional relationship correspond to the mark M8 and the mark M9. The first direction corresponds to the up direction, the second direction corresponds to the right direction, the first image corresponds to the mark M8, and the second image corresponds to the mark M9. Also, changing the visual effect corresponds to increasing or decreasing the numbers of triangles in the mark M8 and the mark M9 and changing the colors of the triangles displayed.

It is to be noted that "changing the visual effect" may be, for example, changing the number, saturation, size of display area, and the like of the first image or the second image. To enhance the visual effect, for example, the number of the first images or the second images may be increased, the saturation of the first image or the second image may be increased, the size of display area of the first image or the second image may be increased, or the like, or more than one of these may be performed. To weaken the visual effect, for example, the number of the first images or the second images may be reduced, the saturation of the first image or the second image may be reduced, the size of the display area of the first image or the second image may be reduced, or the like, or more than one of these may be performed.

Figure 24:
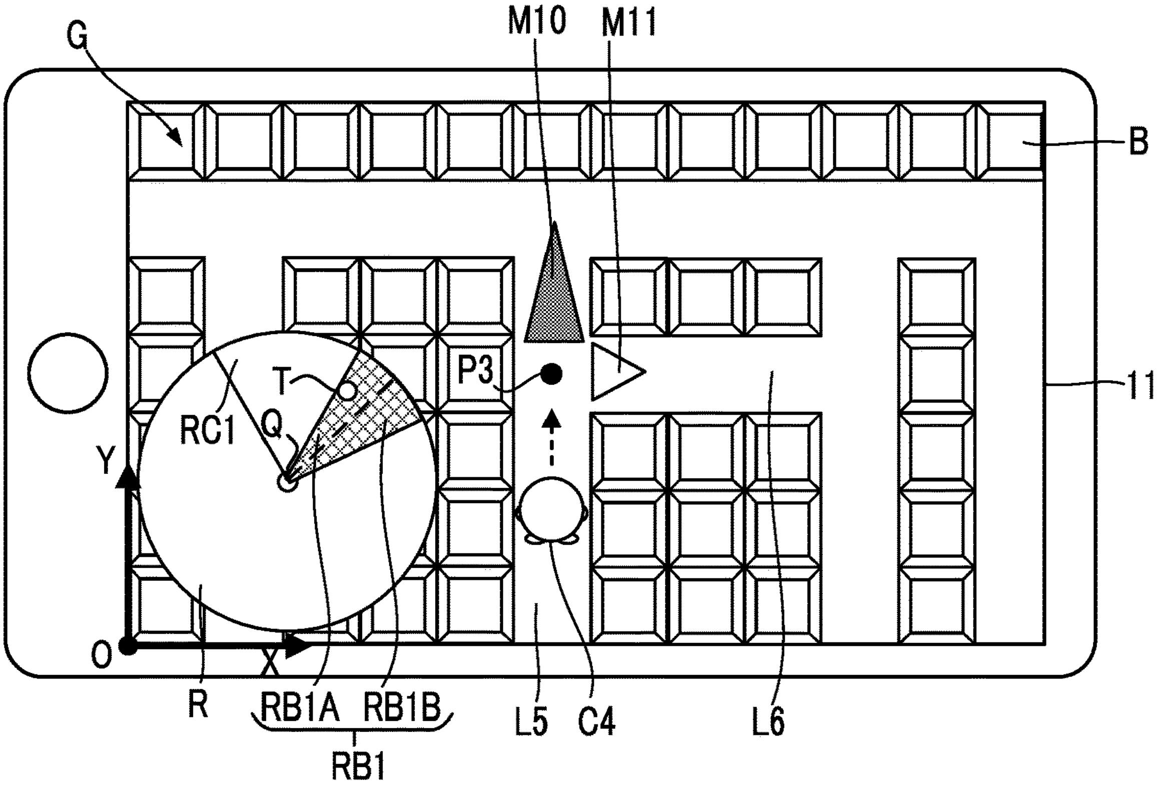
FIG. 24 is a diagram showing an example display on the touch panel 11 according to Modification A5.

The image indicating a positional relationship is not limited to those illustrated in FIGS. 21 to 23, and various forms can be applied. For example, the image indicating the positional relationship may be a display, such as a mark M10 and a mark M11 shown in FIG. 24. In FIG. 24, the touch location T is located in a region close to the non-overlapping region RC1 in the overlapping region RB1A. That is, the state shown in FIG. 24 is the same as the state shown in FIG. 22. The selector 136 selects the up direction, i.e., the path L5, as the moving direction at the connection point P3 for the character C4.

The display controller 138 displays the mark M10 in the path L5 and the mark M11 in the path L6. The mark M10 comprises one triangle of which the base extends widthwise of the path L5 and of which the diagonal angle is located above with respect to the base. The mark M11 comprises one triangle of which the base extends widthwise of the path L6 and of which the diagonal angle is located to the right with respect to the base. The height of the mark M10 is greater than that of the mark M11, and the area of the mark M10 is displayed also in a larger size than that of the mark M11. The mark M10 is displayed in a darker tone (e.g., having a higher brightness or saturation) than the mark M11. By displaying the mark M10 in a larger size and a darker tone than the mark M11, the user can recognize that the path L5 is the moving direction of the character C4.

In a case in which the touch location T moves to a region close to the overlapping region RB1B in the overlapping region RB1A, the display controller 138 reduces the height of the mark M10 and increases the height of the mark M11 while maintaining the display color. Consequently, the area of the mark M10 will be relatively small, and the area of the mark M11 will be relatively large. Therefore, the user will recognize that the character is approaching a region for which the path L6 corresponding to the mark M11 will be selected. In a case in which the touch location T is at the border between the overlapping region RB1A and the overlapping region RB1B, the display controller 138 makes the height of the mark M10 equal to the height of the mark M11. In a case in which the touch location T enters the overlapping region RB1B, the selector 136 sets the path L6 as the moving direction of the character C4. The display controller 138 increases the height of the mark M11 to be greater than the height of the mark M10, and displays the mark M11 in a color tone darker than the mark M10. Consequently, the area of the mark M11 will be larger than the area of the mark M10, and the mark M11 will be more prominent than the mark M10. Therefore, the user will recognize that the path L6 corresponding to the mark M11 is the path L selected as the moving direction at the connection point P3.

The image indicating the positional relationship is not limited to the above-described form, and may be, for example, a direction indicator indicating the same direction as a vector from the reference point Q of the operation region R toward the touch location.

With such a display, the user can recognize the selection result selected by the selector 136 and the touch location T, which is advantageous in improving the operability.

Modification A6

As described above, a block B may disappear when, for example, an item is used, the character C is operated, or the like. In this case, a space that was occupied by the block B, which has disappeared, becomes a part of a path L. That is, the shape of the path L may change as the game progresses. Depending on the specifications of the game, for example, a case is conceivable in which, while the game is in progress, a block B may be arranged at a location that used to be a path L, and the character C may no longer be able to move at that location. In a case in which the shape of the path L in the game space G changes, the selector 136 judges whether or not there has been a change in the moving direction of the character C, and in a case in which there has been a change (or regardless of whether or not there has been a change), the selector 136 again selects a path in which the character C will be moving. For example, the selector 136 again acquires the map data of the game space G every time a block B disappears in the game space G or at a predetermined cycle, and judges whether or not the shape of the path L has changed. In a case in which the selection result by the selector 136 has been changed, the display controller 138 displays the changed selection result image in the game space G.

Thus, in a case in which the arrangement of blocks B has been changed, the selector 136 may again select a path L in which the character C will be moving, based on the changed arrangement of the blocks B. In a case in which the selection result by the selector 136 changes due to the change in the arrangement of the blocks B, the display controller 228 may display the changed selection result image in the game space G. The "change in the shape of the environment" may be, for example, a change in the shape of the surface, an increase or decrease in the number, a change in the size, or the like, of an environmental component, such as a block B. Thus, even in a case in which the shape of the path changes, the user can accurately grasp the moving direction of the character C, and convenience in the game can be improved.

Modification A7

In the First Embodiment, an image indicating the moving direction selected by the selector 136, such as the mark M1 (see FIG. 5) and the mark M2 (see FIG. 6), is displayed as the selection result image. However, the selection result image is not limited thereto, and it may be, for example, a symbol or the like that does not indicate a specific direction. Specifically, for example, as an image, an icon may be used that does not suggest a specific direction, such as a circle, the icon being arranged in the path L in the selected direction. Furthermore, the selection result image may be, for example, an image indicating a moving direction that is deselected by the selector 136, or may be an image indicating an object or a symbol that blocks movement in a direction that is not selected by the selector 136. The selection result image may be, for example, a visual effect having no specific shape. The visual effect may be, for example, that a portion of a path L in the selected direction is displayed in a darker tone, glows, or the like, or may be that a portion of the path in the deselected direction is foggy.

B: Second Embodiment

Next, a Second Embodiment will be described. In the following examples, for elements for which the functions are the same as those of the First Embodiment, reference signs used in the description of the First Embodiment are used, and detailed descriptions of each element will be omitted as appropriate.

In the First Embodiment, an instruction for the moving direction that can be received in the operation region R is limited to four directions, i.e., the up direction, the down direction, the left direction, and the right direction. In the Second embodiment, an instruction to move in any direction can be received in the operation region R. An instruction to move in any direction is not limited to being able to designate a direction in a stepless manner, and may be, for example, a designation of a direction in a stepped manner depending on a directional resolution in the application program of a game. In the present embodiment, it is assumed that the moving direction that can be received in the operation region R comprises moving directions of at least a number exceeding four directions of up, down, left, and right, which are the extending directions of the paths L in the game space G.

On the other hand, also in the Second Embodiment, blocks B are arranged in the game space G, and the movement of a character C may be hindered by a block B. In other words, in the Second Embodiment, "(1) the environment in the game space G (e.g., the arrangement of the blocks B)" is the only restriction imposed to the moving direction of the character C.

Figure 10:
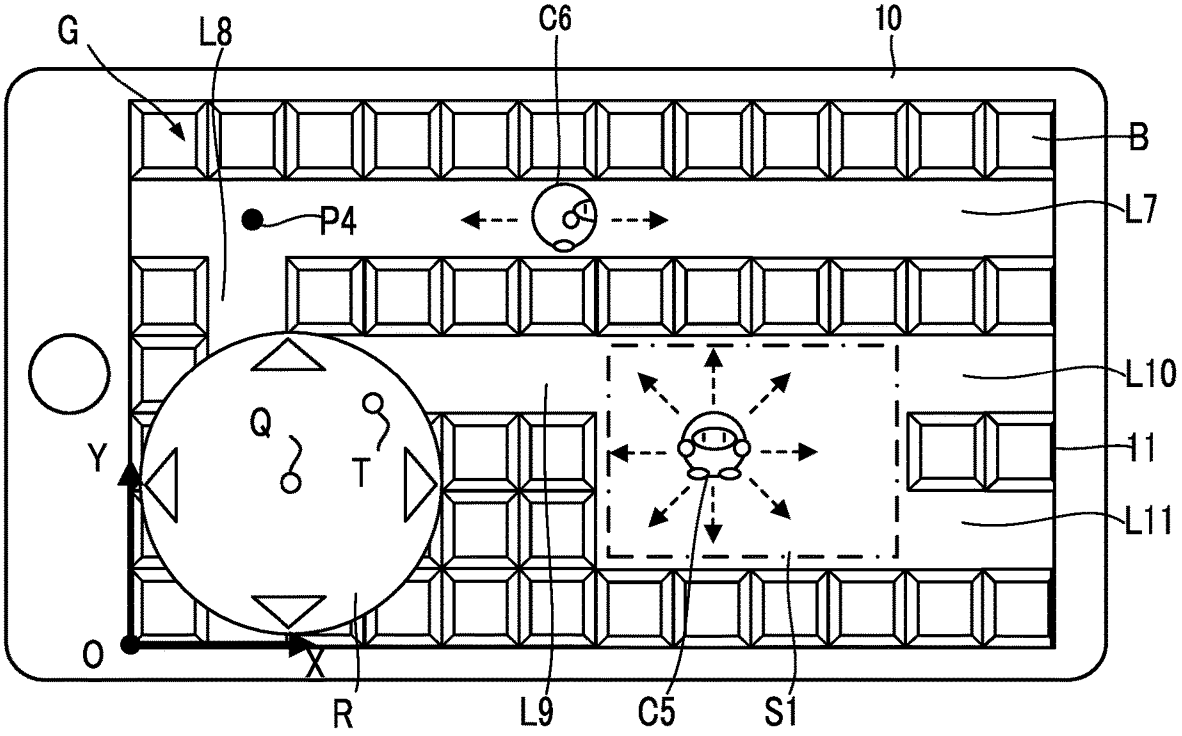
FIG. 10 is a diagram showing how a character C moves according to a Second Embodiment.

FIG. 10 is a diagram illustrating how a character C moves according to the Second Embodiment. In FIG. 10, the touch panel 11 displays a game space G including a path L7 extending in the X-axis direction and having a path width of the character length, and a movable area (for convenience, referred to as a "square") S1 extending over a distance greater than the minimum moving distance of the character C both in the X-axis direction and the Y-axis direction. The path L7 is connected to a path L8 at a connection point P4. The path L8 extends along the Y-axis and has a path width of the character length. Connected to the left portion of the square S1 is a path L9 extending in the X-axis direction, and connected to the right portion of the square S1 are a path L10 and a path L11. The path width of each of the paths L9, L10, and L11 is the character length.

In the Second Embodiment, a character C5 located in the square S1 is movable in any direction instructed by the user. For convenience, although eight arrows indicating the moving directions of the character C5 are shown in FIG. 10, the number of the moving directions of the character C5 may actually be as many as the number depending on the directional resolution in the application program of the game. On the other hand, also in the Second Embodiment, the moving direction of the character C6 located in the path L is limited to the extending direction of the path L. That is, for example, the moving direction of a character C6 located in the path L7 is limited to the left-right direction, which is the extending direction of the path L7.

Figure 11A:
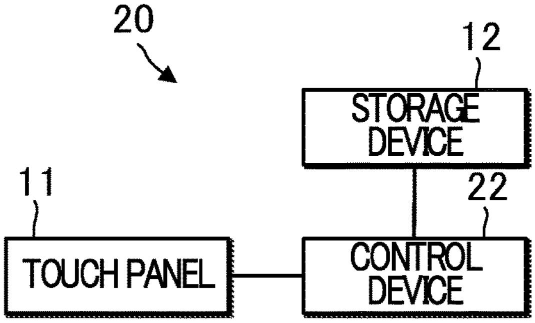
FIG. 11A is a block diagram illustrating an example of a hardware configuration of an information processing apparatus 20 according to the Second Embodiment.

FIG. 11A is a block diagram illustrating an example hardware configuration of an information processing apparatus 20 according to the Second Embodiment. The information processing apparatus 20 according to the Second Embodiment includes a touch panel 11, a storage device 12, and a control device 22. The configurations of the touch panel 11 and the storage device 12 are the same as those of the First Embodiment.

The control device 22 is a processor such as a CPU, similarly to the control device 13 of the First Embodiment. The control device 22 comprehensively controls each element of the information processing apparatus 20. The control device 22 functions as a controller 220 shown in FIG. 11B by executing a program stored in the storage device 12.

Figure 11B:
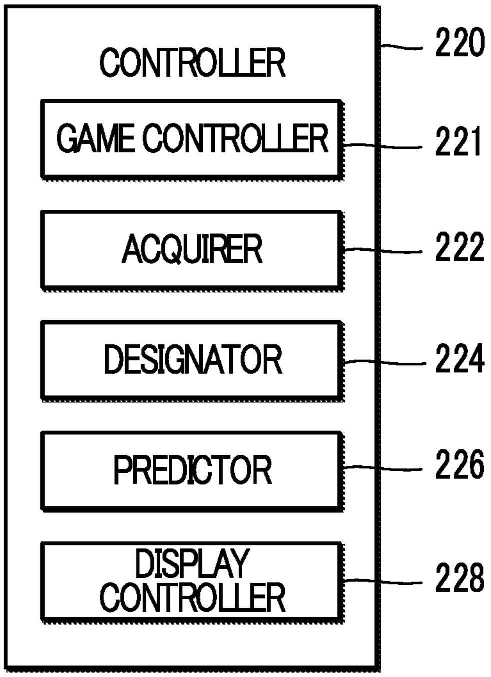
FIG. 11B is a block diagram illustrating an example of a functional configuration of a controller 220 according to the Second Embodiment.

FIG. 11B is a block diagram illustrating an example functional configuration of the controller 220 according to the Second Embodiment. The controller 220 functions as a game controller 221, an acquirer 222, a designator 224, a predictor 226, and a display controller 228. It is to be noted that some or all of the functions of the controller 220 may be realized by dedicated electronic circuitry.

The game controller 221 controls the progress of the game in the same manner as the game controller 131 of the First Embodiment. Similarly to the acquirer 132 of the First Embodiment, the acquirer 222 acquires touch location information indicating a touch location on the touch panel 11.

The designator 224 designates the moving direction of the character C in the game space based on the touch location information. The moving direction designated by the designator 224 is a moving direction from the current location of the character C. Specifically, the designator 224 first identifies a moving direction instructed by the user (hereinafter, referred to as "user-instructed direction") based on the touch location in the operation region R. For example, the designator 224 determines a direction from a reference point Q of the operation region R toward the touch location T as a user-instructed direction. Next, the designator 224 refers to the map data of the game space G and judges whether or not it is possible for the character to move in the user-instructed direction from the current location of the character C. More specifically, the designator 224 judges whether or not there is a movable area of at least the minimum moving distance extending in an area in the user-instructed direction from the current location of the character C. In a case in which it is possible for the character to move in the user-instructed direction, the designator 224 designates the instructed direction as the moving direction of the character C.

Figure 12:
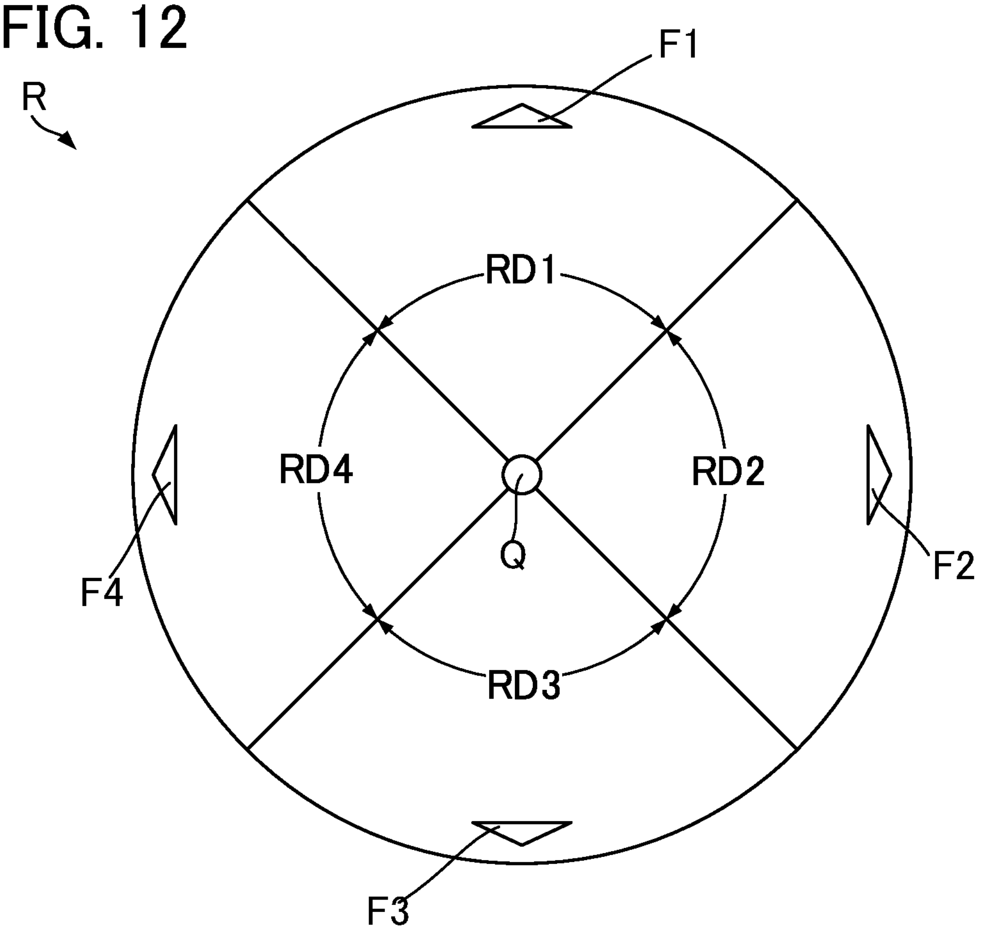
FIG. 12 is a diagram illustrating a relationship between an operation region R and an approximate instructed direction according to the Second Embodiment.

On the other hand, in a case in which the character cannot move in the user-instructed direction, the designator 224 specifies an approximate instructed direction based on the touch location in the operation region R. FIG. 12 is a diagram illustrating a relationship between an operation region R and an approximate instructed direction according to the Second Embodiment. The operation region R includes the reference point Q, an up-direction region RD1, a right-direction region RD2, a down-direction region RD3, and a left-direction region RD4. Hereinafter, each of the up-direction region RD1, the right-direction region RD2, the down-direction region RD3, and the left-direction region RD4 may be referred to as a "direction region RD". The up-direction region RD1 is set above the reference point Q on the touch panel 11, and the right-direction region RD2, the down-direction region RD3, and the left-direction region RD4 are set to the right of, below, and to the left of the reference point Q, respectively. The up-direction region RD1 is associated with the up direction of the game space G, and the right-direction region RD2, the down-direction region RD3, and the left-direction region RD4 are associated with the right direction, the down direction, and the left direction of the game space G, respectively.

Each of the up-direction region RD1, the right-direction region RD2, the down-direction region RD3, and the left-direction region RD4 has a shape of a circular sector with a central angle around the reference point Q and an outer edge of the operation region R as an arc. In the Second Embodiment, the central angle of the sector is an angle obtained by equally dividing the angle of 360 degrees into four parts, i.e., 90 degrees. Therefore, the overlapping regions in which adjacent direction regions RD overlap each other are not formed in the Second Embodiment.

In the present embodiment, overlapping regions are not formed in the operation region R, but the direction regions RD may be configured so that overlapping regions are formed as in the First Embodiment. In this case, the moving direction of the character C is designated in accordance with Scenario 1-1, 1-2, 2-1, 2-2, or 2-3 described in the First Embodiment.

The designator 224 determines in which direction region RD a touch location in the operation region R is located, and determines a direction associated with the direction region RD in which the touch location is located to be the approximate instructed direction. The designator 224 refers to the map of the game space G and judges whether or not it is possible for the character to move in the approximate instructed direction from the current location of the character C. More specifically, the designator 224 refers to the map data and judges whether or not the movable area of at least the minimum moving distance extends in an area in the approximate instructed direction from the current location of the character C. In a case in which it is possible for the character to move in the approximate instructed direction, the designator 224 designates the approximate instructed direction as the moving direction of the character C.

On the other hand, in a case in which it is not possible for the character to move in the approximate instructed direction, the designator 224 designates the stoppage of the movement of the character C. That is, in a case in which there is a portion in which the movement of the character C in the moving direction is blocked in an area in the moving direction of character C in the game space G, the designator 224 designates the stoppage of the movement of the character C in that portion.

Specific description is now given with reference to FIG. 10. For example, the designator 224 designates the moving direction of the character C to be the upper right in a case in which (i) and (ii) are both satisfied: (i) the character C is located in the central portion of the square S1 (the location of the character C5); and (ii) the user touches the touch location T of the upper right of the reference point Q (in the vicinity of the border between the up-direction region RD1 and the right-direction region RD2) in the operation region R. This is because, when viewed from the character C located in the central portion of the square S1, no block B for blocking the movement is arranged in the upper right direction.

On the other hand, for example, in a case in which (i) and (ii) are both satisfied: (i) the character C is located in the path L7 (the location of the character C6); and (ii) the user touches the touch location T, the designator 224 designates the moving direction based on the approximate instructed direction. This is because, when viewed from the character C located in the path L7, a block B for blocking the movement is arranged in the upper right direction. In a case in which the touch location T is located in the up-direction region RD1, the designator 224 designates stoppage of the moving of the character C. This is because, when viewed from the character C located in the path L7, a block B for blocking the movement is arranged in the up direction. In a case in which the touch location T is located in the right-direction region RD2, the designator 224 designates the right direction as the moving direction of the character C. This is because, when viewed from the character C located in the path L7, no block B for blocking the movement is arranged in the right direction, and therefore, the area in the right direction when viewed from the character C is a movable area.

In the game space G, in a case in which there are multiple paths L in which the character C is movable, the predictor 226 predicts, from among the multiple paths L, a path in which the character C will be moving, based on the moving direction designated by the designator 224 and the shape of the environment, which restricts the movement of the character C in the game space G.

The path L in which the character C is movable may be, for example, a path L located in an area in the moving direction of the character C and also on the extension line of the current moving direction. Even if the path is not on the extension line of the current moving direction, the path L in which the character C is movable may be a path reachable in a case in which the moving direction is changed due to the shape of the path L (e.g., when the character enters from a region in which the character is movable along the user-instructed direction into a region in which the character moves in the approximate instructed direction, etc.). Even if the path is not on the extension line of the current moving direction, it may be a path reachable in a case in which the touch location on the operation region R is changed by the user. Furthermore, multiple paths L in which the character C is movable may be, for example, a path L in which the character C is currently moving and another path L that is connected to the currently moving path L, or may be multiple paths connected to the square S in which the character C is movable in any direction.

For example, in FIG. 10, in a case in which the character C is located in the square S1, the paths L9, L10, and L11 connecting to the square S1 are the multiple paths L in which the character C is movable. Furthermore, for example, in a case in which the character C is located in the path L7, the path L7 and the path L8 below the connection point P4 are the multiple paths L in which the character is movable.

The predictor 226 acquires information on a path L in which the character C is movable, by referring to the map data of the game space G included in, for example, the application program of the game. For example, the predictor 226 refers to the map data of a predetermined range from the current location of the character C in the game space G, and judges whether there are multiple paths L in which the character C is movable.

Figure 13:
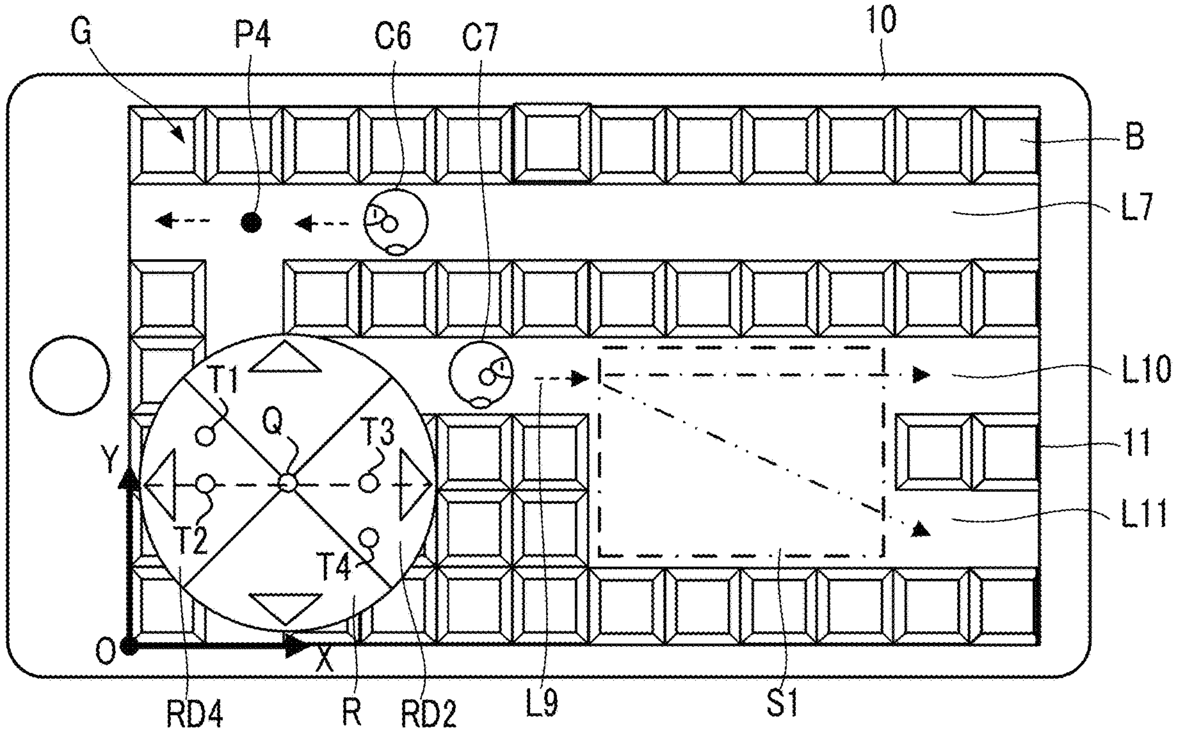
FIG. 13 is a diagram showing a prediction method of a path L by a predictor 226.

FIG. 13 is a diagram illustrating a prediction method of a path L by the predictor 226. In FIG. 13, a game space G of the same range as in FIG. 10 is displayed on the touch panel 11. In a case in which the character C does not pass through a freely movable region (such as the square S) before reaching the multiple movable paths L, the predictor 226 predicts that the character C will move to a path L on the extension of the moving direction from the current position designated by the designator 224. For example, in a case in which the character C6 is moving in the path L7 in the left direction, the touch location of the user is either on a straight line extending to the left along the X-axis from the reference point Q (when the character is moving in the user-instructed direction, e.g., the touch location T1), or on any other location within the left-direction region RD4 (when the character is moving in the approximate instructed direction, e.g., the touch location T2). In either case, as long as the touch location does not change, the character C6 moves to the left even at the connection point P4. Therefore, the predictor 226 predicts that the character C6 will move in the path L7 even after passing the connection point P4.

On the other hand, in a case in which the character C moves in a freely movable region such as the square S before reaching multiple paths L, there is a possibility that the character C will move to a path L that is not on the extension of the moving direction from the current position designated by the designator 224. For example, in a case in which the character C7 moves in the path L9 in the right direction, the touch location of the user is either on a straight line extending to the right along the X-axis from the reference point Q (when the character is moving in the user-instructed direction, e.g., the touch location T3), or any other location within right-direction region RD2 (when the character is moving in the approximate instructed direction, e.g., the touch location T4). When moving in accordance with the user-instructed direction (in the case of the touch location T3), it is predicted that the character C7 will continue to move in the right direction even after entering the square S1 and move into the path L10 as indicated by a dashed-dotted arrow. On the other hand, when moving in the approximate instructed direction (in the case of the touch location T4), it is predicted that the character C7, after entering the square S1, will change the moving direction to the lower right (the moving direction designated by the designator 224 will change from the approximate instructed direction to the user-instructed direction) and move into the path L11 as shown by a two-dot dashed arrow.

As described in the foregoing, in the game space G, in a case in which there are multiple paths L in which the character C is movable, the predictor 226 predicts, from among the multiple paths L, a path in which the character C will be moving, based on the moving direction designated by the designator 224 and the shape of the environment that restricts the movement of the character C in the game space G.

Since the moving direction designated by the designator 224 is based on the touch location in the operation region R, it can be said that the predictor 226 predicts a path in which the character C will be moving based on the touch location. That is, in a case in which, in the game space G, there are multiple paths L in which the character C is movable, the predictor 226 may predict, from among the multiple paths L, a path in which the character C will be moving based on the touch location of the touch panel 11 and the shape of the environment that restricts the movement of the character C in the game space G.

The display controller 228 displays in the game space G an image (hereinafter, referred to as a "prediction result image") indicating a prediction result by the predictor 226. For example, the display controller 228 preferably displays a prediction result image before the character C reaches the path L in which the character C is predicted to move. Alternatively, the display controller 228 may display the prediction result image before the character C reaches any one of multiple paths L in which the character C is movable. The "reaching the path L" may be, for example, reaching a connection point P of the path L and another path L. Furthermore, the "reaching the path L" may be, for example, in the case of the path L connected to the square S, reaching the entrance to the path L.

By displaying the prediction result image, the user can determine in advance whether to continue with the current touch location or change the touch location (e.g., before the character C reaches at least one of the multiple paths L), thereby reducing or preventing instances of erroneous operations.

Figure 14:
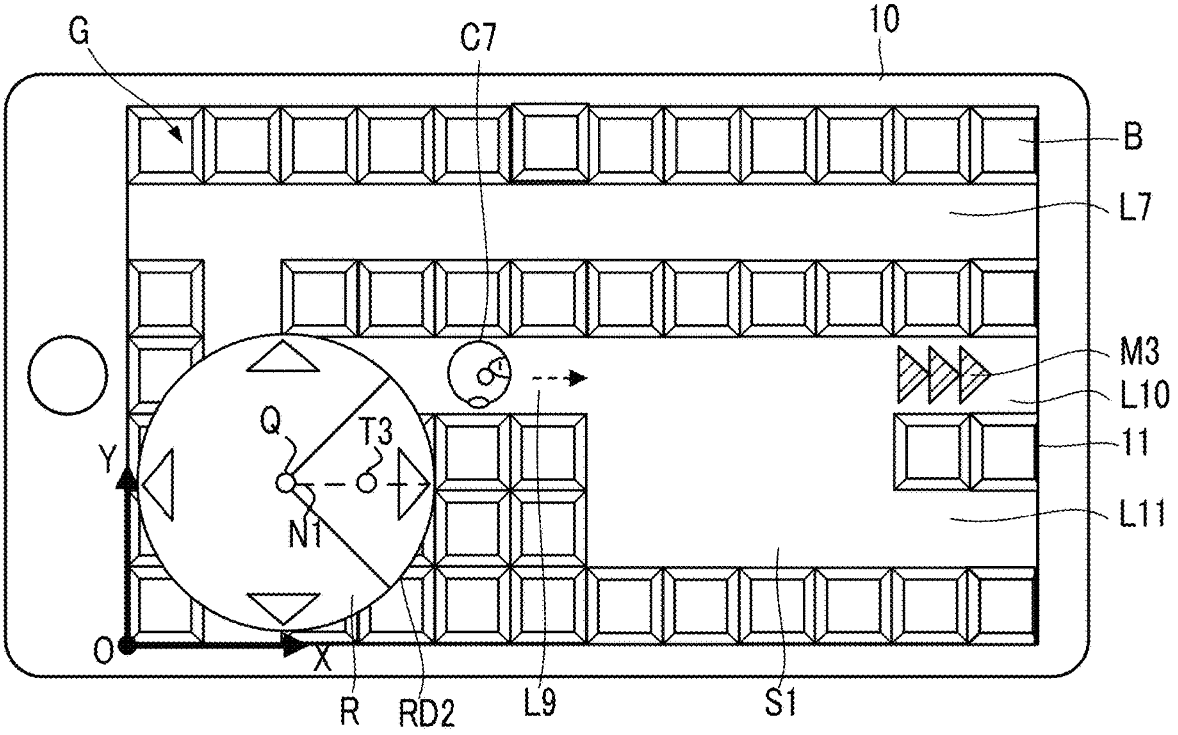
FIG. 14 is a diagram illustrating an example display on the touch panel 11 according to the Second Embodiment.
Figure 15:
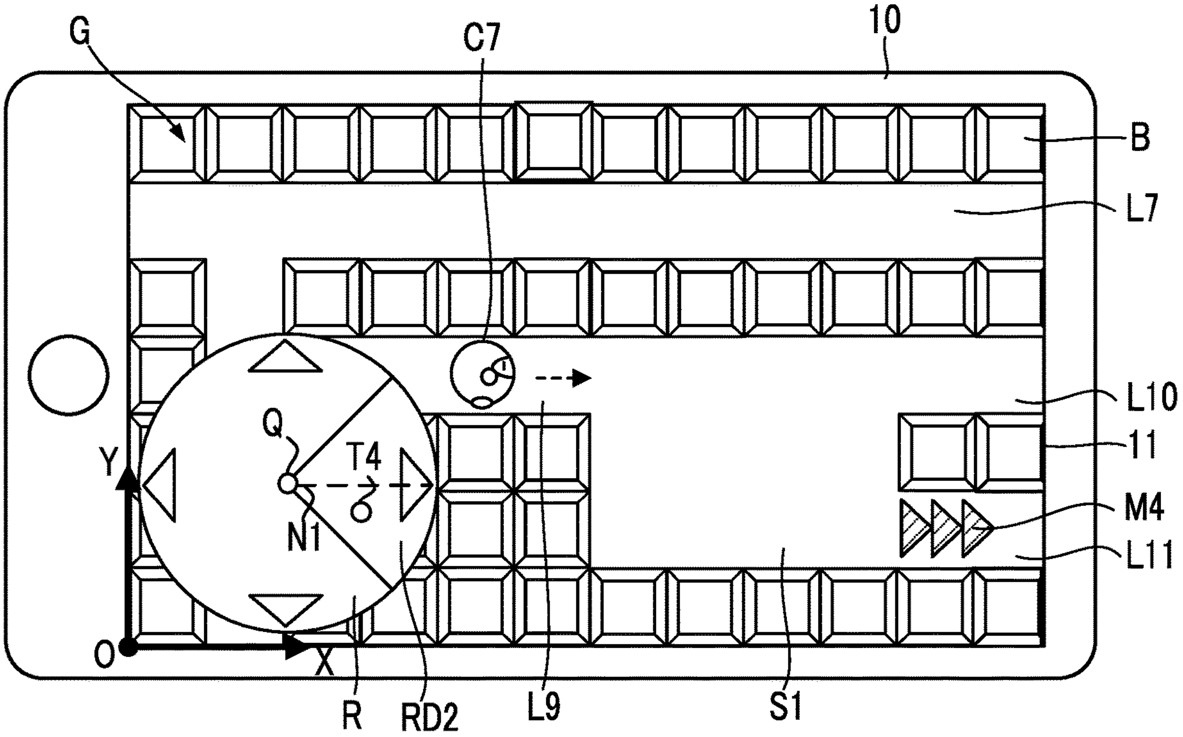
FIG. 15 is a diagram illustrating an example display on the touch panel 11 according to the Second Embodiment.

FIGS. 14 and 15 are each a diagram illustrating an example of the display of the touch panel 11 according to the Second Embodiment. In FIGS. 14 and 15, a game space G of the same range as that in FIG. 13 is displayed on the touch panel 11. For example, as shown in FIG. 14, the predictor 226 predicts that the character C7 will move into the path L10 as described above, in a case in which (i) and (ii) are both satisfied: (i) the character C7 moves in the path L9 in the right direction; and (ii) the user's touch location is located at the touch location T3, which is on the straight line N1 extending rightward along the X-axis from the reference point Q. The display controller 228 displays, in the game space G, a mark M3 indicating that the character C7 will move in the path L10 among the multiple paths L10 and L11. In the example of FIG. 14, the display controller 228 displays the mark M3 before the character C7 reaches the path L10, more specifically, before the character C7 enters the square S1.

The mark M3 is an example of a prediction result image. In the example of FIG. 14, the mark M3 has a shape in which three triangles are connected along the extending direction of the path L10, with the base of the respective triangle extending along the widthwise direction of the path L10, and the diagonal angle being located to the right with respect to the base. Such a mark M3 is suggestive of a move along the path L10. Furthermore, in the example of FIG. 14, the displayed position of the mark M3 is in the vicinity of the entry point from the square S1 to the path L10. By displaying the mark M3 in the vicinity of the entry point from the square S1 to the path L10, the user can easily grasp that the moving direction of the character C7 indicated by the mark M3 is the moving direction from the square S1. By looking at the mark M3, the user can recognize that the character C7 will enter the path L10 after passing through the square S1. If the user allows entry into the path L10, the user may maintain the touch location as it is. On the other hand, if the user desires to move the character C7 to a position other than the path L10, the user may change the moving direction by changing the touch location.

Furthermore, for example, as illustrated in FIG. 15, in a case in which the character C7 moves in the right-direction in the path L9 and in which the touch location is below the straight line N1 in the right direction region RD2 (e.g., the touch location T4), the predictor 226 predicts that the character C7 will move into the path L11 as described above. The display controller 228 displays, in the game space G, a mark M4 indicating that the character C7 will move in the path L11 among the multiple paths L10 and L11. Also in FIG. 15, the display controller 228 displays the mark M4 before the character C7 reaches the path L11, more specifically, before the character C7 enters the square S1.

The mark M4 is an example of the prediction result image. In the example of FIG. 15, the mark M4 has a shape in which three triangles are connected along the extending direction of the path L11, with the base of the respective triangle extending along the widthwise direction of the path L11, and the diagonal angle being located to the right with respect to the base. Such a mark M4 is suggestive of a move along the path L11. Furthermore, in the example of FIG. 15, the displayed position of the mark M4 is in the vicinity of the entry point from the square S1 to the path L11. By displaying the mark M4 in the vicinity of the entry point from the square S1 to the path L11, the user can easily grasp that the moving direction of the character C7 indicated by the mark M4 is the moving direction from the square S1. By looking at the mark M4, the user can recognize that the character C7 will enter the path L11 after passing through the square S1. If the user allows entry into the path L11, the user may maintain the touch location as it is. On the other hand, if the user desires to move the character C7 to a position other than the path L11, the user may change the moving direction by changing the touch location.

Figure 16A:
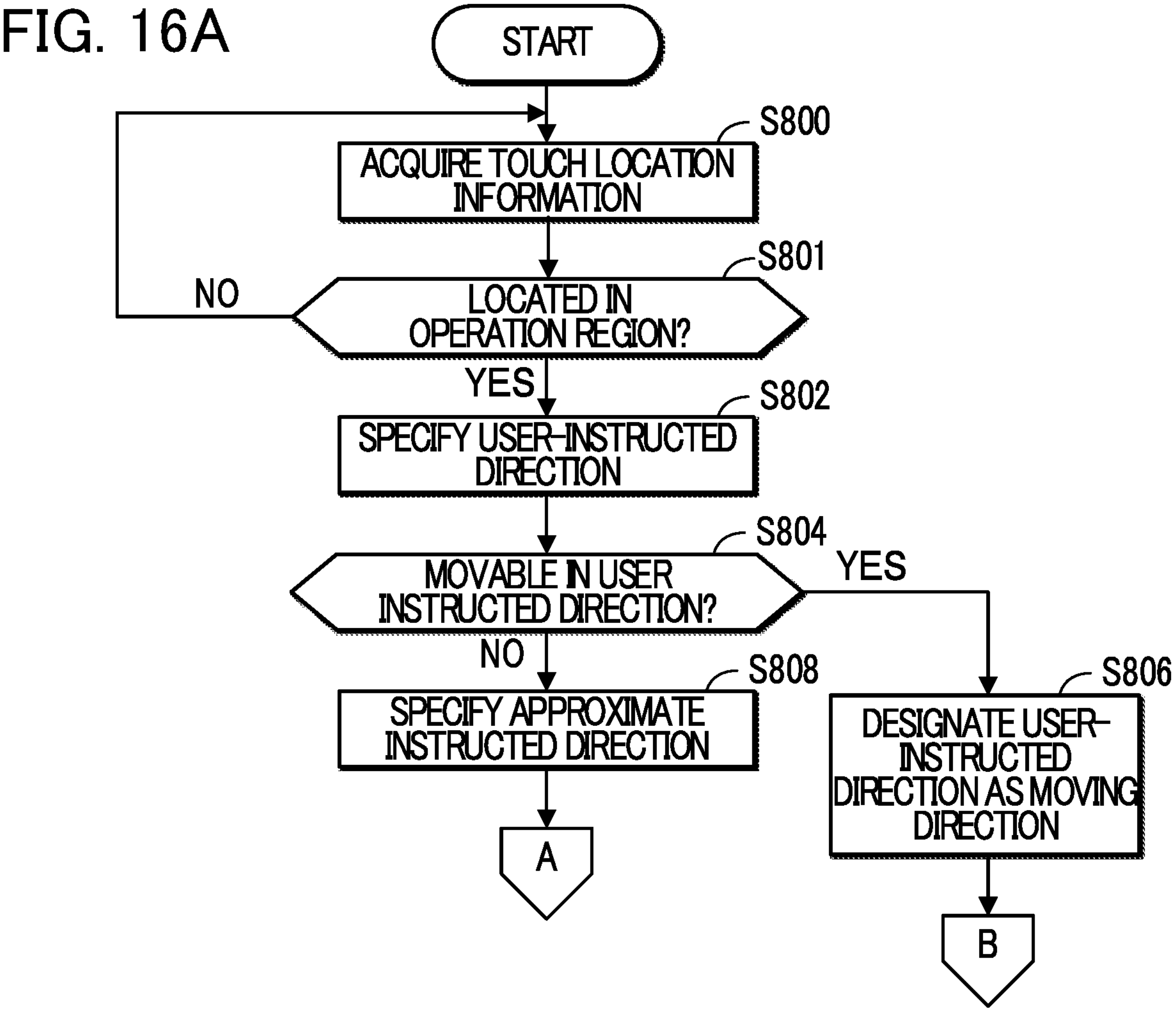
FIG. 16A is a flowchart showing a process of the controller 220 according to the Second Embodiment.
Figure 16B:
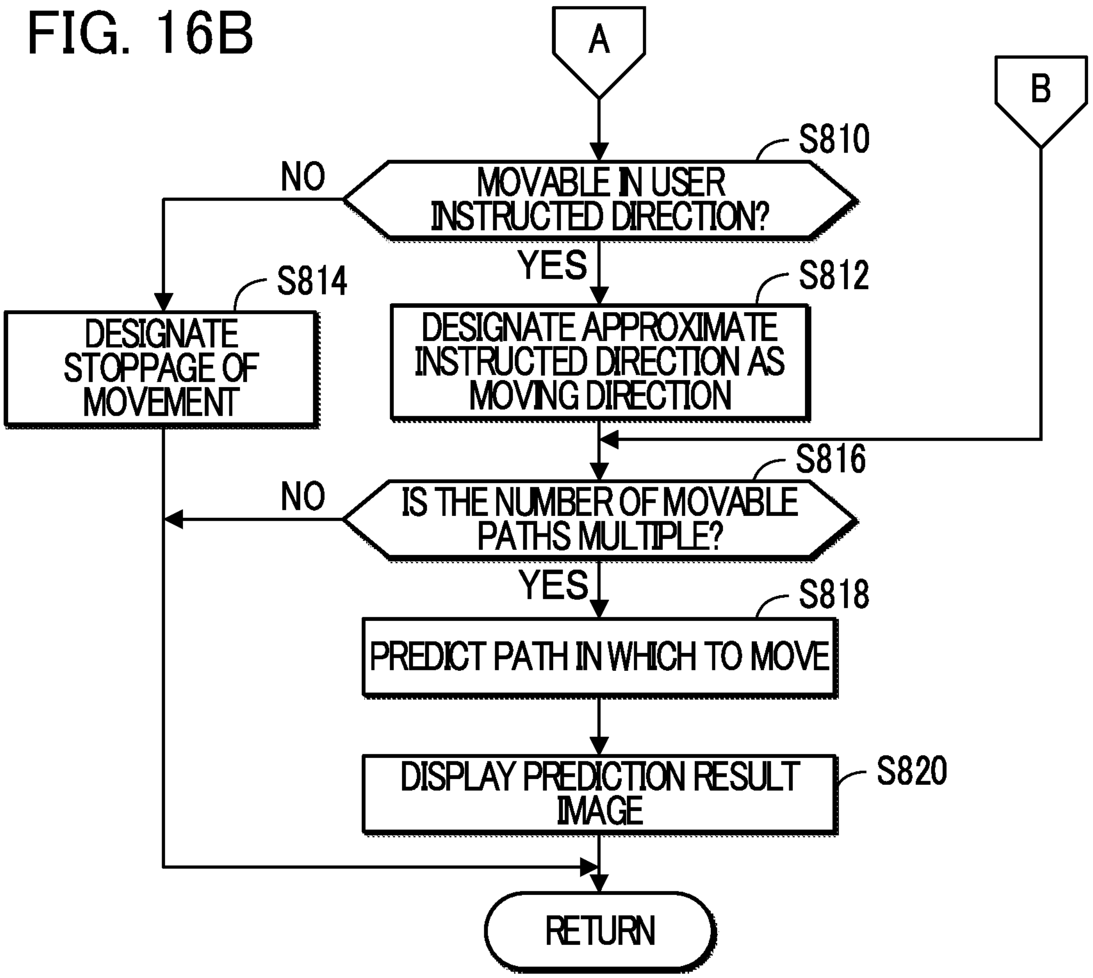
FIG. 16B is a flowchart showing a process of the controller 220 according to the Second Embodiment.

Next, an example operation of the controller 220 of the information processing apparatus 20 according to the Second Embodiment will be described with reference to FIGS. 16A and 16B. The operations illustrated in FIGS. 16A and 16B are initiated in response to a predetermined start operation.

The acquirer 222 acquires touch location information indicating a touch location on the touch panel 11 (step S800). In a case in which the touch location indicated by the touch location information is not located in the operation region R (step S801: NO), the controller 220 returns to step S800. In a case in which the touch location is located in the operation region R (step S801: YES), the designator 224 specifies, based on a positional relationship between the reference point Q and the touch location in the operation region R, a user-instructed direction that is a direction received as a movement instruction from the user (step S802). The designator 224 judges whether or not the character C is movable in the user-instructed direction based on map data of the vicinity of the current location of the character C (step S804). In a case in which it is possible for the character to move in the user-instructed direction (step S804: YES), the designator 224 designates the user-instructed direction as the moving direction of the character C (step S806).

On the other hand, in a case in which it is not possible to move in the user-instructed direction (step S804: NO), the designator 224, based on in which direction region RD of the operation region R the touch location is located, specifies an approximate instructed direction (step S808). That is, the designator 224 sets a direction associated with the direction region RD in which the touch location is located as the approximate instructed direction. The designator 224 judges whether or not the character C is movable in the approximate instructed direction based on the map data of the vicinity of the current location of the character C (step S810). In a case in which it is possible for the character to move in the approximate instructed direction (step S810: YES), the designator 224 designates the approximate instructed direction as the moving direction of the character C (step S812). On the other hand, in a case in which it is not possible to move in the approximate instructed direction (step S810:

NO), the designator 224 designates stoppage of the movement of the character C (step S814), and returns to step S800.

In a case in which the moving direction is designated by the designator 224 (at step S806, S812), the game controller 221 causes the character C in the game space G to move in the designated moving direction. In a case in which it is designated by the designator 224 to stop the movement of the character C (step S814), the game controller 221 stops the movement of the character C in the game space G.

In a case in which the moving direction is designated at step S808 or S812, the predictor 226 judges whether or not there are multiple paths L along which the character C is movable (step S816). In a case in which the number of paths L in which the character C is movable is not multiple (step S816: NO), the controller 220 returns to step S800. On the other hand, in a case in which there are multiple paths L in which the character C is movable (step S816: YES), the predictor 226 predicts, from among the multiple paths L, a path L in which the character C moves, based on the moving direction of the character C and the arrangement of blocks B in the vicinity of the character C (step S818). The display controller 228 displays a prediction result image in the game space G (step S820), and returns to step S800.

For example, the determination at step S816 as to whether or not there are multiple paths L of the character C is movable will be NO in a case in which the character C enters the predicted path L after the prediction result is displayed at step S820. Accordingly, the process does not reach step S820 and no prediction result image is displayed. For example, in a case in which the number of paths L along which the character C is movable is no longer multiple (including a case in which there is no movable path L) as a result of the character C changing the moving direction after the prediction result image is displayed at step S816, the determination at step S820 as to whether or not there are multiple paths L in which the character C is movable will be NO. Accordingly, the process does not reach step S820 and no prediction result image is displayed.

As described above, according to the Second Embodiment, in a case in which there are multiple paths L in an area in the moving direction of the character C in the game space G, the predictor 226 predicts a path L in which the character C moves, and the display controller 228 displays a prediction result image in the game space G. Thus, the user can grasp in advance which of multiple paths L the character C is moving, and it is possible to reduce or prevent erroneous operations such as an instruction to move the character C in an unintended direction.

In the Second Embodiment, for example, configurations exemplified below may be adopted.

Modification B1

Figure 25:
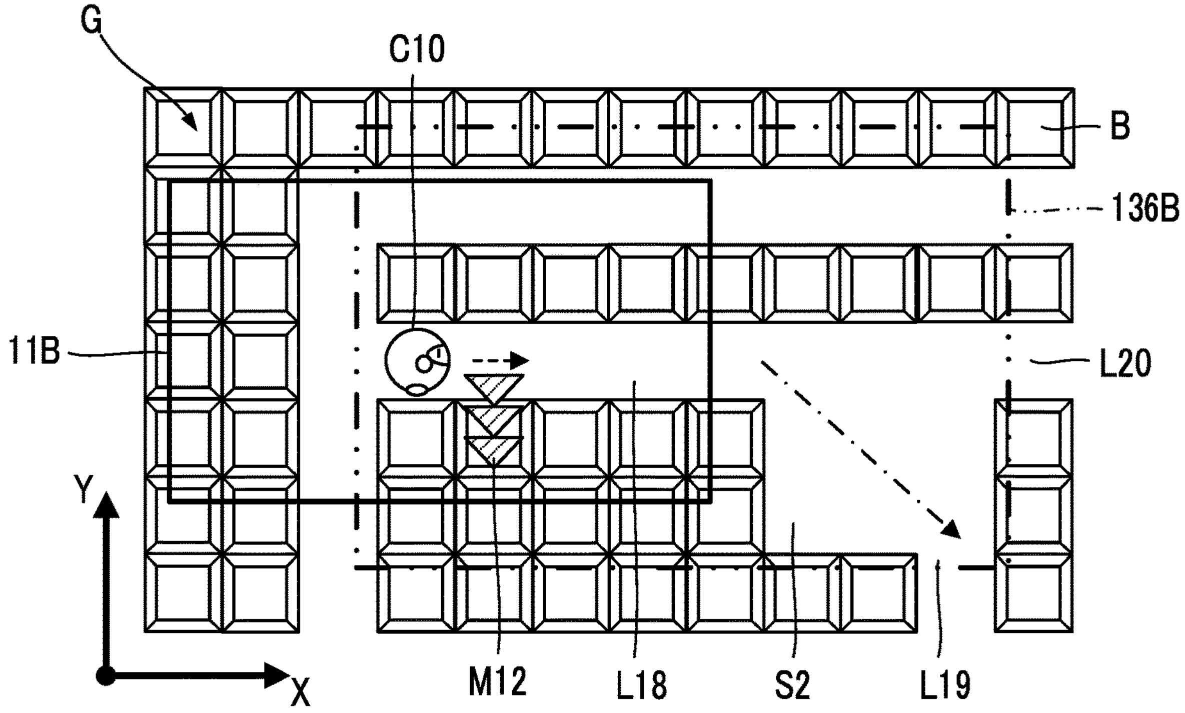
FIG. 25 is a diagram showing an example display on the touch panel 11 according to Modification B2.

In the Second Embodiment described above, the display controller 228 displays a prediction result image at a position based on the path L in which a character C is predicted to move. However, the present invention is not limited thereto. The display controller 228 may display the prediction result image at a position based on the character C in the game space G. Specifically, for example, as shown in FIG. 25, a mark M12 that is a prediction result image may be displayed ahead of and in the vicinity of the character C10.

The "position based on the character C" may be a position having a predetermined positional relationship with the character C, may be a position within a range of a predetermined distance or less from the character C, or may be a position in a predetermined direction with respect to the character C, for example. Specifically, the "position based on the character C" may be, for example, the current location of the character C in the game space G, or may be a position in the path ahead or behind in the moving direction of the character C. Furthermore, the "position based on the character C" may be, for example, a movement restricted space (e.g., on the block B) in the vicinity of the character C. In general, a user who is playing a game often gazes at the character C. With the prediction result image being displayed at a position based on the character C, the user can check the prediction result image without greatly moving the line of sight from the character C.

Modification B2

In the Second Embodiment described above, the prediction result image is an image indicating a prediction result for multiple paths L located within the display range of the touch panel 11. However, the present invention is not limited thereto. For example, there may be displayed a prediction result image of a case in which at least one of multiple paths L is located outside the display range of the touch panel 11. That is, the display controller 228 may cause the touch panel 11 to display an image representing a part of the game space G, and display a prediction result image at, of the game space G, a position based on a positional relationship between the display range of the touch panel 11 and the path L in which the character C is predicted to move.

The "image representing a part of the game space" is, for example, an image obtained by extracting the part of the game space G, and an image in which not the entire area of the game space G is displayed. The image representing a part of the game space G is, for example, an image obtained by extracting a predetermined range based on the location of the character C in the game space G. The "position based on a positional relationship between the display range and the path L in which the character C is predicted to move (hereinafter, referred to as a 'predicted path')" may be, for example, a position that is selectively changed depending on whether or not the predicted path L is included in the display range. For example, in a case in which the predicted path L is located within the display range, a position on the predicted path L may be set as "a position based on a positional relationship between the display range and the predicted path L". In a case in which the predicted path L is located outside the display range, a position on the character C (or a position between the character C and the predicted path L within the display range) may be set as "a position based on a positional relationship between the display range and the predicted path L".

Figure 26:
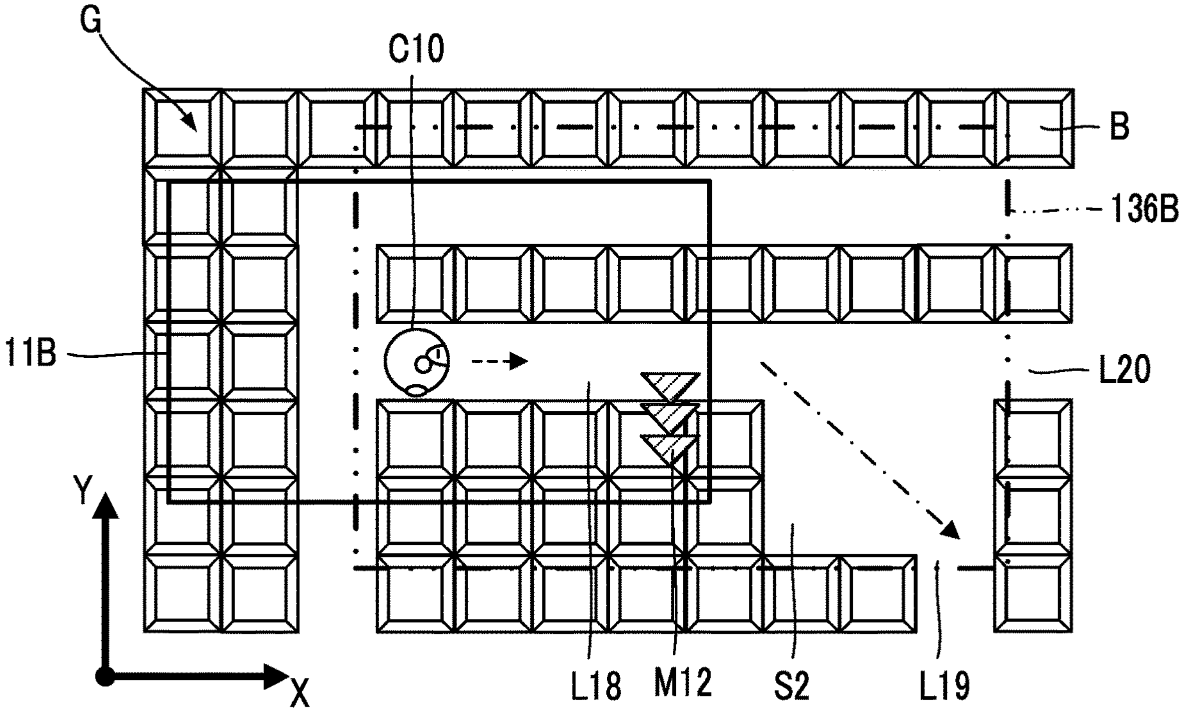
FIG. 26 is a diagram showing an example display on the touch panel 11 according to Modification B2.

FIGS. 25 and 26 are each a diagram illustrating an example display of the touch panel 11 according to Modification B2. FIGS. 25 and 26 each show a game space G that is larger than the display range 11B of the touch panel 11. In FIGS. 25 and 26, the display range 11B of the touch panel 11 is a predetermined range based on the location of a character C10. Therefore, as the character C10 moves, the display range 11B of the touch panel 11 also moves. The character C10 moves in the right direction in a path L18 extending in the X-axis direction. The right side of the path L18 is connected to a square S2. A path L20 is connected to the upper right portion of the square S2, and a path L19 is connected to the lower right portion of the square S2. It is assumed that the touch location by the user is a position very close to the down-direction region RD3 in the right-direction region RD2 (see FIG. 12). Accordingly, the character C10 moves rightward in accordance with an approximate instructed direction in the path L18, but when the character enters the square S2, it is predicted that the character will advance in the user-instructed direction as indicated by a dashed-dotted line, to move into the path L19.

The display controller 228 displays the prediction result, starting from before the paths L19 and L20 are displayed on the touch panel 11. For example, as illustrated in FIG. 25, the display controller 228 may display in the vicinity of the character C10 a mark M12 that is a prediction result image. The displayed position of the mark M12 is changed as the character C10 moves. That is, the mark M12 is displayed so that a positional relationship between the display position and the location of the character C10 are constant. The mark M12 has a configuration in which three triangles are connected along the Y direction, which is the extending direction of the path L19, with the base of the respective triangle extending along the X direction, which is the widthwise direction of the path L19, and the diagonal angle being located below with respect to the base. Such a mark M12 is suggestive of a move in the down direction. By looking at the mark M12, the user can know in advance that there are multiple paths L in the moving direction of the character C10 (prior to the path L19 or L20 entering the display range). Furthermore, by looking at the mark M12, the user is able to know in advance (prior to reaching the path L19) that the moving direction of the character C10 at a moving destination is the down direction. Also, in general, a user who is playing a game often gazes at the character C10. With the mark M12 being displayed in the vicinity of the character C10, the user can recognize the mark M12 without greatly moving the line of sight from the character C10.

Although the mark M12 is displayed ahead of and in the vicinity of the character C10 in FIG. 25, the mark may be displayed at one of various "positions based on the character C" as shown in Modification B1. In other words, FIG. 25 shows one display mode according to Modification B1.

For example, as illustrated in FIG. 26, the mark M12 may be displayed in, of the display range 11B of the touch panel 11, an end portion close to the multiple paths L19 and L20. By displaying the mark M12 on the end portion of the touch panel 11, the user can intuitively grasp a direction in which multiple paths L19, L20 are located.

In the display mode of FIG. 25, in a case in which, as a result of the character C10 moving, the path L19 enters the display range of the touch panel 11, the display position of the mark M12 may be changed to the vicinity of the path L19, or the display position of the mark M12 may remain in the vicinity of the character C10, for example. Furthermore, for example, the mark M12 may be displayed both in the vicinity of the path L19 and in the vicinity of the character C10. In the display mode shown in FIG. 26, in a case in which as a result of the character C10 moving, the path L19 has entered the display range of the touch panel 11, the movement of the mark M12 with respect to the game space G may be stopped at a timing at which the display position of the mark M12 overlaps with the path L19, so that the display position of the mark M12 is set to the position of the path L19, for example.

Furthermore, for example, a prediction result image may be displayed with a different appearance based on a positional relationship between the display range 11B and the path L19, in other words, a positional relationship between the character C10 and the path L19. Specifically, for example, the closer the position of the character C10 is to the position of the path L19, the darkness of the displayed color of the prediction result image may be increased, the size of the prediction result image may be increased, or the blinking rate of the prediction result image may be increased. As a result, the user can intuitively grasp the positional relationship between the character C10 and a connection point P that is not in the display range of the touch panel 11.

Modification B3

In the Second Embodiment described above, the predictor 226 predicts the moving direction at a junction of multiple paths L that is closest to the character C in the path L in which the character C moves, and the display controller 228 displays the prediction result image. However, the present invention is not limited thereto. The predictor 226 may, for example, predict a moving direction for each of multiple junctions in the path L in which the character C moves, and the display controller 228 may display the respective prediction result image.

It is to be noted that the junction may be, for example, a connection point at which multiple paths L are connected to each other, or may be, for example, a square S in a case in which multiple paths L are connected to the square S. Furthermore, for example, in a case in which multiple paths L are connected to a specific direction of the square S, the junction may be a partial region including, of the square S, an end portion in the specific direction.

Figure 27:
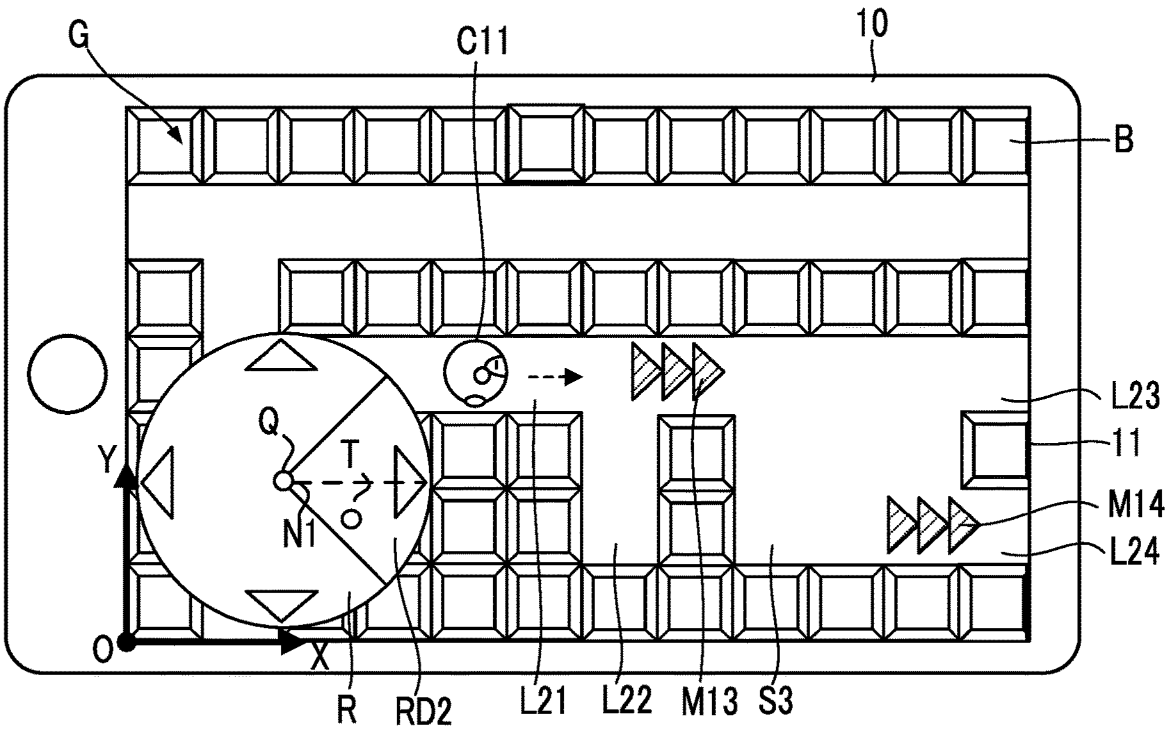
FIG. 27 is a diagram showing an example display on the touch panel 11 according to Modification B3.

FIG. 27 is a diagram illustrating an example display of the touch panel 11 according to Modification B3. In the touch panel 11 shown in FIG. 27, there are displayed a path L21 extending in the X-axis direction with the path width of the character length, a path L22 connected to the path L21 and extending in the Y-axis direction, a square S3 connected to the right portion of the path L21, a path L23 connected to the upper right portion of the square S3, and a path L24 connected to the lower right portion of the square S3. It is assumed that the character C11 is moving in the path L21 in the right direction. It is assumed that the touch location T of the user is in the right-direction region RD2 and below the straight line N1 extending in the X direction from the reference point Q.

On the path L21 (up to the square S3), the designator 224 designates moving of the character C11 to the right, which is the approximate instructed direction. Accordingly, the predictor 226 predicts that, at a junction with the path L22 in the path L21, the character C11 will continue to move in the path L21 in the right direction. The display controller 228 displays a mark M13 as a prediction result image corresponding to the prediction result.

In a case in which the character C11 enters the square S3, the designator 224 designates moving to the lower right in accordance with the user-instructed direction. The path L24 is connected to the lower right portion of the square S3, which is in the moving direction of the character C11. Accordingly, the predictor 226 predicts that, at the junction into the path L23 and the path L24 in the square S3, the character C11 will move into the path L24. The display controller 228 displays a mark M14 as a prediction result image corresponding to the prediction result.

That is, in a case in which there is a connection point with (junction with or into) another path L in the path L in which the character C is predicted to move, the predictor 226 predicts the moving direction of the character C at the connection point with (junction with or into) the other path L based on the touch location information. The display controller 228 displays, in the game space, a prediction result image corresponding to the connection point (junction) of multiple paths L and a prediction result image corresponding to the connection point (junction) with or into another path L. When applied to the example using FIG. 27, the path L in which the character C11 is predicted to move corresponds to the path L21, the other paths L correspond to the paths L23 and L24, the connection point with (junction into) the other paths L corresponds to the square S3, the prediction result image corresponding to the connection point (junction) of multiple paths L corresponds to the mark M13, and the prediction result image corresponding to the connection point with (junction into) the other path L corresponds to the mark M14.

By so doing, the user can check the moving direction at multiple connection points (junctions) in advance (before the character C reaches the square S3) to determine whether or not to change the touch location. Accordingly, it is possible to reduce or prevent erroneous operations. In particular, there is a case in which a distance between adjacent connection points (junctions) P is small. In such a case, if a selection result only for a connection point (junction) P closer to the character C is displayed, a user operation for a moving direction instruction at a farther connection point (junction) P might be delayed. By displaying moving directions for multiple connection points (junctions) in advance, the user is able to perform an operation for a moving direction instruction in plenty of time.

Modification B4

In the Second Embodiment, the display controller 228 displays a prediction result image in a case in which a path L in which the character C moves is selected from among the multiple paths L, but no image is displayed in a case in which there is no path L in which the character C is movable and in which the movement of the character C is stopped as a result. However, the present invention is not limited thereto. Also in a case in which the movement of the character C is stopped, the display controller 228 may display an image indicating that the movement of the character C is stopped.

For example, even in a case in which the designator 224 designates that the movement of the character C is stopped at a place other than a connection point of multiple paths L (e.g., an end of the path L), the display controller 228 may display an image indicating that the character C stops moving. For example, in a case in which the character C is moving toward a block B that is at a distance greater than the minimum moving distance of the character C and in which the movement of the character C is stopped at the position of the block B, the designator 224 may designate to stop the movement of the character C at that position in advance (before the distance between the character C and the block B becomes less than or equal to the minimum moving distance of the character C). Also in this case, the display controller 228 may display in the game space G an image indicating a result of designation of stoppage by the designator 224.

Figure 28:
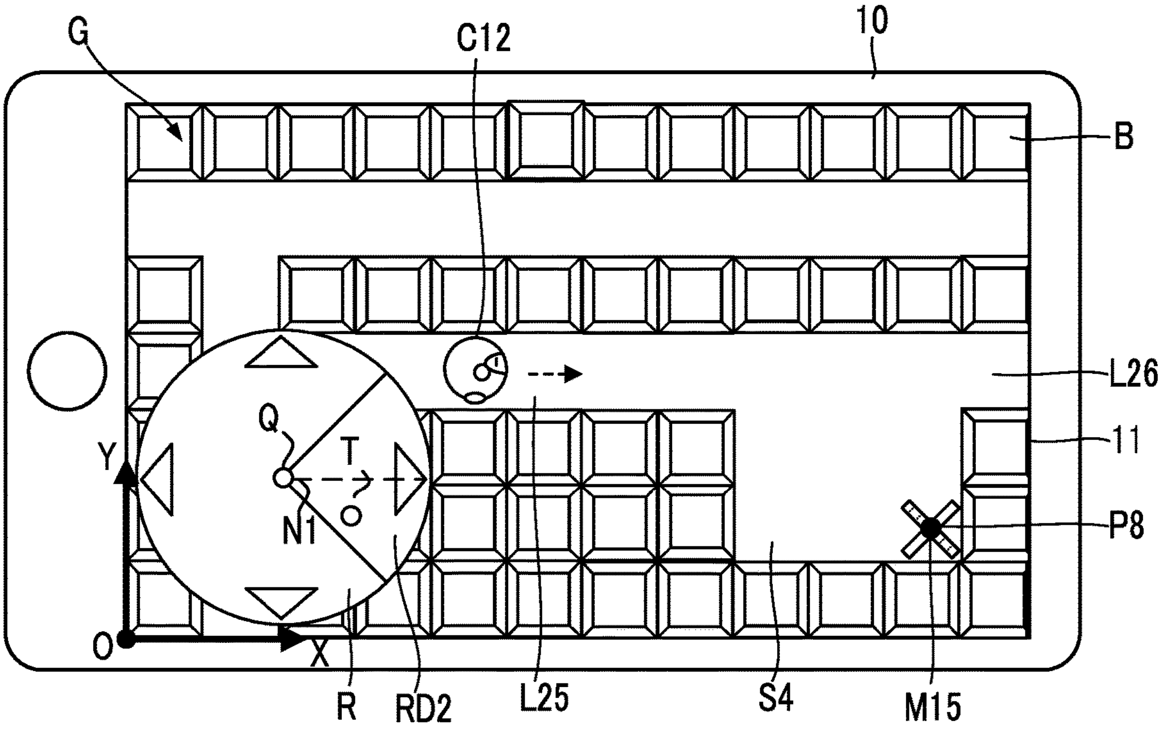
FIG. 28 is a diagram showing an example display on the touch panel 11 according to Modification B4.

FIG. 28 is a diagram illustrating an example display of the touch panel 11 according to Modification B4. There are displayed on the touch panel 11 shown in FIG. 28 a path L25 extending in the X-axis direction and having the path width of a character length, a square S4 connected to the right portion of the path L25, and a path L26 connected to the upper right portion of the square S4. It is assumed that the character C12 is moving in the path L25 in the right direction. Furthermore, it is assumed that the touch location T of the user is in the right-direction region RD2 and below the straight line N1 extending in the X direction from the reference point Q.

On the path L25 (up to the square S4), the designator 224 designates moving of the character C12 in the right direction, which is an approximate instructed direction. Furthermore, in a case in which the character C12 enters the square S4, the designator 224 designates moving to the lower right in accordance with the user-instructed direction. The right direction and down direction are the moving directions of the character C12, and blocks B are arranged in an area in the right direction (except for the entrance to the path L26) and in an area in the down direction of the square S4. Therefore, the character C12 cannot move any further. Therefore, the designator 224 designates stoppage of the character C12 at a point P8 in the lower right portion of the square S4. The display controller 228 displays in the game space G an image indicating the designation of stoppage of the character C12 by the designator 224. In FIG. 28, the display controller 228 displays a mark M15, "X", at the position of the point P8. Although the mark M15 may be displayed at any position, it is preferable that the user be able to know at which position the character C12 is stopping. Therefore, it is preferable that the displayed position be based on, for example, a position at which the movement of the character C12 will be blocked.

That is, in a case in which there is a portion at which the movement of the character C in the moving direction is blocked in an area in the moving direction of character C in the game space G, the designator 224 designates the stoppage of the movement of the character in that portion. The display controller 228 displays in the game space G an image indicating the stoppage of the character C. When applied to the example using FIG. 28, an area in the moving direction of the character C12 corresponds to the lower right portion in the square S4, the location at which the movement is blocked corresponds to the point P8, the image indicating the stoppage of the character C12 corresponds to the mark M15.

The "location at which movement is blocked" is, for example, a location at which an obstacle (environmental component) that restricts movement of the character C such as a block B is arranged. Furthermore, the "image indicating the stoppage of the character C" may be, for example, an image suggesting that the movement of the character C will be stopping. The "image indicating the stoppage of the character C" may be, for example, an image easily distinguishable from an "image indicating a prediction result", such as the mark M3 of FIG. 14, and may be, for example, an image that simulates an X mark or a stop sign.

In this way, the user is able to know in advance that the character C will be stopping in the path L, and as necessary, can perform an operation (e.g., change of the touch location) for avoiding the stop.

Modification B5

In the Second Embodiment, the display controller 228 may display an image indicating a positional relationship between an extending direction of at least one of multiple paths L in which the character C is movable and the moving direction of the character C. The displayed image may also serve as a prediction result image.

Figure 29:
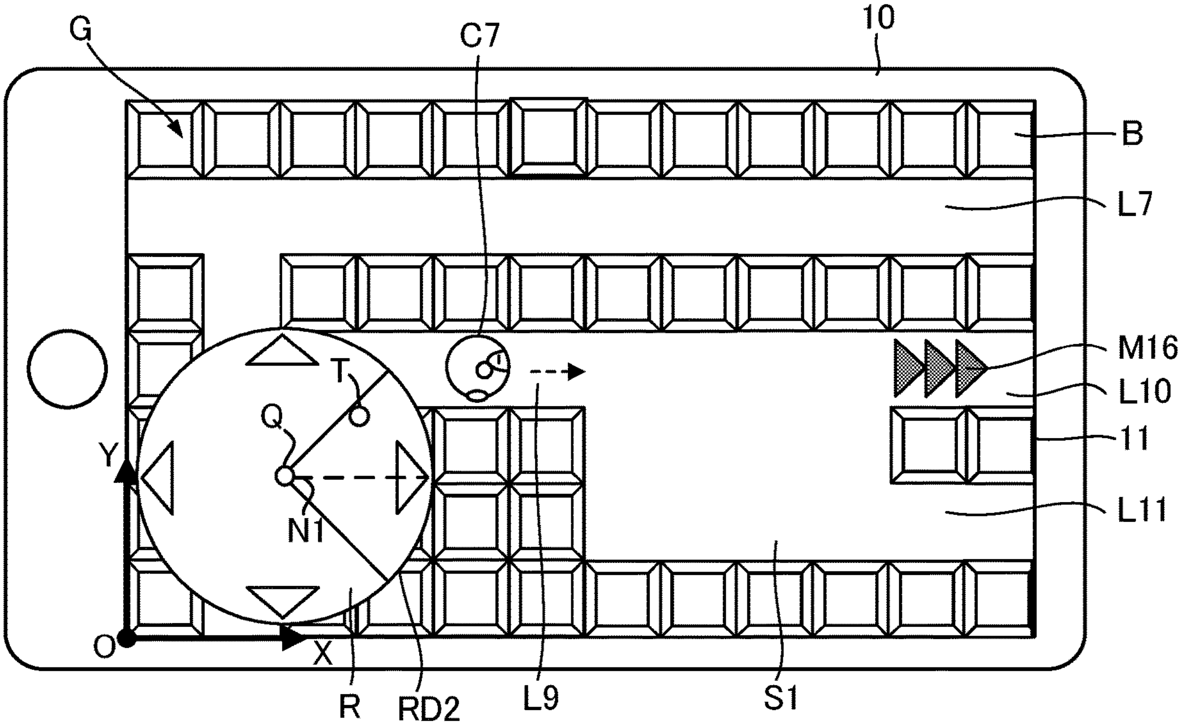
FIG. 29 is a diagram showing an example display on the touch panel 11 according to Modification B5.
Figure 30:
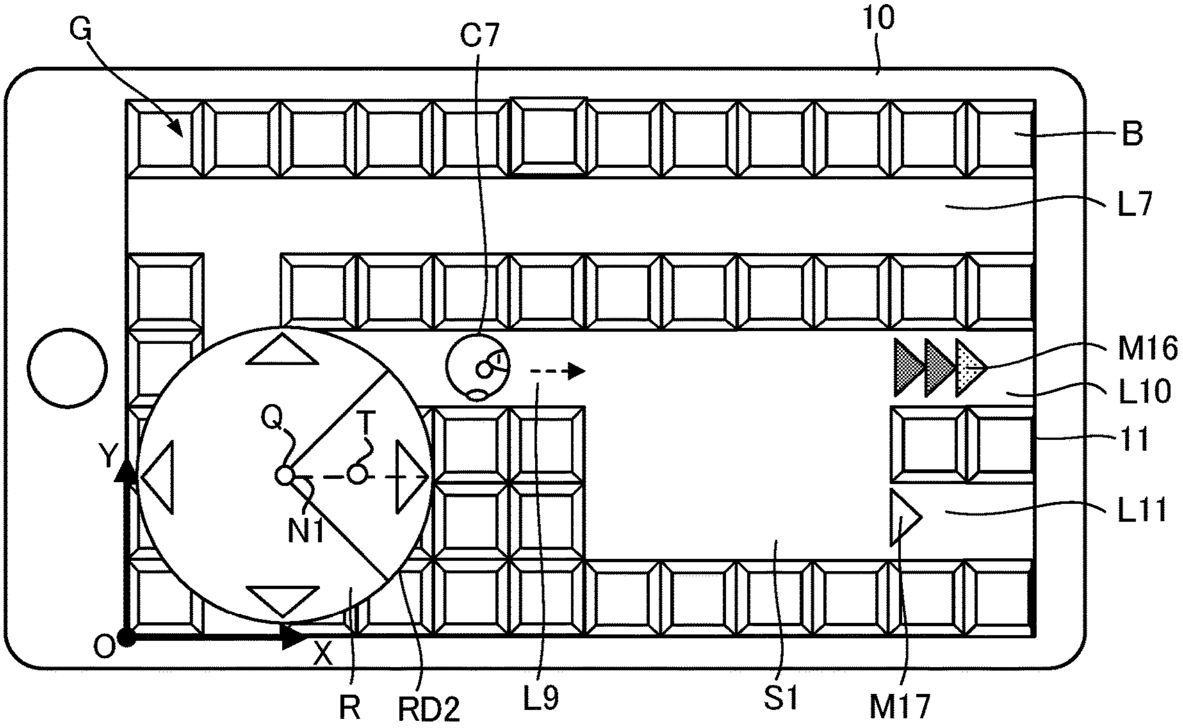
FIG. 30 is a diagram showing an example display on the touch panel 11 according to Modification B5.
Figure 31:
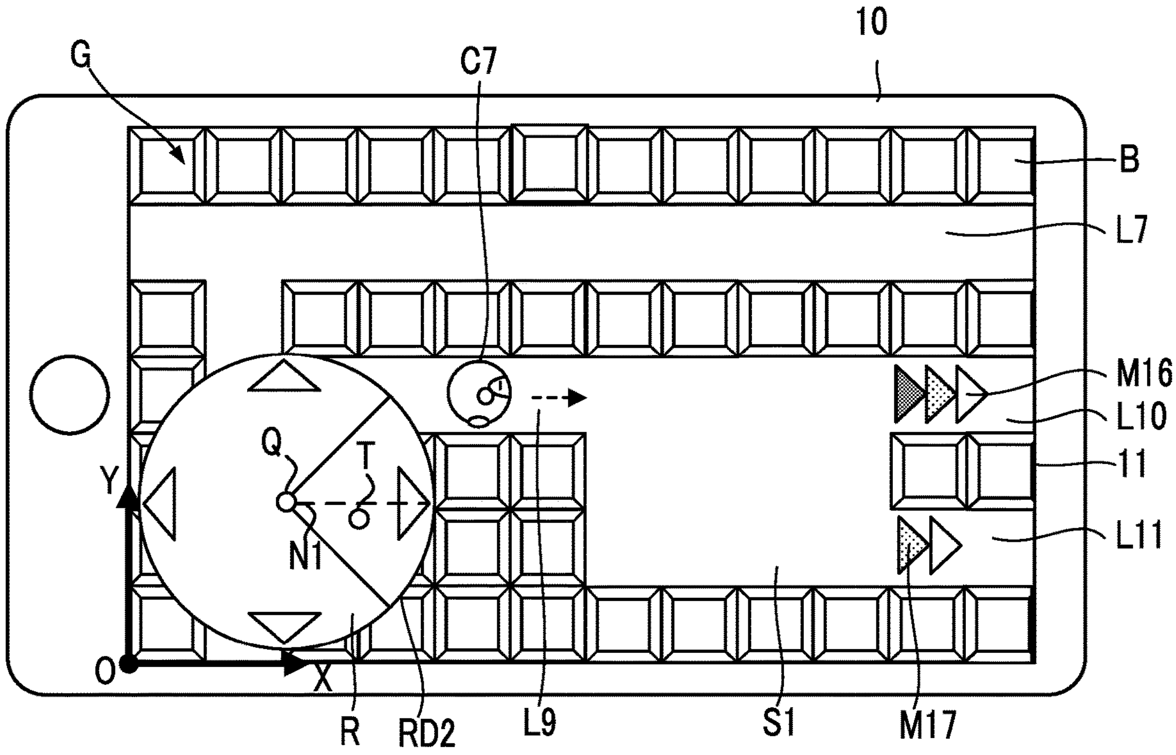
FIG. 31 is a diagram showing an example display on the touch panel 11 according to Modification B5.

FIG. 29 to FIG. 31 are each a diagram illustrating an example display of the touch panel 11 according to Modification B5. On the touch panel 11 shown in FIGS. 29 to 31, as in FIG. 10 and the like, there is displayed an area of the game space G, the area including the path L9 extending in the X-axis direction, the square S1 connected to the right portion of the path L9, the path L10 connected to the upper right portion of the square S1, and the path L11 connected to the lower right portion of the square S1.

As illustrated in FIG. 29, for example, it is assumed that the character C7 is moving in the right direction in the path L9. It is assumed that the touch location T is at a position of the right-direction region RD2, the position being very close to the border with the up-direction region RD1 (in the upper right direction). In this instance, the designator 224 designates the moving of the character C7 in the right direction, which is an approximate instructed direction. Even in a case in which the character C7 enters the square S1 in which the character is freely movable, the character C7 would not be able to move to the upper right direction, which is the user-instructed direction, because a block B is arranged in the up direction of the character C7. Accordingly, the predictor 226 predicts that the movement to the right direction, which is the approximate instructed direction, is continued. That is, from among the paths L10 and L11, the predictor 226 predicts that the character C7 will move to the path L10.

The display controller 228 displays a mark M16 as the prediction result image. The mark M16 indicates the path L10 predicted by the predictor 226 among the two paths L10 and L11. Specifically, the mark M16 has a shape in which three triangles are connected along the extending direction of the path L10, with the base of the respective triangle extending along the widthwise direction of the path L10, and the diagonal angle being located to the right with respect to the base. The three triangles constituting the mark M16 are displayed in the same color tone. The mark M16 is displayed in the vicinity of the entrance to the path L10 from the square S1. Such a mark M16 is suggestive of a move to the path L10.

It is assumed that, from the state shown in FIG. 29, for example, the touch location T has moved to the vicinity of the central position of the right-direction region RD2 (a position on the straight line N1 extending along the X-axis from the reference point Q) as shown in FIG. 30. In this instance, the designator 224 designates the moving of the character C7 in the right direction, which is the user-instructed direction. The predictor 226 predicts that the character C7 will move in the right direction, which is the user-instructed direction, also in case in which character C7 enters the square S1. That is, from among the paths L10 and L11, the predictor 226 predicts that the character C7 will move to the path L10.

The display controller 228 continues with the displaying of the mark M16 in the path L10 and also displays a mark M17 in the path L11. The mark M17 comprises a triangle, with its base extending along the width-wise direction of the path L11 and its diagonal angle being located to the right with respect to the base. The mark M17 is displayed in a lighter color tone (e.g., lower brightness or saturation) than the three triangles that constitute the mark M16. Furthermore, from among the three triangles constituting the mark M16, one farthest from the entrance from the square S1 is displayed in a light color tone as compared with the mark M16 in FIG. 29. The mark M16 indicates that the path L10 is selected as the moving direction of the character C7, as described above. The mark M17 indicates that a possibility has arisen that the path L11 also may be selected as the moving direction of the character C7, due to the change in the touch location T as compared with that in FIG. 29.

Furthermore, it is assumed that, from the state in FIG. 30, for example, the touch location T has changed to a position close to the down-direction region RD3, as shown in FIG. 31. In FIG. 31, as in the case in FIG. 30, a prediction result by the predictor 226 is the path L10. On the other hand, the display controller 228 changes the display appearances of the mark M16 and the mark M17. Specifically, for example, in the mark M17, two triangles are connected along the path L11 such that the bases extend along the widthwise direction of the path L11 and the respective diagonal angle is located to the right with respect to the base. That is, in the mark M17 in FIG. 31, one triangle has been added as compared with the mark M17 in FIG. 30. Of the two triangles constituting the mark M17, one close to the entrance from the square S1 is displayed in a darker color tone, and the other far from the entrance is displayed in a lighter color tone. In addition, the color tones of the three triangles constituting the mark M16 are also displayed in a lighter color tone as the distance from the entrance from the path L10 increases.

Such a display allows the user to recognize that the touch location T is approaching a region that would result in the selection of the path L11, while indicating that the path L10 has been selected as the moving direction of the character C7. For example, even if the user does not gaze at the operation region R, the user can grasp the touch location in the operation region R, which is advantageous in improving operability.

It is to be noted that, for example, from the state shown in FIG. 31, in a case in which the touch location T further approaches the down-direction region RD3, it is predicted that the moving destination of the character C7 will be the path L11. In this case, the display controller 228 adds one triangle to the mark M17 such that the mark M17 is in a shape of three triangles connected together, and deletes one triangle from the mark M16 such that the mark M16 is in a shape of two triangles connected together. Consequently, the display area of the mark M17 will be greater than the display area of the mark M16, and then the user can recognize that the path L11 corresponding to the mark M17 is the path L selected as the moving direction out from the square S1.

Thus, the display controller 228 displays an image indicating a positional relationship between an extending direction of at least one of multiple paths L and the moving direction designated by the designator 224. For example, the multiple paths include a first path and a second path that are connected at (branched from) a connection point (junction), and the display controller 228 displays a first image indicating a path predicted by the predictor 226 as a path in which the character C will be moving, a second image indicating, from among the first path and the second path, a path predicted by the predictor 226 as a path in which the character C will not be moving, and changes the visual effect of the first image and the visual effect of the second image based on the moving direction.

When applied to the examples shown in FIGS. 29 to 31, the multiple paths L correspond to the paths L10 and L11, and the images indicating the positional relationship correspond to the marks M16 and M17. The first path corresponds to the path L10, the second path corresponds to the path L11, the first image corresponds to the mark M16, and the second image corresponds to the mark M17. Also, changing the visual effect corresponds to increasing or decreasing the numbers of triangles and changing the colors of the triangles displayed in the mark M16 and the mark M17. It is to be noted that the "changing the visual effect" may be, for example, changing the number, saturation, size of display area, and the like of the first image or the second image. To enhance the visual effect, for example, the number of the first images or the second images may be increased, the saturation of the first image or the second image may be increased, the size of display area of the first image or the second image may be increased, or the like, or more than one of these may be performed. To weaken the visual effect, for example, the number of the first images or the second images may be reduced, the saturation of the first image or the second image may be reduced, the display area of the first image or the second image may be reduced, or the like, or more than one of these may be performed.

The moving direction designated by the designator 224 is determined based on the touch location in the operation region R. Therefore, the "image indicating a positional relationship between an extending direction of at least one of multiple paths L and the moving direction designated by the designator 224" may be referred to as "an image indicating a positional relationship between an extending direction of at least one of multiple paths L and the touch location".

The image indicating a positional relationship is not limited to those exemplified in FIGS. 29 to 31, and various forms can be applied. For example, the image indicating the positional relationship may be a display in which the area of one triangle has been changed, such as the mark M10 and the mark M11 shown in FIG. 24.

With such a display, the user can recognize the prediction result predicted by the predictor 226 and the touch location T, which is advantageous in improving operability.

Modification B6

As described above, the block B may disappear when, for example, an item is used, the character C is operated, or the like. In this case, a space that used to be occupied by the block B, which has disappeared, becomes a part of a path L. That is, the shape of a path L may change as the game progresses. Depending on the specifications of the game, for example, a case is conceivable in which, while the game is in progress, the block B is arranged at a location that used to the path L, and the character C will no longer be able to move at that location. In a case in which the shape of the path L in the game space G changes, the predictor 226 judges whether or not there has been a change in the path L in which the character C is movable. In a case in which there has been a change (or regardless of whether or not there has been a change), the predictor 226 again predicts a path in which the character C will be moving. For example, the predictor 226 again acquires the map data of the game space G every time a block B disappears in the game space G or at a predetermined cycle, and judges whether or not the shape of the path L has been changed. In a case in which the prediction result by the predictor 226 has been changed, the display controller 228 displays the changed prediction result image in the game space G.

Thus, in a case in which the arrangement of blocks B has been changed, the predictor 226 may predict a path L in which the character C will be moving, based on the changed arrangement of the blocks B. In a case in which a prediction result by the predictor 226 changes as a result of the change in the arrangement of blocks B, the display controller 228 may display in the game space G a prediction result image after the change. The "change in the shape of the environment" may be, for example, a change in the shape of the surface, an increase or decrease in the number, a change in the size, or the like, of an environmental component, such as a block B. Thus, even in a case in which the shape of the path changes, the user can accurately grasp the moving direction of the character C, and convenience in the game can be improved.

Modification B7

In the Second Embodiment, an image indicating the path L predicted by the predictor 226, such as the mark M3 (see FIG. 14) and the mark M4 (see FIG. 15), is displayed as the prediction result image. However, the prediction result image is not limited thereto, and may be, for example, a symbol that does not indicate a specific direction. Specifically, for example, as a prediction result image, an icon may be used that does not suggest a specific direction such as a circle, the icon being arranged in the selected path L. Furthermore, the prediction result image may be, for example, an image indicating a path L that has not been predicted, by the predictor 226, as a path in which a character will be moving, or may be, for example, an image indicating an object or a symbol that hinders the character from moving to the path L that has not been predicted by the predictor 226. The prediction result image may be, for example, a visual effect that does not have a specific shape. The visual effect may be, for example, such that a path L in which a character is predicted to move is displayed in a darker tone, glows, or the like, or may be such that a portion of the path in which the character is not predicted to move is foggy.

Modification B8

In the Second Embodiment, in a case in which there are multiple paths L in which the character C is movable, the predictor 226 predicts, from among the multiple paths L, a path L in which the character C will be moving. However, the present embodiment is not limited thereto. In a case in which there is at least one path L in which the character C is movable, the predictor 226 may predict whether or not the character C will be moving in that path. Specifically, for example, in FIG. 28, in a case in which a block B is arranged at the entrance from the square S4 to the path L26, the path L25 is only the path in which the character C12 located in the square S4 is movable. In such a case, the predictor 226 predicts whether or not the character C12 will be moving in the path L25, based on the moving direction, of the character C12, designated by the designator 224 and the arrangement of blocks B around the square S4.

The display controller 228 displays a prediction result image in the game space G. For example, in a case in which the character C12 is predicted to move in the path L25, the display controller 228 displays images, such as the mark M13 and the mark M14 shown in FIG. 27, at the entrance to the path L25 from the square S4. Furthermore, for example, in a case in which it is predicted that the character C12 will not move to the path L25, the display controller 228 need not display a prediction result image, or may display an image such as the mark M15 of FIG. 28 at the entrance to the path L25 from the square S4.

That is, in Modification B8, the acquirer 222 acquires touch location information indicating a touch location on the touch panel 11. The designator 224 designates the moving direction of the character C in the game space G based on the touch location information. In a case in which there is a path L in which the character C is movable in the game space G, the predictor 226 predicts whether or not the character C will be moving in the movable path, based on the moving direction designated by the designator 224 and the shape of the environment that restricts the movement of the character C in the game space G. The display controller 228 displays in the game space G an image indicating a prediction result by the predictor 226.

According to Modification B8, the user can accurately grasp a path in which the character C will be moving, and can reduce or prevent erroneous operations at the time of the direction instruction operation. Furthermore, for example, if a prediction result image is displayed in advance (e.g., before the character C reaches the movable path L), the user can take an action such as changing the touch location before the character C makes an unintended movement (e.g., entry into the unintended path L, etc.) for example. Thus, it is possible to more reliably prevent erroneous operations.

C: Other Modifications

In each embodiment of the present invention, a configuration exemplified below may be adopted, for example.

Modification C1

In the configuration of the controller 130 shown in FIG. 2B, the selector 136 and the display controller 138 may be provided separately from the determiner 134. In the respective configuration of the controller 130 shown in FIG. 2B and the controller 220 shown in FIG. 11B, the designator 224 may perform a process to be executed by the determiner 134. In the respective configuration of the controller 130 shown in FIG. 2B and the controller 220 shown in FIG. 11B, the predictor 226 may perform a process to be executed by the selector 136.

Modification C2

In the above-described embodiment, an interface to which direction instructions are input from the user is the touch panel 11. However, the interface to which direction instructions are input from the user is not limited thereto, and may be, for example, a physical controller provided in the information processing apparatus or connected to the information processing apparatus. The physical controller in this case may be, for example, not in a form in which a button or a key is provided in a one-to-one manner with a direction to be instructed by the user (a cross key or the like), but in a form in which a direction can be designated in a stepless manner about a reference point, such as a joystick, or in a multistage manner, such as 64 steps or 256 steps. Furthermore, in an operation mode in which a direction is input by tilting an operation member at a freely selected angle about a reference point, such as a joystick, for example, the physical controller may be in a form in which there is a range in input angle in designating one direction.

Modification C3

In the above-described embodiment, the information processing apparatus 10 is provided with the storage device 12, which stores a game application program, and the control device 13, which executes the game application. The present invention is not limited thereto, and a storage device that stores the game application program and a control device that executes the game application may be provided in an external device capable of communicating with the information processing apparatus 10. More specifically, for example, a storage device that stores the game application program and the control device that executes the game application may be provided in a cloud server capable of communicating with the information processing apparatus 10 via a communication line, such as the Internet.

Modification C4

In the above-described embodiment, the moving direction of the character C is determined or designated based on in which region the touch location on the touch panel 11 is located among regions configured in the operation region R (see FIGS. 3 and 12). However, the present invention is not limited thereto. For example, the moving direction of the character C may be determined or designated based on a vector (hereinafter, referred to as a "touch location vector") from the reference point Q of the operation region R toward the touch location. Specifically, for example, in the First Embodiment, in determining the moving direction of the character C in a path L, the determiner 134 may decompose a touch location vector into an extending direction component of the path L and a width direction component of the path L (component in a direction orthogonal to the extending direction). In a case in which the extending direction component of the path L is equal to or greater than the width direction component of the path L, or the extending direction component of the path L exceeds the width direction component of the path L, the determiner 134 may determine that the character C will move along the extending direction of the path L.

Furthermore, for example, the moving direction of the character C may be determined or predicted based on the direction from the reference point Q of the operation region R toward the touch location and the extending direction of the path L. Specifically, for example, in the First Embodiment, the determiner 134 may determine that the character will move in a path L in a case in which an angle $\theta t$ formed, with the extending direction of the path L, by the direction from the reference point Q of the operation region R toward the touch location is equal to or less than a predetermined angle $\theta x$.

It is to be noted that, as in Modification C4, the determination or designation of the moving direction using the touch location vector or the direction also includes determining which region the touch location vector or the direction is included relative to the extending direction of the path L, and thus is substantially synonymous with the determination or designation of the moving direction of the character C based on which region the touch location is located in the operation region R as in the present embodiment. Thus, the operation region R may be configured using the vector.

D: Appendices

From the above description, the present invention may be understood as follows, for example. To facilitate understanding of the embodiments, reference numerals in the drawings are appended in parentheses for convenience, but the present invention is not intended to be limited to the embodiments shown in the drawings.

Appendix 1-1

A computer-readable recording medium (e.g., storage device 12) storing a program for causing a processor (e.g., control device 13) to function as an acquirer (e.g., acquirer 132) configured to acquire touch location information indicating a touch location on a touch panel (e.g., touch panel 11); and a determiner configured to, in a case in which the touch location indicated by the touch location information is in a first region, determine movement of an object (e.g., character C) in a first direction, the object being present in a first path that is in the first direction in a game space, and in a case in which the touch location indicated by the touch location information is in a second region partially overlapping the first region, determine movement of the object in a second direction, the object being present in a second path that is in the second direction in the game space. The determiner includes, in a case in which (i) and (ii) are both satisfied: (i) the touch location indicated by the touch location information is in an overlapping region between the first region and the second region; and (ii) there is a connection point of the first path and the second path in an area in the moving direction of the object in the game space, a selector (e.g., selector 136) configured to select, based on the touch location information, the moving direction of the object at the connection point from among the first direction and the second direction; and a display controller (e.g., display controller 138) configured to display in the game space an image indicating a selection result by the selector before the object reaches the connection point.

According to this aspect, the moving direction of the object at the connection point is selected from the first direction and the second direction in a case in which (i) and (ii) are both satisfied: (i) the touch location is located in the overlapping region in which the first region associated with the first direction and the second region associated with the second direction overlap; and (ii), in an area in the moving direction of the object, there is a connection point of the first path that is in the first direction and the second path that is in the second direction. An image indicating the selection result is then displayed. Accordingly, in a case in which the user instructs the moving direction of the object by touching a region configured on the touch panel, the user can accurately grasp the moving direction of the object in the connection point. Thus, it is possible to reduce or prevent erroneous operations in performing a direction instruction operation. Furthermore, even in a case in which the touch location is in the overlapping region and it is not easy to grasp the moving direction of the object, the user can accurately grasp the moving direction of the object at the connection point. Consequently, it is possible to reduce or prevent erroneous operations in performing an operation to the overlapping region. The selection result of the moving direction is displayed in the game space before the object reaches the connection point. Therefore, the user is able to know the moving direction of the object at the connection point before the object reaches the connection point, and take an action such as changing the touch location in a case in which the object is likely to move in an unintended moving direction, for example. Thus, it is possible to more reliably prevent erroneous operations.

In the above-described aspect, the "object" may be, for example, an object, a movement of which is to be instructed by using a touch panel. The object may be, for example, a character relating to a game or an object related to a game. Here, the "character relating to the game" may be, for example, a virtual creature capable of advancing the game. Furthermore, the "object relating to the game" may be, for example, a virtual non-living object capable of progressing the game.

In the above aspect, the "game space" is, for example, a virtual space provided in a game, and may be a two-dimensional space or a three-dimensional space. In the above aspect, the "game space" may be divided into, for example, a "movable space" in which an object is movable and a "movement restricted space" in which movement of an object is restricted. Among these, the "movement restricted space" may be, for example, a space in which movement of an object is restricted due to an environment arranged in a game space. Here, the "environment" may be obstacles which an object cannot enter, such as, for example, a rock, a mountain, a wall, and a block, or may be a specific terrain through which an object cannot pass, such as a sea, a river, or a valley.

In the above aspect, the "first direction" and the "second direction" may be directions in the game space. In the above aspect, the first direction and the second direction are not the same direction. In the above-described aspect, the "first region" and the "second region" may be, for example, regions provided in a manner visible to the user on the touch panel for inputting an instruction of a direction relating to the game, or may be virtual regions provided in a manner not visible to the user on the touch panel for inputting an instruction of a direction relating to the game. In the touch panel, the positions of the first region and the second region may be fixed or may be variable.

In the above-described aspect, the "first path" and the "second path" each are an example of a space in which an object is movable in a game space, i.e., the above-described movable space. In the above aspect, an environment for restricting the movement of the object is arranged on both sides of the first path and the second path (a direction orthogonal to the extending direction of the respective path). Thus, the object is able to move along the extending direction of the path, but the movement that is not along the extending direction of the path is prevented by an environment that restricts movement of the object.

In the above-described aspect, the "connection point of the first path and the second path" may be, for example, a point where the path branches out to the first path and the second path in the game space. At the connection point, the first path and the second path may intersect as at a crossroad, for example, or may not intersect as in a T-connection point, for example.

In the above aspect, the "image indicating a selection result" may be, for example, an image indicating a moving direction selected by the selector or a moving direction not selected by the selector. The "image indicating the selection result" may be, for example, a direction indicator indicating a specific direction such as a selected moving direction, or a symbol or the like that does not indicate a specific direction. The "image indicating the selection result" may be, for example, a display indicating an object or a symbol that blocks movement in a direction not selected by the selector. Furthermore, the "image indicating the selection result" may be, for example, a visual effect that does not have a specific shape.

Appendix 1-2

A recording medium according to another aspect of the present invention is the recording medium according to Appendix 1-1, and the selector is configured to divide the overlapping region into a first overlapping region being a part of the first region and a second overlapping region being a part of the second region, the first overlapping region adjoining a first non-overlapping region and not overlapping the second region, and the second overlapping region adjoining a second non-overlapping region and not overlapping the first region, select the moving direction of the object at the connection point to be in the first direction in a case in which the touch location is in the first overlapping region; and select the moving direction of the object at the connection point to be in the second direction in a case in which the touch location is in the second overlapping region.

According to this aspect, the overlapping region is divided into the first overlapping region and the second overlapping region, and a moving direction is selected that is associated with a non-overlapping region adjoining a region in which the touch location is present from among the divided overlapping regions. This makes it possible to more accurately reflect the intention of the user in the selection result of the moving direction of the character.

Appendix 1-3

A recording medium according to another aspect of the present invention is the recording medium according to Appendix 1-1 or 1-2, and the display controller is configured to display the image indicating the selection result by the selector at a position based on the connection point in the game space.

According to this aspect, an image indicating a result of selection by the selector is displayed at a position based on a connection point in the game space. As a result, the user can intuitively understand at which position in the game space an object is likely to move in the moving direction indicated by the image indicating the selection result, as compared with a case in which the image indicating the selection result is displayed at a position not based on the connection point.

In the above aspect, the "position based on a connection point" may be, for example, a position having a predetermined positional relationship with the connection point, a position within a range of a predetermined distance or less from the connection point, or a position in a predetermined direction with respect to the connection point. Specifically, the "position based on the connection point" may be, for example, the position of the connection point in the game space, a position that is advanced, with respect to the connection point, toward an area in the moving direction selected by the selector, or a position between the connection point and the object. Furthermore, the "position based on the connection point" may be, for example, an environment arrangement space (e.g., on a block) in the vicinity of the connection point.

Appendix 1-4

A recording medium according to another aspect of the present invention is the recording medium according to Appendix 1-1 or 1-2, and the display controller is configured to display the image indicating the selection result by the selector at a position based on the object in the game space.

According to this aspect, an image indicating a result of selection by the selector is displayed at a position based on the object in the game space. In general, a user who is playing a game often gazes at the vicinity of the character C. Therefore, the amount of movement of the line of sight in viewing the image indicating the selection result can be reduced, and the burden on the user can be reduced as compared with a case in which the image indicating the selection result is displayed at a position not based on the object.

In the above aspect, the "position based on the object" may be, for example, a position having a predetermined positional relationship with the object, a position within a range of a predetermined distance or less from the object, or a position in a predetermined direction with respect to the object. Specifically, the "position based on the object" may be, for example, a current position of the object in the game space or a position in a path in an area ahead or behind in the moving direction of the object. Furthermore, the "position based on the object" may be, for example, a movement restricted space (e.g., on a block) in the vicinity of the object.

Appendix 1-5

A recording medium according to another aspect of the present invention is the recording medium according to Appendix 1-1 or 1-2, and the display controller is configured to display an image representing a part of the game space on the touch panel, and display the image indicating the selection result by the selector at a position based on a positional relationship between a range displayed on the touch panel and the connection point in the game space.

According to this aspect, the image indicating the selection result is displayed at a position based on the positional relationship between the display range of the touch panel and the connection point in the game space. Therefore, for example, in a case in which the connection point is outside the display range of the touch panel, an image indicating the selection result can be displayed, and convenience in the game can be improved.

In the above aspect, the "image representing a part of the game space" is an image obtained by extracting a part of the game space, and it is an image in which not the entire area of the game space is displayed in the image. The image representing a part of the game space may be, for example, an image obtained by extracting a predetermined range based on the position of the object in the game space.

In the above aspect, the "position based on the positional relationship between the display range and the connection point" may be, for example, a position that is selectively changed depending on whether or not the connection point is included in the display range. For example, in a case in which the connection point is located within the display range, the connection point may be "a position based on a positional relationship between the display range and the connection point", and in a case in which the connection point is located outside the display range, a position on the object (or a position between the object and the connection point within the display range) may be set to "a position based on a positional relationship between the display range and the connection point".

Appendix 1-6

A recording medium according to another aspect of the present invention is the recording medium according to any one of Appendices 1-1 to 1-5, and the selector is configured to, in a case in which (a) and (b) are both satisfied: (a) the first direction is selected as the moving direction of the object at the connection point; and (b) (b1) the touch location indicated by the touch location information is in the overlapping region, and (b2) there is another connection point at which a third path that is in a third direction and the first path are connected with each other in an area in the moving direction of the object that has passed the connection point, select, based on the touch location information, the moving direction of the object at the another connection point from among the first direction and the third direction, and the display controller is configured to display, in the game space, an image indicating a selection result by the selector corresponding to the connection point, and an image indicating a selection result by the selector corresponding to the another connection point.

According to this aspect, in a case in which there is another connection point ahead of the connection point, an image indicating a result of selection of the moving direction for each of these connection points is displayed. As a result, the user can grasp the moving direction of the object over a long section, for example, as compared with a case in which only the selection result of the moving direction at the connection point closest to the position of the object is displayed, and thus, the convenience in the game can be improved.

In the above aspect, the "third direction" may be a direction in the game space. The third direction may be a direction differing from the first direction or a direction differing from both of the first direction and the second direction. The third direction may be the same direction as the second direction.

Appendix 1-7

A recording medium according to another aspect of the present invention is the recording medium according to any one of Appendices 1-1 to 1-6, and the determiner is configured to, in a case in which (i) and (ii) are both satisfied: (i) the touch location indicated by the touch location information is in the first region or the second region; and (ii) there is a portion in which movement in the first direction and the second direction is blocked in an area in the moving direction of the object in the game space, determine to stop the movement of the object at that portion, and the display controller is configured to display in the game space an image indicating a determination result by the determiner.

According to this aspect, in a case in which there is a portion at which the movement of the object will be stopped, a message indicating that the movement of the object will be stopped is displayed. As a result, the user can know that the movement of the object will be stopped, and can take an action such as changing the moving direction by changing the touch location, for example. Therefore, convenience in the game is improved. Furthermore, for example, in a case in which an object is stopped as a result of the user performing erroneous operations, it is easy to recognize erroneous operations, and it is possible to improve convenience in a game.

In the above aspect, the "location at which movement is blocked" may be, for example, a location at which an environment for restricting the movement of an object such as a block is arranged. In the above aspect, the "image indicating the determination result" may be, for example, an image suggesting that the movement of the object will be stopped. The "image indicating the determination result" may be, for example, an image that is easily distinguishable from the "image indicating the selection result", and may be, for example, an image simulating an X-mark or a stop sign.

Appendix 1-8

A recording medium according to another aspect of the present invention is the recording medium according to any one of Appendices 1-1 to 1-7, and in a case in which the touch location is located in the overlapping region, the display controller is configured to display an image indicating a positional relationship between the touch location and at least one of the first region or the second region.

According to this aspect, in a case in which the overlapping region is touched, an image indicating a positional relationship between the touch location and at least one of the first region or the second region is displayed. Accordingly, the user can grasp the positional relationship between the first region or the second region and the touch location without directly viewing the first region or the second region or the touch location, thereby improving the operability of the game.

In the above aspect, the "image indicating a positional relationship" may be, for example, an image indicating at least one of a direction or a distance of a touch location with respect to a reference point set in at least one of the first region or the second region.

Appendix 1-9

A recording medium according to another aspect of the present invention is the recording medium according to Appendices 1-8, and the display controller is configured to display a first image indicating a direction selected by the selector from among the first direction and the second direction, and a second image indicating a direction not selected by the selector from among the first direction and the second direction, and change a visual effect of the first image and a visual effect of the second image based on the touch location in the overlapping region.

According to this aspect, the visual effect of the first image indicating the selected path and the visual effect of the second image indicating the deselected path are changed based on the touch location. As a result, the user can grasp the relationship between the touch location and the selection result of the path without directly viewing the touch location. Thus, the operability of the game can be improved. In addition, the user can grasp both the relationship both between the touch location and the first region and the relationship between the touch location and the second region without directly viewing the touch location. Thus, the operability of the game can be improved.

In the above-described aspect, the "first image" and the "second image" may each be, for example, a direction indicator for indicating the first direction or the second direction, or may be a symbol or the like that does not indicate a specific direction. In the above aspect, "based on the touch location" may be, for example, based on whether the touch location is closer to the first region or the second region. Furthermore, as an example of the change in the visual effect based on the touch location, for example, in a case in which the direction selected by the selector is the first direction, the first image may be displayed such that the visual effect thereof is increased as the touch location approaches the first non-overlapping region, and the second image may be displayed such that the visual effect thereof increases as the touch location moves away from the first non-overlapping region.

In the above aspect, the "changing the visual effect" may be, for example, changing the quantity, saturation, display area, and the like of the first image or the second image. To increase the visual effect, for example, the number of the first images or the second images may be increased, the saturation of the first images or the second images may be increased, the display area of the first image or the second image may be increased, or the like, or more than one of these may be performed. To reduce the visual effect, for example, the number of the first images or the second images may be reduced, the saturation of the first image or the second image may be reduced, the display area of the first image or the second image may be reduced, or the like, or more than one of these may be performed.

Appendix 1-10

An information processing apparatus according to another aspect of the present invention includes an acquirer configured to acquire touch location information indicating a touch location on a touch panel; a determiner configured to, in a case in which the touch location indicated by the touch location information is in the first region, determine movement of an object in a first direction, he object being present in a first path that is in the first direction in a game space, and in a case in which the touch location indicated by the touch location information is in a second region partially overlapping the first region, determine movement of the object in a second direction, the object being present in a second path that is in the second direction in the game space. The determiner includes a selector and a display controller. In a case in which (i) and (ii) are both satisfied: (i) the touch location indicated by the touch location information is in an overlapping region between the first region and the second region; and (ii) there is a connection point of the first path and the second path in an area in the moving direction of the object in the game space, the selector is configured to select, based on the touch location information, the moving direction of the object at the connection point from among the first direction and the second direction, and the display controller is configured to display in the game space an image indicating a selection result by the selector before the object reaches the connection point.

According to this aspect, the moving direction of the object at the connection point is selected from the first direction and the second direction in a case in which (i) and (ii) are both satisfied: (i) the touch location is located in the overlapping region in which the first region associated with the first direction and the second region associated with the second direction overlap; and (ii) in an area in the moving direction of the object there is a connection point of the first path that is in the first direction and the second path that is in the second direction. An image indicating the selection result is then displayed. Accordingly, in a case in which the user instructs the moving direction of the object by touching a region configured on the touch panel, the user can accurately grasp the moving direction of the object in the connection point. Thus, it is possible to reduce or prevent erroneous operations in performing a direction instruction operation. Furthermore, even in a case in which the touch location is in the overlapping region and it is not easy to grasp the moving direction of the object, the user can accurately grasp the moving direction of the object at the connection point. Consequently, it is possible to reduce or prevent erroneous operations in performing an operation in the overlapping region. The selection result of the moving direction is displayed in the game space before the object reaches the connection point. Therefore, the user is able to know the moving direction of the object at the connection point before the object reaches the connection point, and take an action such as changing the touch location in a case in which the object moves in an unintended moving direction, for example. Thus, it is possible to more reliably prevent erroneous operations.

Appendix 1-11

An information processing method according to another aspect of the present invention is implemented by a processor and includes acquiring touch location information indicating a touch location on a touch panel; in a case in which the touch location indicated by the touch location information is in a first region, determining movement of an object in a first direction, the object being present in a first path that is in the first direction in a game space; and in a case in which the touch location indicated by the touch location information is in a second region partially overlapping the first region, determining movement of the object in a second direction, the object being present in a second path that is in the second direction in the game space. The method further includes: in a case in which (i) and (ii) are both satisfied: (i) the touch location indicated by the touch location information is in an overlapping region between the first region and the second region; and (ii) there is a connection point of the first path and the second path in an area in the moving direction of the object in the game space, selecting, based on the touch location information, the moving direction of the object at the connection point from among the first direction and the second direction; and displaying in the game space an image indicating a selection result before the object reaches the connection point.

According to this aspect, the moving direction of the object at the connection point is selected from the first direction and the second direction in a case in which (i) and (ii) are both satisfied: (i) the touch location is located in the overlapping region in which the first region associated with the first direction and the second region associated with the second direction overlap; and (ii) in an area in the moving direction of the object there is a connection point of the first path that is in the first direction and the second path that is in the second direction. An image indicating the selection result is then displayed. Accordingly, in a case in which the user instructs the moving direction of the object by touching a region configured on the touch panel, the user can accurately grasp the moving direction of the object in the connection point. Thus, it is possible to reduce or prevent erroneous operations in performing a direction instruction operation. Furthermore, even in a case in which the touch location is in the overlapping region and in which it is not easy to grasp the moving direction of the object, the user can accurately grasp the moving direction of the object at the connection point. Consequently, it is possible to reduce or prevent erroneous operations in performing an operation in the overlapping region. The selection result of the moving direction is displayed in the game space before the object reaches the connection point. Therefore, the user is able to know the moving direction of the object at the connection point before the object reaches the connection point, and take an action such as changing the touch location in a case in which the object moves in an unintended moving direction, for example. Thus, it is possible to more reliably prevent erroneous operations.

Appendix 2-1

A recording medium (e.g., storage device 12) according to another aspect of the present invention storing a program that causes a processor (e.g., control device 22) to function as: an acquirer (e.g., acquirer 222) configured to acquire touch location information indicating a touch location on a touch panel (e.g., touch panel 11); a designator (e.g., designator 224) configured to designate a moving direction of an object (e.g., character C) in a game space (e.g., game space G) based on the touch location information; in a case in which there are multiple paths in which the object is movable in the game space, a predictor (e.g., predictor 226)

configured to, in a case in which there are multiple paths in which the object is movable in the game space, predict, from among the multiple paths, a path in which the object will be moving, based on the moving direction designated by the designator and a shape of an environment that restricts movement of the object in the game space; and a display controller (e.g., display controller 228) configured to display in the game space an image indicating a prediction result by the predictor.

According to this aspect, in a case in which there are multiple paths in which an object is movable, a path in which the object will be moving is predicted among multiple paths, and an image indicating a prediction result is displayed. Accordingly, in instructing the moving direction of the object by touching a region configured on the touch panel, the user can accurately grasp the moving direction of the object in a case in which the character is movable in multiple paths. Consequently, it is possible to reduce or prevent erroneous operations at the time of the direction instruction operation. Furthermore, for example, if the image indicating the prediction result is displayed before the object reaches any of the multiple paths, it is possible to know, before the object reaches any of the multiple paths, which of the multiple paths the object will be moving to. Therefore, for example, in a case in which the object moves in an unintended moving direction, the user can take an action such as changing the touch location. Thus, it is possible to more reliably prevent erroneous operations.

In the above-described aspect, the "environment for restricting movement" is, for example, an environment that hinders movement of an object in a game space. For example, the environment that restricts movement may be an environment in which an obstacle which the object cannot enter, such as a rock, a peak, a wall, and a block, is arranged, or an environment having a specific terrain through which the object cannot pass, such as a sea, a river, and a valley. The environment may be formed, for example, by continuously or discontinuously arranging multiple obstacles, or may be formed by combining multiple terrains. In the above-described aspect, since the movement of the object is hindered by the environment, it may be said that the "shape of the environment" is the shape of the boundary between the movable space and the movement restricted space. Elements that make up the environment, such as the obstacles and specific terrains, are referred to as "environmental components".

In the above-described aspect, the "path" is an example of a space in which an object is movable in a game space, that is, the above-described movable space. In the above aspect, an environment for restricting the movement of the object is arranged on both sides of the path (a direction orthogonal to the extending direction of the path). Thus, the object is able to move along the extending direction of the path, but the movement that is not along the extending direction of the path is hindered by an environment that restricts movement of the object. For example, if the distance between the environments on both sides of the path is greater than a travel distance per unit of the object, the object is movable between the environments, i.e., in the path width direction, but if the distance between the environments on both sides of the path is less than or equal to the travel distance per unit of the object, the object cannot move in the path width direction.

In the above aspect, the "image indicating a prediction result" may be, for example, an image indicating a path predicted by the predictor (hereinafter, referred to as a "predicted path"). Furthermore, the "image indicating the prediction result" may be, for example, a direction indicator indicating the direction of the predicted path, a symbol that does not indicate a specific direction, or the like. Furthermore, the "image indicating the prediction result" may be, for example, an image indicating an object or a symbol that blocks movement to a path other than the predicted path. Furthermore, the "image indicating the prediction result" may be, for example, a visual effect that does not have a specific shape.

Appendix 2-2

In the recording medium according to another aspect of the present invention, in the recording medium according to Appendix 2-1, the designator is configured to, in a case in which there is a portion in which a movement in the moving direction is blocked in an area in the moving direction of the object in the game space, designate a stoppage of movement of the object in that portion, and the display controller is configured to display in the game space an image indicating the stoppage of the object.

According to this aspect, in a case in which there is a portion in which the movement of the object will be stopped, an indicator indicating that the movement of the object will be stopped is displayed. As a result, the user can know that the movement of the object will be stopped, and can take an action such as changing the moving direction by changing the touch location, for example. Therefore, convenience in the game is improved. Furthermore, for example, in a case in which an object is stopped as a result of the user performing an erroneous operation, it is easy to recognize the erroneous operation, and it is possible to improve convenience in a game.

In the above aspect, the "location at which movement is blocked" may be, for example, a location at which an environment for restricting movement of an object such as a block is arranged. In the above-described aspect, the "image indicating the stoppage of the object" may be, for example, an image suggesting that the movement of the object will be stopped. The "image indicating the stoppage of the object" may be, for example, an image that is easily distinguishable from the "image indicating the prediction result", and may be, for example, an image simulating an X mark or a stop sign.

Appendix 2-3

A recording medium according to another aspect of the present invention is the recording medium according to Appendix 2-1 or 2-2, and the display controller is configured to display an image indicating a positional relationship between at least one extending direction of the multiple paths and the moving direction designated by the designator.

According to this aspect, an image indicating a positional relationship between at least one extending direction of the multiple paths and a moving direction designated by the designator is displayed. Thus, the user can grasp, without directly viewing, the positional relationship between at least one extending direction of the multiple paths and the moving direction designated by the designator. Thus, the operability of the game can be improved.

In the above aspect, the "display indicating a positional relationship" may be, for example, a display indicating the magnitude of an angle formed by at least one extending direction of multiple paths and a moving direction designated by the designator.

Appendix 2-4

A recording medium according to another aspect of the present invention is the recording medium according to Appendix 2-3, and the multiple paths include a first path and a second path connected at a connection point. The display controller is configured to: display a first image indicating a path predicted by the predictor, from among the first path and the second path, as a path in which the object will be moving, and a second image indicating a path predicted by the predictor, from among the first path and the second path, as a path in which the object will not be moving, and the displayer controller is configured to change a visual effect of the first image and a visual effect of the second image based on the moving direction.

According to this aspect, the visual effect of the first image indicating the path in which the object is predicted to move and the visual effect of the second image indicating the path in which the object is not predicted to move are changed based on the moving direction of the object. As a result, the user can grasp the relationship between the moving direction of the object and the selection result of the path without directly viewing the touch location. Thus, the operability of the game can be improved. In addition, the user can grasp both the relationship between the moving direction of the object and the first path and the relationship between the moving direction of the object and the second path without directly viewing the touch location. Thus, the operability of the game can be improved.

In the above aspect, the "connection point" may be, for example, a connection point of the first path and the second path in the game space. At the connection point, the first path and the second path may intersect as in a crossroad, for example, or may not intersect as in a T-connection point, for example. In the above aspect, "based on the moving direction" means that, for example, the visual effect is changed based on a relationship (magnitude, ratio, and the like) between an angle $\theta 1$ and an angle $\theta 2$. The angle $\theta 1$ is an angle formed by the moving direction designated by the designator (i.e., the moving direction of the object indicated by the touch location) with the direction in which the first path exists based on the object, and the angle $\theta 2$ is an angle formed by the moving direction of the object indicated by the touch location with the direction in which the second path exists based on the object.

In the above aspect, the "changing the visual effect" may be, for example, changing the quantity, saturation, display area, and the like of the first image or the second image. To enhance the visual effect, for example, the number of the first images or the second images may be increased, the saturation of the first images or the second images may be increased, the display area of the first image or the second image may be increased, or the like, or more than one of these may be performed. To weaken the visual effect, for example, the number of the first images or the second images may be reduced, the saturation of the first image or the second image may be reduced, the display area of the first image or the second image may be reduced, or the like, or more than one of these may be performed.

Appendix 2-5

A recording medium according to another aspect of the present invention is a recording medium according to any one of Appendices 2-1 to 2-4, and the display controller is configured to display the image indicating the prediction result by the predictor at a position based on the path in which the object is predicted to move.

According to this aspect, an image indicating a prediction result by the predictor is displayed at a position based on a path in which an object in the game space is predicted to move. As a result, the user can intuitively understand at which position in the game space G an object is likely to move in the moving direction indicated by the image indicating the prediction result, as compared with a case in which the image indicating the selection result is displayed at another position.

In the above aspect, the "position based on the predicted path" may be, for example, a position having a predetermined positional relationship with the predicted path, a position within a range of a predetermined distance or less from the predicted path, or a position in a predetermined direction based on the predicted path. Specifically, the "position based on the predicted path" may be, for example, a position of the predicted path in the game space, an advanced position advanced toward the predicted path based on the connection point of the paths, or a position between the predicted path and the object. Furthermore, the "position based on the predicted path" may be, for example, a movement restricted space (e.g., on a block) in the vicinity of the predicted path.

Appendix 2-6

A recording medium according to another aspect of the present invention is the recording medium according to any one of Appendices 2-1 to 2-4, the display controller is configured to display the image indicating the prediction result by the predictor at a position based on the object in the game space.

According to this aspect, an image indicating a prediction result by the predictor is displayed at a position based on an object in the game space. In general, a user who is playing a game often gazes at the vicinity of the object. Therefore, the amount of movement of the line of sight when viewing the image indicating the prediction result is reduced, and the burden on the user can be reduced as compared with the case in which the image indicating the prediction result is displayed at another position.

In the above aspect, the "position based on the object" may be, for example, a position having a predetermined positional relationship with the object, a position within a range of a predetermined distance or less from the object, or a position in a predetermined direction with respect to the object. Specifically, the "position based on the object" may be, for example, a current position of the object in the game space or a position in a path in an area ahead or behind in the moving direction of the object. Furthermore, the "position based on the object" may be, for example, a movement restricted space (e.g., on a block) in the vicinity of the object.

Appendix 2-7

A recording medium according to another aspect of the present invention is the recording medium according to any one of Appendices 2-1 to 2-4, and the display controller is configured to cause an image representing a part of the game space on the touch panel, and display the image showing the prediction result by the predictor at a position based on a positional relationship between a range displayed by the touch panel and a path in which the object is predicted to move in the game space.

According to this aspect, the image indicating the prediction result is displayed at a position based on the positional relationship between the display range of the touch panel and the path in which the object is predicted to move in the game space. Therefore, for example, even in a case in which the path in which the object is predicted to move is outside the display range of the touch panel, an image indicating the prediction result can be displayed, and convenience in the game can be improved.

In the above aspect, the "image representing a part of the game space" is an image obtained by extracting a part of the game space, and is an image in which not the entire area of the game space is displayed in the image. The image representing a part of the game space may be, for example, an image obtained by extracting a predetermined range based on the position of the object in the game space. In the above-described aspect, the "position based on the positional relationship between the display range and the path in which the object is predicted to move" may be, for example, a position that is selectively changed depending on whether or not the predicted path is included in the display range. For example, the "position based on the positional relationship between the display range and the predicted path" may be a position in the predicted path in a case in which the predicted path is located within the display range. The "position based on the positional relationship between the display range and the predicted path" may be a position on the object (or a position between the object and the path within the display range) in a case in which the predicted path is located outside the display range.

Appendix 2-8

A recording medium according to another aspect of the present invention is the recording medium according to any one of Appendices 2-1 to 2-7, and the predictor is configured to, in a case in which there is a connection point with another path in the path in which the object is predicted to move, predict the moving direction of the object at the connection point with the another path based on the touch location information, and the display controller is configured to display, in the game space, an image indicating a prediction result by the predictor corresponding to a connection point of multiple paths, and an image indicating a prediction result by the predictor corresponding to a connection point with the another path.

According to this aspect, in a case in which there is another connection point in the path in which the object is predicted to move, an image indicating the prediction result of the moving direction at each of the multiple connection points is displayed. As a result, the user can grasp the moving direction of the object over a long section, for example, as compared with the case in which only the prediction result of the moving direction at the connection point closest to the position of the object is displayed, and thus, the convenience in the game can be improved.

Appendix 2-9

A recording medium according to another aspect of the present invention is a recording medium according to any one of Appendices 2-1 to 2-8, and the predictor is configured to, in a case in which the shape of the environment changes, predict, based on the changed shape of the environment, a path in which the object will be moving, and the display controller is configured to, in a case in which the prediction result by the predictor changes together with a change in the shape of the environment, display in the game space an image showing a prediction result after the change.

According to this aspect, in a case in which the prediction result of the path in which the object moves changes with the change in the shape of the environment in the game space in which the object moves, an image indicating the prediction result after the change is displayed. Accordingly, even when the shape of the path changes, the user can accurately grasp the moving direction of the object, and the convenience in the game is improved.

In the above aspect, the "change in the shape of the environment" may be, for example, a change in the surface shape of an environmental component, an increase or decrease in the number of environmental components, a change in the size of an environmental component, or the like.

Appendix 2-10

An information processing apparatus according to another aspect of the present invention includes: an acquirer configured to acquire touch location information indicating a touch location on a touch panel; a designator configured to designate a moving direction of an object in a game space based on the touch location information; a predictor configured to, in a case in which there are multiple paths in which the object is movable in the game space, predict, from among the multiple paths, a path in which the object will be moving, based on the moving direction designated by the designator and a shape of an environment that restricts movement of the object in the game space; and a display controller configured to display, in the game space, an image indicating a prediction result by the predictor.

According to this aspect, in a case in which there are multiple paths in which an object is movable, a path in which the object will be moving is predicted from among the multiple paths, and an image indicating a prediction result is displayed. Accordingly, in instructing the moving direction of the object by touching a region configured on the touch panel, the user can accurately grasp the moving direction of the object in a case in which the character is movable in multiple paths. Consequently, it is possible to reduce or prevent erroneous operations at the time of the direction instruction operation. Furthermore, for example, if the image indicating the prediction result is displayed before the object reaches any of the multiple paths, it is possible to know, before the object reaches any of the multiple paths, which of the multiple paths the object will be moving to.

Therefore, for example, in a case in which the object moves in an unintended moving direction, the user can take an action such as changing the touch location. Thus, it is possible to more reliably prevent erroneous operations.

Appendix 2-11

An information processing method according to another aspect of the present invention is implemented by a processor and includes: acquiring touch location information indicating a touch location on a touch panel; designating a moving direction of an object in a game space based on the touch location information; in a case in which there are multiple paths in which the object is movable, predicting, from among the multiple paths, a path in which the object will be moving, based on the designated moving direction and a shape of an environment that restricts movement of the object in the game space; and displaying, in the game space, an image indicating a prediction result.

According to this aspect, in a case in which there are multiple paths in which an object is movable, a path in which the object will be moving is predicted from among multiple paths, and an image indicating a prediction result is displayed. Accordingly, in instructing the moving direction of the object by touching a region configured on the touch panel, the user can accurately grasp the moving direction of the object in a case in which the character is movable in multiple paths. Consequently, it is possible to reduce or prevent erroneous operations at the time of the direction instruction operation. Furthermore, for example, if the image indicating the prediction result is displayed before the object reaches any of the multiple paths, it is possible to know, before the object reaches any of the multiple paths, which of the multiple paths the object will be moving to. Therefore, for example, in a case in which the object moves in an unintended moving direction, the user can take an action such as changing the touch location. Thus, it is possible to more reliably prevent erroneous operations.

Appendix 2-12

A recording medium according to another aspect of the present invention causes a processor to function as: an acquirer configured to acquire touch location information indicating a touch location on a touch panel; a designator configured to designate a moving direction of an object in a game space based on the touch location information; in a case in which there is a movable path in which the object is movable in the game space, a predictor configured to predict, based on the moving direction designated by the designator and a shape of an environment that restricts movement of the object in the game space, whether or not the object moves in the movable path; and a display controller configured to display, in the game space, an image indicating a prediction result by the predictor.

According to this aspect, in a case in which there is a path in which the object will be moving, whether or not the object moves in the movable path is predicted based on the moving direction designated based on the touch location, and an image indicating the prediction result is displayed. Accordingly, in a case in which the user instructs the moving direction of the object by touching a region configured on the touch panel, the user can accurately grasp a path in which the object will be moving. Thus, it is possible to reduce or prevent erroneous operations at the time of the direction instruction operation. Furthermore, for example, if the image indicating the prediction result is displayed in advance (e.g., before the object reaches the movable path), for example, the user can take an action such as changing the touch location before the object makes an unintended move (such as entering into an unintended path). Thus, it is possible to more reliably prevent erroneous operations.

DESCRIPTION OF REFERENCE SIGNS

10,20 information processing apparatus
11 touch panel
12 storage device
13, 22 control device
130, 220 controller
131, 221 game controller
132,222 acquirer
134 determiner
136 selector

138, 228 display controller
224 designator
226 predictor

What is claimed is:

1. A non-transitory computer-readable recording medium storing a program for causing a processor to function as:

an acquirer configured to acquire touch location information indicating a touch location on a touch panel;

a designator configured to designate a moving direction of an object in a game space based on the touch location information;

a predictor configured to, in a case in which there are multiple paths in which the object is movable in the game space, predict, from among the multiple paths, a path in which the object will be moving, based on the moving direction designated by the designator and a shape of an environment that restricts movement of the object in the game space; and a display controller configured to display in the game space an image indicating a prediction result by the predictor.

2. The recording medium according to claim 1, wherein:

the designator is configured to, in a case in which there is a portion in which a movement in the moving direction is blocked in an area in the moving direction of the object in the game space, designate a stoppage of movement of the object in that portion, and the display controller is configured to display in the game space an image indicating the stoppage of the object.

3. The recording medium according to claim 1, wherein the display controller is configured to display an image indicating a positional relationship between at least one extending direction of the multiple paths and the moving direction designated by the designator.

4. The recording medium according to claim 3, wherein:

the multiple paths include a first path and a second path connected at a connection point, and the display controller is configured to display a first image indicating a path predicted by the predictor, from among the first path and the second path, as a path in which the object will be moving, and a second image indicating a path predicted by the predictor, from among the first path and the second path, as a path in which the object will not be moving, and the display controller is configured to change a visual effect of the first image and a visual effect of the second image based on the moving direction.

5. The recording medium according to claim 1, wherein the display controller is configured to display the image indicating the prediction result by the predictor at a position based on the path in which the object is predicted to move.

6. The recording medium according to claim 1, wherein the display controller is configured to display the image indicating the prediction result by the predictor at a position based on the object in the game space.

7. The recording medium according to claim 1, wherein the display controller is configured to:

display an image representing a part of the game space on the touch panel, and display the image showing the prediction result by the predictor at a position based on a positional relationship between a range displayed by the touch panel and a path in which the object is predicted to move in the game space.

8. The recording medium according to claim 1, wherein:

the predictor is configured to, in a case in which there is a connection point with another path in the path in which the object is predicted to move, predict the moving direction of the object at the connection point with the another path based on the touch location information, and the display controller is configured to display, in the game space, an image indicating a prediction result by the predictor corresponding to a connection point of the multiple paths, and an image indicating a prediction result by the predictor corresponding to a connection point with the another path.

9. The recording medium according to claim 1, wherein:

the predictor is configured to, in a case in which the shape of the environment changes, predict, based on the changed shape of the environment, a path in which the object will be moving, and the display controller is configured to, in a case in which the prediction result by the predictor changes together with a change in the shape of the environment, display in the game space an image showing a prediction result after the change.

10. An information processing method implemented by a processor, the method comprising:

acquiring touch location information indicating a touch location on a touch panel;

designating a moving direction of an object in a game space based on the touch location information;

in a case in which there are multiple paths in which the object is movable, predicting, from among the multiple paths, a path in which the object will be moving, based on the designated moving direction and a shape of an environment that restricts movement of the object in the game space; and displaying, in the game space, an image indicating a prediction result.

11. A non-transitory computer-readable recording medium storing a program for causing a processor to function as:

an acquirer configured to acquire touch location information indicating a touch location on a touch panel; and a determiner configured to:

in a case in which the touch location indicated by the touch location information is in a first region, determine movement of an object in a first direction, wherein the object is in a first path that is in the first direction in a game space, and in a case in which the touch location indicated by the touch location information is in a second region partially overlapping the first region, determine movement of the object in a second direction, wherein the object is in a second path that is in the second direction in the game space, wherein the determiner includes:

in a case in which the touch location indicated by the touch location information is in an overlapping region between the first region and the second region and in which there is a connection point of the first path and the second path in an area in the moving direction of the object in the game space, a selector configured to select, based on the touch location information, the moving direction of the object at the connection point from among the first direction and the second direction; and a display controller configured to display in the game space an image indicating a selection result by the selector before the object reaches the connection point.

12. The recording medium according to claim 11, wherein the selector is configured to:

divide the overlapping region into a first overlapping region being a part of the first region and a second overlapping region being a part of the second region, wherein the first overlapping region adjoins a first non-overlapping region and does not overlap the second region, and wherein the second overlapping region adjoins a second non-overlapping region and does not overlap the first region, in a case in which the touch location is in the first overlapping region, select the moving direction of the object at the connection point to be in the first direction; and in a case in which the touch location is in the second overlapping region, select the moving direction of the object at the connection point to be in the second direction.

13. The recording medium according to claim 11, wherein the display controller is configured to display the image indicating the selection result by the selector at a position based on the connection point in the game space.

14. The recording medium according to claim 11, wherein the display controller is configured to display the image indicating the selection result by the selector at a position based on the object in the game space.

15. The recording medium according to claim 11, wherein the display controller is configured to:

display an image representing a part of the game space on the touch panel, and display the image indicating the selection result by the selector at a position based on a positional relationship between a range displayed on the touch panel and the connection point in the game space.

16. The recording medium according to claim 11, wherein:

the selector is configured to, in a case in which the first direction is selected as the moving direction of the object at the connection point, and in a case in which the touch location indicated by the touch location information is in the overlapping region and in which there is another connection point at which a third path that is in a third direction and the first path are connected with each other in an area in the moving direction of the object that has passed the connection point, select, based on the touch location information, the moving direction of the object at the another connection point from among the first direction and the third direction, and the display controller is configured to display, in the game space, an image indicating a selection result by the selector corresponding to the connection point, and an image indicating a selection result by the selector corresponding to the another connection point.

17. The recording medium according to claim 11, wherein:

the determiner is configured to, in a case in which the touch location indicated by the touch location information is in the first region or the second region and in which there is a portion in which movement in the first direction and the second direction is blocked in an area in the moving direction of the object in the game space, determine to stop the movement of the object at that portion, and the display controller is configured to display in the game space an image indicating a determination result by the determiner.

18. The recording medium according to claim 11, wherein the display controller is configured to, in a case in which the touch location is located in the overlapping region, display an image indicating a positional relationship between the touch location and at least one of the first region or the second region.

19. The recording medium according to claim 18, wherein the display controller is configured to:

display a first image indicating a direction selected by the selector from among the first direction and the second direction, and a second image indicating a direction not selected by the selector from among the first direction and the second direction, and change a visual effect of the first image and a visual effect of the second image based on the touch location in the overlapping region.

20. An information processing method implemented by a processor, the method comprising:

acquiring touch location information indicating a touch location on a touch panel;

in a case in which the touch location indicated by the touch location information is in a first region, determining movement of an object in a first direction, wherein the object is in a first path that is in the first direction in a game space;

in a case in which the touch location indicated by the touch location information is in a second region partially overlapping the first region, determining movement of the object in a second direction, wherein the object is in a second path that is in the second direction in the game space;

in a case in which the touch location indicated by the touch location information is in an overlapping region between the first region and the second region and in which there is a connection point of the first path and the second path in an area in the moving direction of the object in the game space, selecting, based on the touch location information, the moving direction of the object at the connection point from among the first direction and the second direction; and displaying in the game space an image indicating a selection result before the object reaches the connection point.

* * * * *